US012684165B2

(12) United States Patent
Li et al.

(10) Patent No.: US 12,684,165 B2
(45) Date of Patent: *Jul. 14, 2026

(54) METHOD AND APPARATUS FOR PROCESSING IMAGE SERVICE

(71) Applicant: Nokia Technologies Oy, Espoo (FI)

(72) Inventors: Ling Li, Seoul (KR); Jin Heo, Seoul (KR); Seunghwan Kim, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/883,444

(22) Filed: Sep. 12, 2024

(65) Prior Publication Data

US 2025/0008155 A1     Jan. 2, 2025

Related U.S. Application Data

(63) Continuation of application No. 18/237,306, filed on Aug. 23, 2023, now Pat. No. 12,114,011, which is a
(Continued)

(51) Int. Cl.
*H04N 21/431* (2011.01)
*H04N 19/11* (2014.01)
(Continued)

(52) U.S. Cl.
CPC ........... *H04N 19/593* (2014.11); *H04N 19/11* (2014.11); *H04N 19/132* (2014.11);
(Continued)

(58) Field of Classification Search
CPC .... H04N 19/11; H04N 19/119; H04N 19/159; H04N 19/132; H04N 19/593;
(Continued)

(56) References Cited

U.S. PATENT DOCUMENTS 11,516,506 B2     11/2022   Ling et al.
11,778,230 B2 *   10/2023   Li ........................ H04N 19/593
                                                         375/240.12
(Continued)

FOREIGN PATENT DOCUMENTS

JP          2015-211386 A      11/2015
JP          2017-525227 A      8/2017
(Continued)

OTHER PUBLICATIONS

"On Derivation of Most Probable Modes for Intra Prediction in Video Coding"—Mingiang Jiang, Shanxi Li, Nam Ling, Jianhua Zheng, Philipp Zhang; 2018 IEEE International Symposium on Circuits and Systems (ISCAS) (pp. 1-4) (Year: 2018).*
(Continued)

*Primary Examiner* — Mainul Hasan
(74) *Attorney, Agent, or Firm* — ALSTON & BIRD LLP

(57) ABSTRACT

A method, performed by a digital device, for processing an image service according to the present document comprises the steps of: receiving image information; decoding a first image on the basis of the image information; processing the decoded first image to be displayed on a first area of a display screen; and processing a second image to be displayed on a second area of the display screen.

3 Claims, 24 Drawing Sheets

Related U.S. Application Data continuation of application No. 17/976,173, filed on Oct. 28, 2022, now Pat. No. 11,778,230, which is a continuation of application No. 17/282,427, filed as application No. PCT/KR2019/013067 on Oct. 4, 2019, now Pat. No. 11,516,506.

(60) Provisional application No. 62/742,244, filed on Oct. 5, 2018.

(51) Int. Cl.

| | |
|---|---|
| *H04N 19/119* | (2014.01) |
| *H04N 19/132* | (2014.01) |
| *H04N 19/136* | (2014.01) |
| *H04N 19/176* | (2014.01) |
| *H04N 19/593* | (2014.01) |
| *H04N 19/70* | (2014.01) |

(52) U.S. Cl.
CPC ......... *H04N 19/136* (2014.11); *H04N 19/176* (2014.11); *H04N 19/70* (2014.11); *H04N 19/119* (2014.11); *H04N 21/431* (2013.01)

(58) Field of Classification Search
CPC .. H04N 19/70; H04N 21/431; H04N 21/8451; H04N 21/4821
See application file for complete search history.

(56) References Cited

U.S. PATENT DOCUMENTS

| | | | |
|---|---|---|---|
| 2005/0074176 A1 | 4/2005 | Marpe et al. | |
| 2014/0334543 A1 | 11/2014 | Lee et al. | |
| 2015/0172719 A1 | 6/2015 | Guo et al. | |
| 2015/0373340 A1 | 12/2015 | Zou et al. | |
| 2016/0373769 A1* | 12/2016 | Zhao | H04N 19/176 |
| 2017/0332084 A1* | 11/2017 | Seregin | H04N 19/11 |
| 2018/0098064 A1* | 4/2018 | Seregin | H04N 19/159 |
| 2018/0199040 A1* | 7/2018 | Lee | H04N 19/176 |
| 2018/0316913 A1* | 11/2018 | Jun | H04N 19/176 |
| 2019/0253713 A1* | 8/2019 | Oh | H04N 19/157 |
| 2019/0281290 A1* | 9/2019 | Lee | H04N 19/119 |
| 2020/0036969 A1* | 1/2020 | Sarwer | H04N 19/70 |
| 2020/0051288 A1 | 2/2020 | Lim et al. | |
| 2020/0092544 A1* | 3/2020 | Zhao | H04N 19/11 |
| 2020/0195920 A1* | 6/2020 | Racape | H04N 19/70 |
| 2020/0296417 A1* | 9/2020 | Ko | H04N 19/70 |
| 2020/0389668 A1* | 12/2020 | Wang | H04N 19/70 |
| 2021/0176492 A1* | 6/2021 | Kim | H04N 19/80 |
| 2021/0250610 A1 | 8/2021 | Rosewarne | |

FOREIGN PATENT DOCUMENTS

| | | | |
|---|---|---|---|
| KR | 10-2014-0088594 A | 7/2014 | |
| KR | 10-2016-0085908 A | 7/2016 | |
| KR | 10-2017-0131329 A | 11/2017 | |
| KR | 10-2018-0040319 A | 4/2018 | |
| KR | 10-2018-0086094 A | 7/2018 | |
| WO | WO-2013064099 A1 * | 5/2013 | ............. H04N 19/13 |

OTHER PUBLICATIONS

"Enhanced Intra Prediction Mode Coding by using Reference Samples"—Agarwal et al., 978-1-5386-6318-9/18/$31.00 A@2018 IEEE (Year: 2018).*

"Fast HEVC intra prediction mode decision based on EDGE direction information"—Thaisa L. da Silva; Luciano V. Agostini; Luis A. da Silva Cruz; 2012 Proceedings of the 20th European Signal Processing Conference (EUSIPCO) (Year: 2012).*

"On Derivation of Most Probable Modes for Intra Prediction in Video Coding" - Minqiang Jiang, Shanxi Li, Nam Ling, Jianhua Zheng, Philipp Zhang; 2018 IEEE International Symposium on Circuits and Systems (ISCAS) (pp. 1-4) (Year: 2018).

IPEA/409—International Preliminary Report on Patentability Mailed on Apr. 15, 2021 for WO Application No. PCT/KR19/013067, 12 page(s).

Non-Final Rejection Mailed on Apr. 23, 2024 for U.S. Appl. No. 18/237,306, 13 page(s).

Non-Final Rejection Mailed on Feb. 14, 2023 for U.S. Appl. No. 17/976,173, 16 page(s).

Non-Final Rejection Mailed on Feb. 17, 2022 for U.S. Appl. No. 17/282,427, 18 page(s).

Notice of Allowance and Fees Due (PTOL-85) Mailed on Jul. 29, 2022 for U.S. Appl. No. 17/282,427, 9 page(s).

Notice of Allowance and Fees Due (PTOL-85) Mailed on Jun. 10, 2024 for U.S. Appl. No. 18/237,306, 9 page(s).

Notice of Allowance and Fees Due (PTOL-85) Mailed on May 25, 2023 for U.S. Appl. No. 17/976,173, 10 page(s).

Outgoing—ISA/210—International Search Report Mailed on Jan. 14, 2020 for WO Application No. PCT/KR19/013067, 5 page(s).

Outgoing Written Opinion of the ISA Mailed on Jan. 14, 2020 for WO Application No. PCT/KR19/013067, 9 page(s).

Samsung Electronics et al., "Description of SDR, HDR and 360° video coding technology proposal considering mobile application scenario by Samsung, Huawei, GoPro, and HiSilicon", buJoint Video Exploration Team (JVET) of ITU-T SG 16 WP 3 and ISO/IEC JTC 1/SC 29/WG 11, 10th Meeting, JVET-J0024, (Apr. 10-20, 2018), 120 pages.

* cited by examiner

222

Original picture →

Reference area
within current picture →

Prediction mode
determiner
(223)

Reference sample
deriver
(224)

Prediction sample
deriver
(225)

→ Prediction mode
information

→ Prediction sample intra predictor

Intra predictor

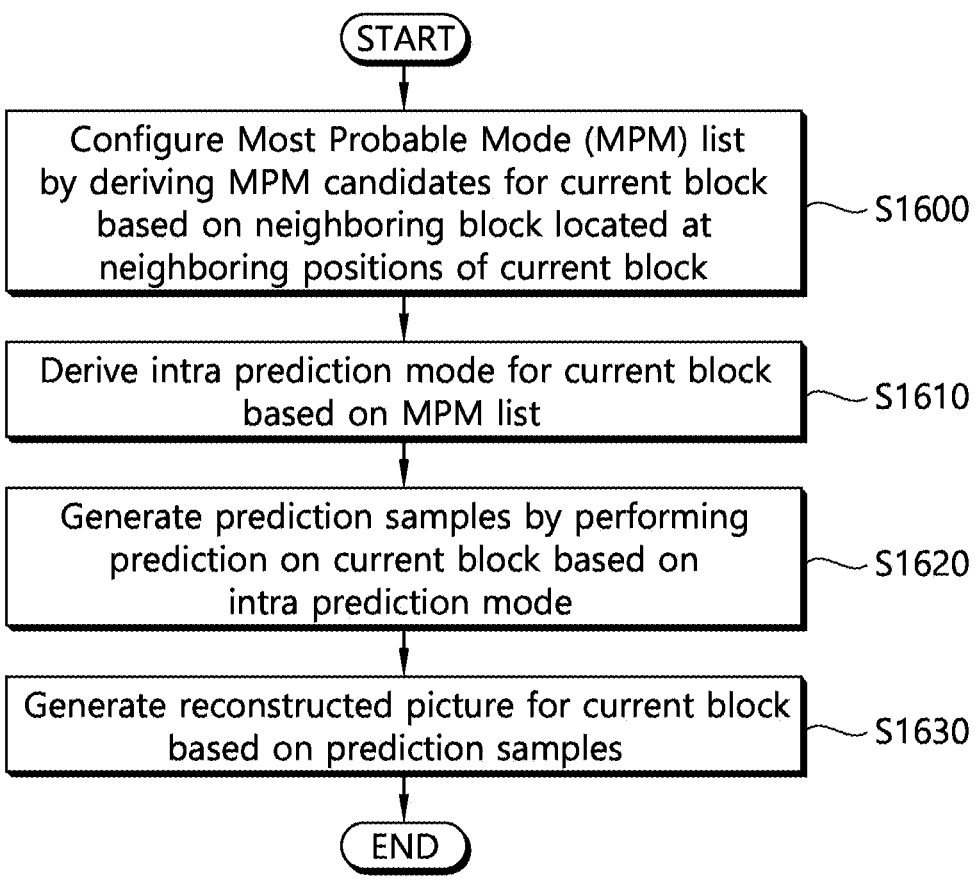

START

Configure Most Probable Mode (MPM) list
by deriving MPM candidates for current block
based on neighboring block located at
neighboring positions of current block — S1600

Derive intra prediction mode for current block
based on MPM list — S1610

Generate prediction samples by performing
prediction on current block based on
intra prediction mode — S1620

Generate reconstructed picture for current block
based on prediction samples — S1630

END

START

Receive image information    ⁓S2400

Decode first image based on
image information    ⁓S2410

Process decoded first image so that
decoded first image is displayed in first
region on display screen    ⁓S2420

Process second image so that second
image is displayed in second region
on display screen    ⁓S2430

END

METHOD AND APPARATUS FOR PROCESSING IMAGE SERVICE

CROSS-REFERENCE TO RELATED APPLICATIONS

This application is a Continuation Application of U.S. application Ser. No. 18/237,306, filed on Aug. 23, 2023, which is a Continuation of U.S. application Ser. No. 17/976, 173, filed on Oct. 28, 2022 (now U.S. Pat. No. 11,778,230 issued on Oct. 3, 2023), which is a Continuation of U.S. application Ser. No. 17/282,427, filed on Apr. 2, 2021 (now U.S. Pat. No. 11,516,506 issued on Nov. 29, 2022), which is the National Stage filing under 35 U.S.C. 371 of International Application No. PCT/KR2019/013067, filed on Oct. 4, 2019, which claims the benefit of U.S. Provisional Application No. 62/742,244 filed on Oct. 5, 2018, the contents of which are all hereby incorporated by reference herein in their entirety.

BACKGROUND OF THE DISCLOSURE

Field of the Disclosure

This specification relates to a service processing method related to content using an image coding technique and, most particularly, to a method and apparatus for processing image services based on image information including an intra prediction information.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY OF THE DISCLOSURE

A technical object of this specification is to provide a method and apparatus for processing image services that can decode and display a main image being derived based on received image information and/or a sub-image being related to the main image.

Another technical object of this specification is to provide a method and apparatus for enhancing image coding efficiency.

Yet another technical object of this specification is to provide a method and apparatus for performing efficient intra prediction.

Yet another technical object of this specification is to provide a method and apparatus for performing image coding that can derive an MPM list for efficient intra prediction.

A further technical object of this specification is to provide a method and apparatus for performing image coding that may reduce signaling overhead by efficiently coding information on intra prediction.

According to an embodiment of this specification, an image service processing method performed by a digital device is provided. The method may include receiving image information, decoding a first image based on the image information, processing the decoded first image so as to display the decoded first image in a first region on a display screen, and processing a second image so as to display the second image in a second region on the display screen, and the step of decoding the first image may include obtaining at least one of Most Probable Mode (MPM) flag information, MPM index information, or remaining mode information included in the image information, for a current block currently being decoded within the first image, configuring an MPM list by deriving MPM candidates for the current block, deriving an intra prediction mode of the current block based on at least one of the MPM flag information, the MPM index information or the remaining mode information, and the MPM list, generating prediction samples by performing prediction on the current block based on the intra prediction mode, and generating a reconstructed picture for the current block based on the prediction samples, wherein, when the intra prediction mode for the current block is not included among the MPM candidates within the MPM list based on the MPM flag information, the intra prediction mode of the current block may be derived based on the remaining mode information, and wherein the remaining mode information may be coded based on a Truncated Binary (TB) binarization process.

According to another embodiment of this specification, a digital device performing an image service processing method is provided. The digital device may include a first decoder for receiving image information, and decoding a first image based on the image information, a first renderer for processing the decoded first image so as to display the decoded first image in a first region on a display screen, and a second renderer for processing a second image so as to display the second image in a second region on the display screen, and the first decoder may obtain at least one of Most Probable Mode (MPM) flag information, MPM index information, or remaining mode information included in the image information, for a current block currently being decoded within the first image, configure an MPM list by deriving MPM candidates for the current block, derive an intra prediction mode of the current block based on at least one of the MPM flag information, the MPM index information or the remaining mode information, and the MPM list, generate prediction samples by performing prediction on the current block based on the intra prediction mode, and generate a reconstructed picture for the current block based on the prediction samples, wherein, when the intra prediction mode for the current block is not included among the MPM candidates within the MPM list based on the MPM flag information, the intra prediction mode of the current block may be derived based on the remaining mode information, and wherein the remaining mode information may be coded based on a Truncated Binary (TB) binarization process.

According to this specification, a method for processing image services displaying a main image on image information received by a digital device and a sub-image being related to the main image may be proposed herein. Thus, image services may be provided more efficiently to users.

According to this specification, an MPM list may be efficiently configured while considering an increase in a number of intra prediction modes. Additionally, a level of accuracy in the MPM list for indicating an intra prediction of a current block may be enhanced, and an overall coding efficiency may be enhanced.

According to this specification, by coding the information on an intra prediction mode based on a Truncated Binary (TB) code, signaling overhead may be reduced, and the overall coding efficiency may be enhanced.

BRIEF DESCRIPTION OF THE DRAWINGS

FIGS. 12 and 13 are flowcharts schematically illustrating a method of configuring an MPM list for a current block.

FIG. 16 is a flowchart broadly illustrating a decoding method that may be performed by a decoding apparatus according to an embodiment of this specification.

DESCRIPTION OF EXEMPLARY EMBODIMENTS

Figure 1:
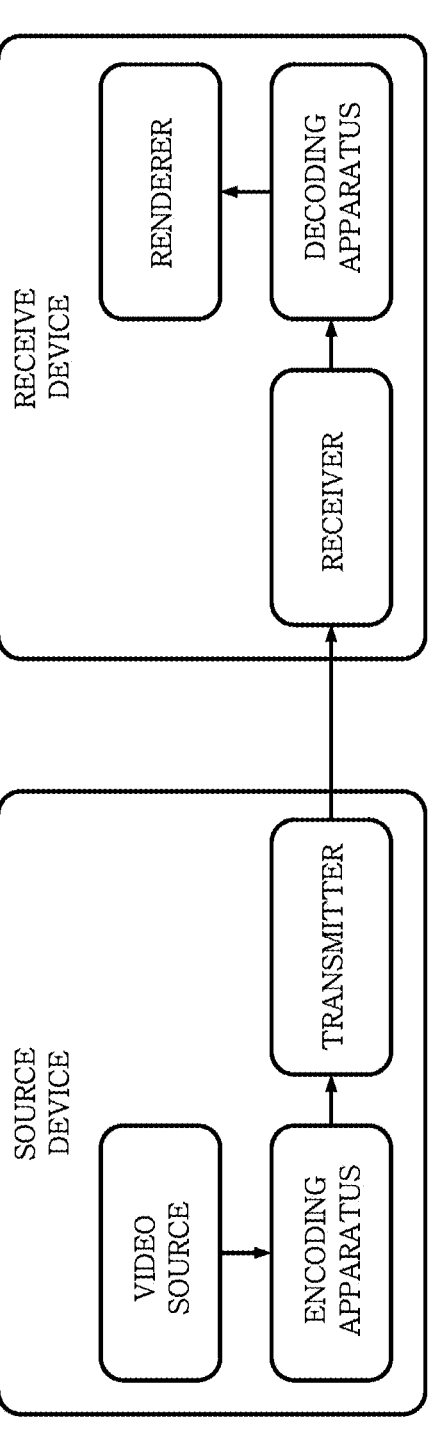
FIG. 1 schematically illustrates an example of a video/image coding system to which embodiments of this specification may be applied.

This specification may be modified in various ways and may have various embodiments, and specific embodiments will be illustrated in the drawings and described in detail. However, this does not intend to limit this specification to the specific embodiments. Terms commonly used in this specification are used to describe a specific embodiment and is not used to limit the technical spirit of this specification. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this specification are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this specification unless it deviates from the essence of this specification.

Hereinafter, preferred embodiments of this specification are described more specifically with reference to the accompanying drawings. Hereinafter, in the drawings, the same reference numeral is used in the same element, and a redundant description of the same element may be omitted.

This specification relates to video/image coding. For example, the methods/embodiments disclosed in this specification may be applied to a method disclosed in the versatile video coding (VVC), the essential video coding (EVC) standard, the AOMedia Video 1 (AV1) standard, the 2nd generation of audio video coding standard (AVS2), or the next generation video/image coding standard (e.g., H.267 or H.268, and so on).

This specification presents various embodiments of video/image coding, and the embodiments may be performed in combination with each other unless otherwise mentioned.

In this specification, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in this specification. For example, in this specification, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In this specification, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the specification, the term "or" should be interpreted to indicate "and/or." For instance, the expression "A or B" may comprise 1) only A, 2) only B, and/or 3) both A and B. In other words, the term "or" in this specification should be interpreted to indicate "additionally or alternatively."

FIG. 1 schematically illustrates an example of a video/image coding system to which embodiments of this specification may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
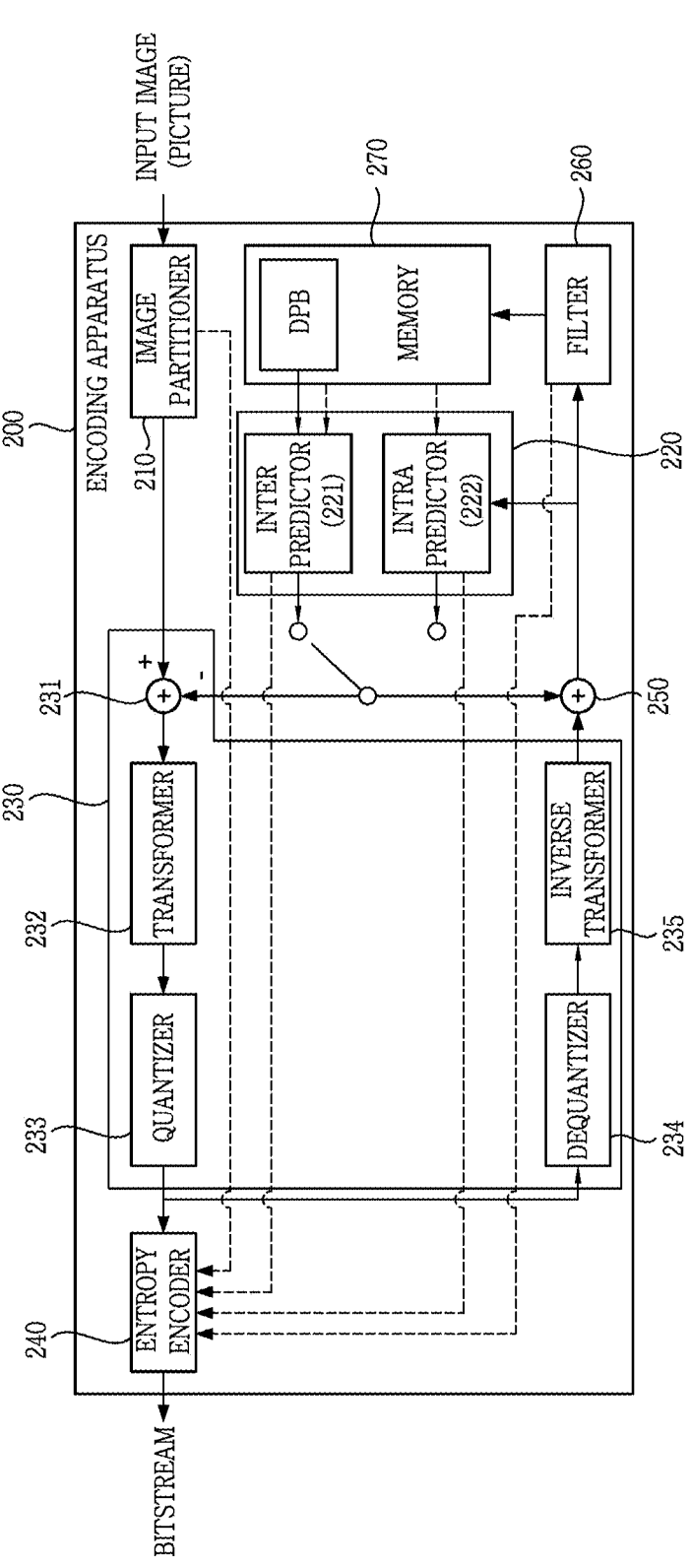
FIG. 2 is a schematic diagram illustrating a configuration of a video/image encoding apparatus to which the embodiment(s) of the present specification may be applied.

FIG. 2 is a schematic diagram illustrating a configuration of a video/image encoding apparatus to which the embodiment(s) of the present specification may be applied. Hereinafter, the video encoding apparatus may include an image encoding apparatus.

Referring to FIG. 2, the encoding apparatus (200) includes an image partitioner (210), a predictor (220), a residual processor (230), and an entropy encoder (240), an adder (250), a filter (260), and a memory (270). The predictor (220) may include an inter predictor (221) and an intra predictor (222). The residual processor (230) may include a transformer (232), a quantizer (233), a dequantizer (234), and an inverse transformer (235). The residual processor (230) may further include a subtractor (231). The adder (250) may be called a reconstructor or a reconstructed block generator. The image partitioner (210), the predictor (220), the residual processor (230), the entropy encoder (240), the adder (250), and the filter (260) may be configured by at least one hardware component (e.g., an encoder chipset or processor) according to an embodiment. In addition, the memory (270) may include a decoded picture buffer (DPB) or may be configured by a digital storage medium. The hardware component may further include the memory (270) as an internal/external component.

The image partitioner (210) may partition an input image (or a picture or a frame) input to the encoding apparatus (200) into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this specification may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus (200), a prediction signal (predicted block, prediction sample array) output from the inter predictor (221) or the intra predictor (222) is subtracted from an input image signal (original block, original sample array) to generate a residual signal residual block, residual sample array), and the generated residual signal is transmitted to the transformer (232). In this case, as shown, a unit for subtracting a prediction signal (predicted block, prediction sample array) from the input image signal (original block, original sample array) in the encoding apparatus (200) may be called a subtractor (231). The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder (240). The information on the prediction may be encoded in the entropy encoder (240) and output in the form of a bitstream.

The intra predictor (222) may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor (222) may determine the prediction mode applied to the current block by using a prediction mode applied to a neighboring block.

The inter predictor (221) may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor (221) may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor (221) may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor (220) may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this specification. The palette mode may be considered as an example of intra coding or intra prediction. When the palette mode is applied, a sample value within a picture may be signaled based on information on the palette table and the palette index.

The prediction signal generated by the predictor (including the inter predictor (221) and/or the intra predictor (222)) may be used to generate a reconstructed signal or to generate a residual signal. The transformer (232) may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer (233) may quantize the transform coefficients and transmit them to the entropy encoder (240), and the entropy encoder (240) may encode the quantized signal (information on the quantized transform coefficients) and output a bitstream. The information on the quantized transform coefficients may be referred to as residual information. The quantizer (233) may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder (240) may perform various encoding methods such as, for example, exponential Golomb, context-adaptive variable length coding (CAVLC), context-adaptive binary arithmetic coding (CABAC), and the like. The entropy encoder (240) may encode information necessary for video/image reconstruction other than quantized transform coefficients (e.g., values of syntax elements, and so on) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this specification, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder (240) and/or a storage unit (not shown) storing the signal may be included as internal/external element of the encoding apparatus (200), and alternatively, the transmitter may be included in the entropy encoder (240).

The quantized transform coefficients output from the quantizer (233) may be used to generate a prediction signal. For example, the residual signal (residual block or residual samples) may be reconstructed by applying dequantization and inverse transform to the quantized transform coefficients through the dequantizer (234) and the inverse transformer (235). The adder (250) adds the reconstructed residual signal to the prediction signal output from the inter predictor (221) or the intra predictor (222) to generate a reconstructed signal (reconstructed picture, reconstructed block, reconstructed sample array). If there is no residual for the block to be processed, such as a case where the skip mode is applied, the predicted block may be used as the reconstructed block. The adder (250) may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter (260) may improve subjective/objective image quality by applying filtering to the reconstructed signal. For example, the filter (260) may generate a modified reconstructed picture by applying various filtering methods to the reconstructed picture and store the modified reconstructed picture in the memory (270), specifically, a DPB of the memory (270). The various filtering methods may include, for example, deblocking filtering, a sample adaptive offset, an adaptive loop filter, a bilateral filter, and the like. The filter (260) may generate various information related to the filtering and transmit the generated information to the entropy encoder (240) as described later in the description of each filtering method. The information related to the filtering may be encoded by the entropy encoder (240) and output in the form of a bitstream.

The modified reconstructed picture transmitted to the memory (270) may be used as the reference picture in the inter predictor (221). When the inter prediction is applied through the encoding apparatus, prediction mismatch between the encoding apparatus (200) and the decoding apparatus may be avoided and encoding efficiency may be improved.

The DPB of the memory (270) DPB may store the modified reconstructed picture for use as a reference picture in the inter predictor (221). The memory (270) may store the motion information of the block from which the motion information in the current picture is derived (or encoded) and/or the motion information of the blocks in the picture that have already been reconstructed. The stored motion information may be transmitted to the inter predictor (221) and used as the motion information of the spatial neighboring block or the motion information of the temporal neighboring block. The memory (270) may store reconstructed samples of reconstructed blocks in the current picture and may transfer the reconstructed samples to the intra predictor (222).

Figure 3:
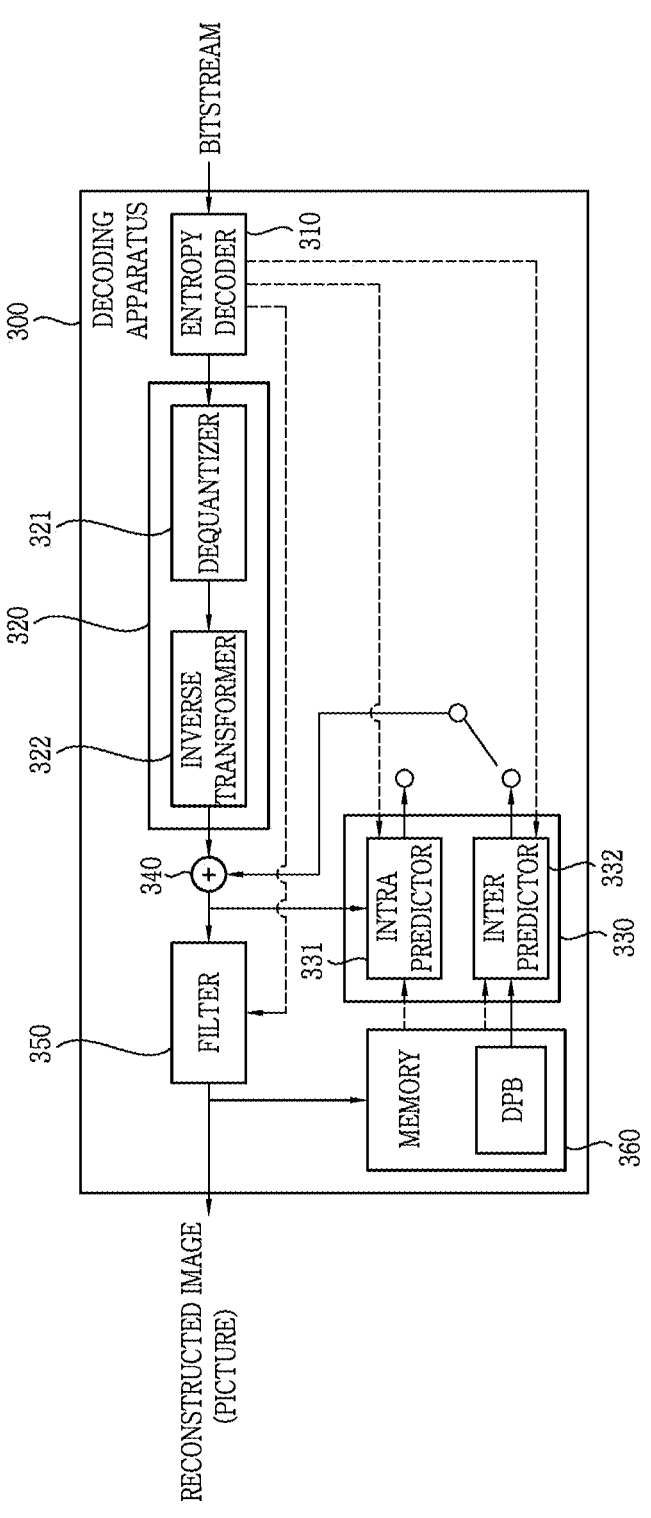
FIG. 3 is a schematic diagram illustrating a configuration of a video/image decoding apparatus to which the embodiment(s) of the present specification may be applied.

FIG. 3 is a schematic diagram illustrating a configuration of a video/image decoding apparatus to which the embodiment(s) of the present specification may be applied.

Referring to FIG. 3, the decoding apparatus (300) may include an entropy decoder (310), a residual processor (320), a predictor (330), an adder (340), a filter (350), a memory (360). The predictor (330) may include an inter predictor (331) and an intra predictor (332). The residual processor (320) may include a dequantizer (321) and an inverse transformer (321). The entropy decoder (310), the residual processor (320), the predictor (330), the adder (340), and the filter (350) may be configured by a hardware component (e.g., a decoder chipset or a processor) according to an embodiment. In addition, the memory (360) may include a decoded picture buffer (DPB) or may be configured by a digital storage medium. The hardware component may further include the memory (360) as an internal/external component.

When a bitstream including video/image information is input, the decoding apparatus (300) may reconstruct an image corresponding to a process in which the video/image information is processed in the encoding apparatus of FIG.

2. For example, the decoding apparatus (300) may derive units/blocks based on block partition related information obtained from the bitstream. The decoding apparatus (300) may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus (300) may be reproduced through a reproducing apparatus.

The decoding apparatus (300) may receive a signal output from the encoding apparatus of FIG. 2 in the form of a bitstream, and the received signal may be decoded through the entropy decoder (310). For example, the entropy decoder (310) may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this specification may be decoded may decode the decoding procedure and obtained from the bitstream. For example, the entropy decoder (310) decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder (310) may be provided to the predictor (the inter predictor (332) and the intra predictor (331)), and the residual value on which the entropy decoding was performed in the entropy decoder (310), that is, the quantized transform coefficients and related parameter information, may be input to the residual processor (320). The residual processor (320) may derive the residual signal (the residual block, the residual samples, the residual sample array). In addition, information on filtering among information decoded by the entropy decoder (310) may be provided to the filter (350). Meanwhile, a receiver (not shown) for receiving a signal output from the encoding apparatus may be further configured as an internal/external element of the decoding apparatus (300), or the receiver may be a component of the entropy decoder (310). Meanwhile, the decoding apparatus according to this specification may be referred to as a video/image/picture decoding apparatus, and the decoding apparatus may be classified into an information decoder (video/image/picture information decoder) and a sample decoder (video/image/picture sample decoder). The information decoder may include the entropy decoder (310), and the sample decoder may include at least one of the dequantizer (321), the inverse transformer (322), the adder (340), the filter (350), the memory (360), the inter predictor (332), and the intra predictor (331).

The dequantizer (321) may dequantize the quantized transform coefficients and output the transform coefficients. The dequantizer (321) may rearrange the quantized transform coefficients in the form of a two-dimensional block form. In this case, the rearrangement may be performed based on the coefficient scanning order performed in the encoding apparatus. The dequantizer (321) may perform dequantization on the quantized transform coefficients by using a quantization parameter (e.g., quantization step size information) and obtain transform coefficients.

The inverse transformer (322) inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder (310) and may determine a specific intra/inter prediction mode.

The predictor (320) may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this specification. The palette mode may be considered as an example of intra coding or intra prediction. When the palette mode is applied, a sample value within a picture may be signaled based on information on the palette table and the palette index.

The intra predictor (331) may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor (331) may determine the prediction mode applied to the current block by using the prediction mode applied to the neighboring block.

The inter predictor (332) may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, and so on) information. In the case of inter prediction, the neighboring block may include a spatial neighboring block present in the current picture and a temporal neighboring block present in the reference picture. For example, the inter predictor (332) may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder (340) may generate a reconstructed signal (reconstructed picture, reconstructed block, reconstructed sample array) by adding the obtained residual signal to the prediction signal (predicted block, predicted sample array) output from the predictor (including the inter predictor (332) and/or the intra predictor (331)). If there is no residual for the block to be processed, such as when the skip mode is applied, the predicted block may be used as the reconstructed block.

The adder (340) may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter (350) may improve subjective/objective image quality by applying filtering to the reconstructed signal. For example, the filter (350) may generate a modified reconstructed picture by applying various filtering methods to the reconstructed picture and store the modified reconstructed picture in the memory (360), specifically, a DPB of the memory (360). The various filtering methods may include, for example, deblocking filtering, a sample adaptive offset, an adaptive loop filter, a bilateral filter, and the like.

The (modified) reconstructed picture stored in the DPB of the memory (360) may be used as a reference picture in the inter predictor (332). The memory (360) may store the motion information of the block from which the motion information in the current picture is derived (or decoded) and/or the motion information of the blocks in the picture that have already been reconstructed. The stored motion information may be transmitted to the inter predictor (332) so as to be utilized as the motion information of the spatial neighboring block or the motion information of the temporal neighboring block. The memory (360) may store reconstructed samples of reconstructed blocks in the current picture and transfer the reconstructed samples to the intra predictor (331).

In the present disclosure, the embodiments described in the filter (260), the inter predictor (221), and the intra predictor (222) of the encoding apparatus (200) may be the same as or respectively applied to correspond to the filter (350), the inter predictor (332), and the intra predictor (331) of the decoding apparatus (300). The same may also apply to the unit (332) and the intra predictor (331).

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/ inverse-transforming the quantized transform coefficients for reference to the inter prediction of a subsequent picture, and may generate a reconstructed picture.

Figure 4:
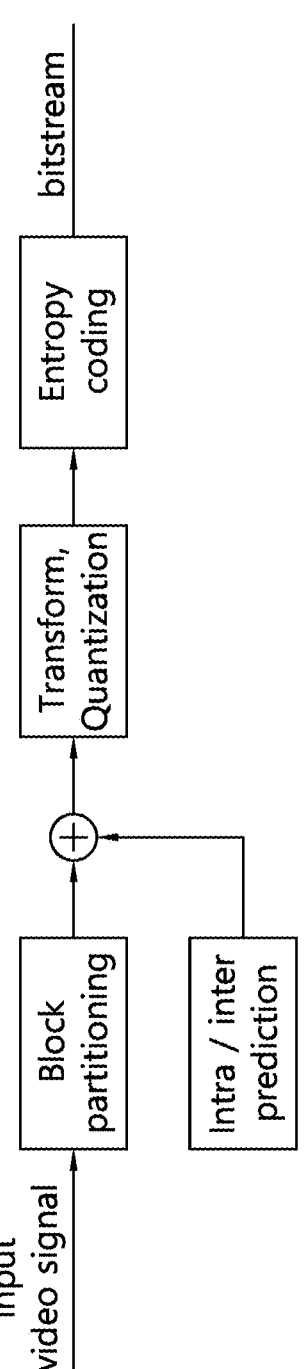
FIG. 4 illustrates an example of an image encoding method performed by a video encoding apparatus.

FIG. 4 illustrates an example of an image encoding method performed by a video encoding apparatus.

Referring to FIG. 4, the image encoding method may include block partitioning, intra/inter prediction, transform, quantization and entropy encoding processes. For example, a current picture may be partitioned into a plurality of blocks. A prediction block of a current block may be generated through an intra/inter prediction. A residual block of the current block may be generated through a subtraction between an input block of the current block and the prediction block. Thereafter, a coefficient block, that is, transform coefficients of the current block, may be generated through a transform for the residual block. The transform coefficients may be quantized and entropy-encoded and stored in a bitstream.

Figure 5:
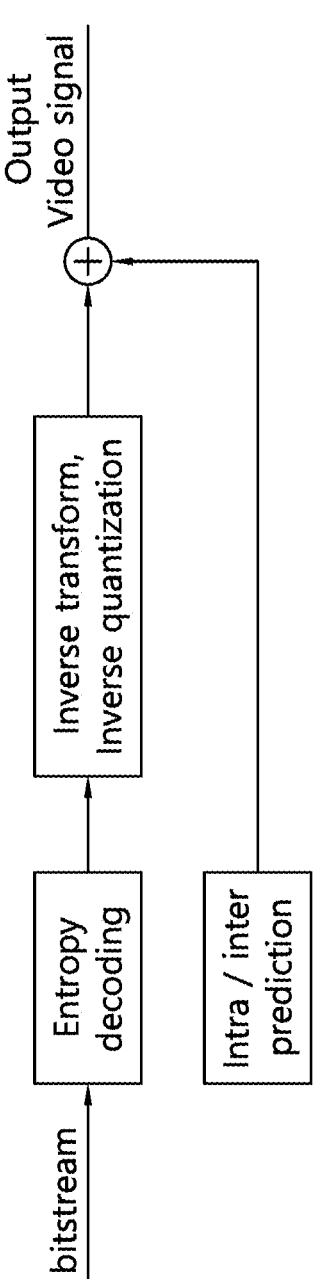
FIG. 5 illustrates an example of a video coding method performed by a decoding apparatus.

FIG. 5 illustrates an example of a video coding method performed by a decoding apparatus.

Referring to FIG. 5, the image coding method may include entropy decoding, inverse quantization, inverse transform and intra/inter prediction processes. For example, the decoding apparatus may perform processes opposite those of the aforementioned encoding method. Specifically, quantized transform coefficients may be obtained through entropy decoding for a bitstream. A coefficient block of a current block, that is, transform coefficients, may be obtained through an inverse quantization process for the quantized transform coefficients. A residual block of the current block may be derived through an inverse transform for the transform coefficients. A reconstructed block of the current block may be derived through the addition of a prediction block of the current block, derived through an intra/inter prediction, and the residual block.

Meanwhile, if an intra prediction is performed, a correlation between samples may be used, and a difference between the original block and a prediction block, that is, a residual, may be obtained. The aforementioned transform and quantization may be applied to the residual. Accordingly, spatial redundancy can be reduced. Hereinafter, an encoding method and a decoding method using an intra prediction are specifically described.

An intra prediction refers to a prediction for generating prediction samples for a current block based on reference samples outside the current block within a picture (hereinafter a current picture) including the current block. In this case, the reference samples outside the current block may refer to samples located in the periphery of the current block. If an intra prediction is applied to the current block, neighboring reference samples to be used for the intra prediction of the current block may be derived.

For example, when the size (width×height) of a current block is nW×nH, neighboring reference samples of the current block may include a sample neighboring the left boundary and a total of 2×nH samples neighboring the bottom left of the current block, a sample neighboring the top boundary and a total of 2×nW samples neighboring the top right of the current block, and one sample neighboring the left top of the current block. Alternatively, neighboring reference samples of a current block may also include a plurality of columns of top neighboring samples and a plurality of rows of left neighboring samples. Furthermore, neighboring reference samples of a current block may also include a total of nH samples neighboring the right boundary of the current block having an nW×nH size, a total of nW samples neighboring the bottom boundary of the current block and one sample neighboring the bottom right of the current block.

In this case, some of the neighboring reference samples of the current block have not been decoded or may not be available. In this case, the decoding apparatus may configure neighboring reference samples to be used for a prediction by substituting unavailable samples with available samples. Alternatively, neighboring reference samples to be used for a prediction may be configured through the interpolation of available samples.

If neighboring reference samples are derived, (i) a prediction sample may be derived based on an average or interpolation of the neighboring reference samples of a current block, and (ii) a prediction sample may be derived based on a reference sample present in a specific (prediction) direction for the prediction sample among neighboring reference samples of a current block. (i) may be applied when an intra prediction mode is a non-directional mode or a non-angular mode. (ii) may be applied when an intra prediction mode is a directional mode or an angular mode.

Furthermore, a prediction sample may be generated through interpolation between a first neighboring sample, located in the prediction direction of an intra prediction mode of a current block, and a second neighboring sample corresponding to the first neighboring sample based on a prediction sample of the current block among neighboring reference samples. The second neighboring sample may be a sample located in a direction opposite the prediction direction of the intra prediction mode of the current block. The above case may be called a linear interpolation intra prediction (LIP). Furthermore, a temporary prediction sample of a current block may be derived based on filtered neighboring reference samples. A prediction sample of the current block may be derived by weighted-summing at least one reference sample, derived based on an intra prediction mode, and the temporary prediction sample among the existing neighboring reference samples, that is, not-filtered neighboring reference samples. The above case may be called a position dependent intra prediction (PDCP). Meanwhile, post-filtering for the derived prediction sample may be performed, if necessary.

Specifically, an intra prediction procedure may include an intra prediction mode determination step, a neighboring reference sample derivation step, and an intra prediction mode-based prediction sample derivation step. Furthermore, a post-filtering step for a derived prediction sample may be performed, if necessary.

Figure 6:
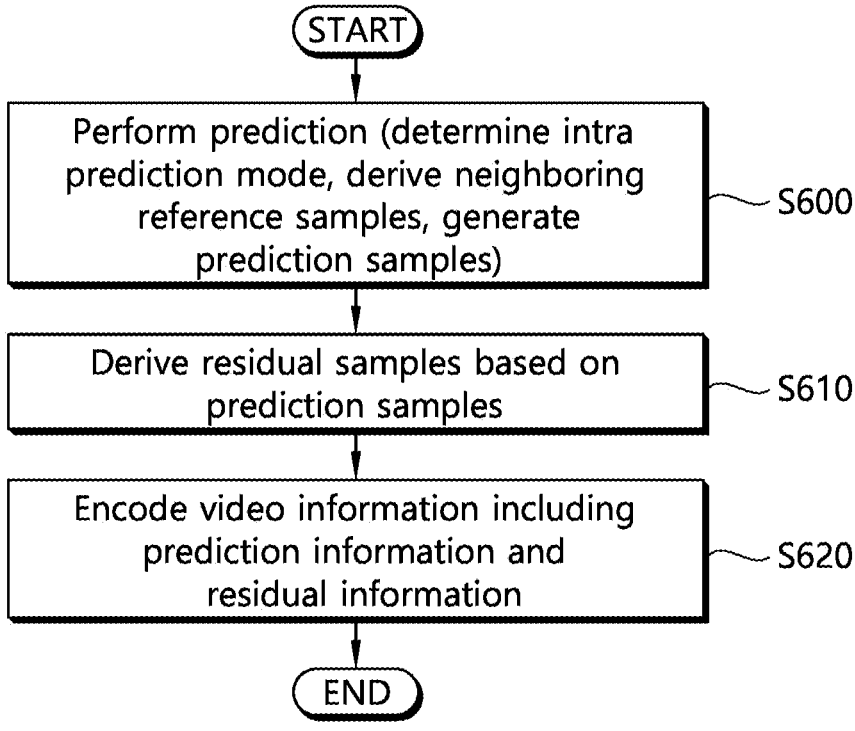
FIG. 6 illustrates an example of an image encoding method based on an intra prediction, and FIG. 7 schematically illustrates an intra predictor within the encoding apparatus.
Figure 7:
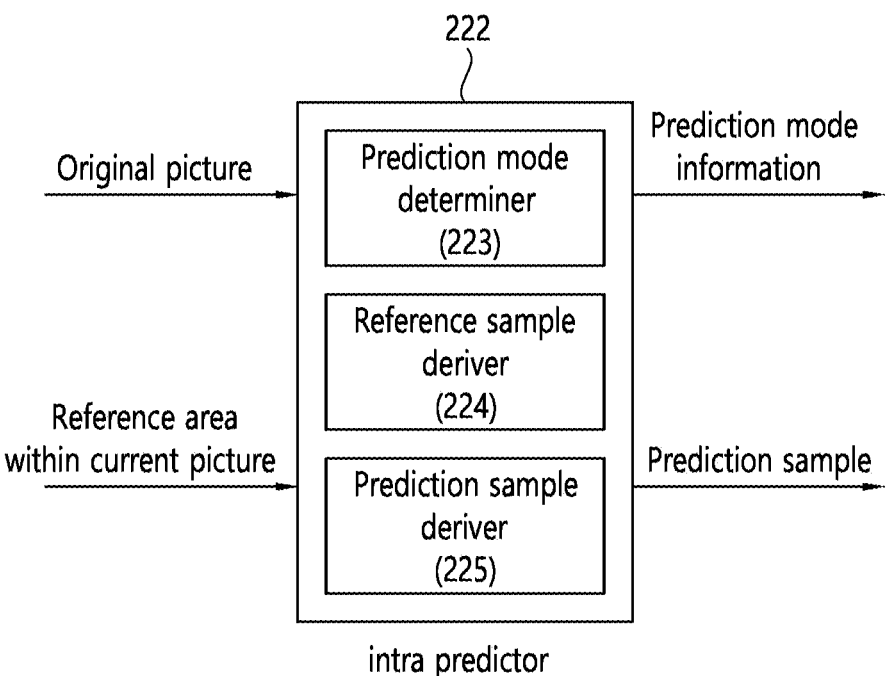

FIG. 6 illustrates an example of an image encoding method based on an intra prediction, and FIG. 7 schematically illustrates an intra predictor within the encoding apparatus. The intra predictor within the encoding apparatus in FIG. 7 may be applied to the intra predictor (222) of the encoding apparatus (200) in FIG. 2 identically or in a corresponding way.

Referring to FIGS. 6 and 7, step S600 may be performed by the intra predictor (222) of the encoding apparatus. Step S610 may be performed by the residual processor (230) of the encoding apparatus. Specifically, step S610 may be performed by the subtractor (231) of the encoding apparatus. At step S620, prediction information may be derived by the intra predictor (222) and may be encoded by the entropy encoder (240). At step S620, residual information may be derived by the residual processor (230) and may be encoded by the entropy encoder (240). The residual information is information related to residual samples. The residual information may include information related to quantized transform coefficients for the residual samples. As described above, the residual samples may be derived as transform coefficients through the transformer (232) of the encoding apparatus. The transform coefficients may be derived as quantized transform coefficients through the quantizer (233). Information related to the quantized transform coefficients may be encoded by the entropy encoder (240) through a residual coding procedure.

The encoding apparatus may perform an intra prediction for a current block (S600). The encoding apparatus may derive an intra prediction mode of the current block, may derive neighboring reference samples of the current block, and may generate prediction samples within the current block based on the intra prediction mode and the neighboring reference samples. In this case, the intra prediction mode determination, neighboring reference sample derivation and prediction sample generation procedures may be performed may be performed or any one procedure may be performed prior to another procedure.

In one embodiment, the intra predictor (222) of the encoding apparatus may include a prediction mode determiner (223), a reference sample deriver (224), and a prediction sample deriver (225). The prediction mode determiner (223) may determine an intra prediction mode for a current block. The reference sample deriver (224) may derive neighboring reference samples of the current block. The prediction sample deriver (225) may derive prediction samples of the current block. Meanwhile, although not illustrated, if a prediction sample filtering procedure to be described later is performed, the intra predictor (222) may further include a prediction sample filter unit (not illustrated). The encoding apparatus may determine a mode applied to a current block among a plurality of intra prediction modes. The encoding apparatus may compare RD costs for the intra prediction modes, and may determine the best intra prediction mode of the current block.

As described above, the encoding apparatus may perform a prediction sample filtering procedure. The prediction sample filtering may be called post filtering. Some or all of prediction samples may be filtered by the prediction sample filtering procedure. The prediction sample filtering procedure may be omitted according to circumstances.

The encoding apparatus may generate residual samples for the current block based on (filtered) prediction samples (S610). The encoding apparatus may encode image information, including prediction mode information indicative of the intra prediction mode and residual information related to the residual samples (S620). The encoded image information may be output in a bitstream form. The output bitstream may be transmitted to the decoding apparatus through a storage medium over a network.

As described above, the encoding apparatus may generate a reconstructed picture (including reconstructed samples and a reconstructed block) based on prediction samples and residual samples. This is for deriving, by the encoding apparatus, the same prediction results as those performed in the decoding apparatus. The reason for this is that coding efficiency can be enhanced. Furthermore, as described above, an in-loop filtering procedure may be further applied to the reconstructed picture.

Figure 8:
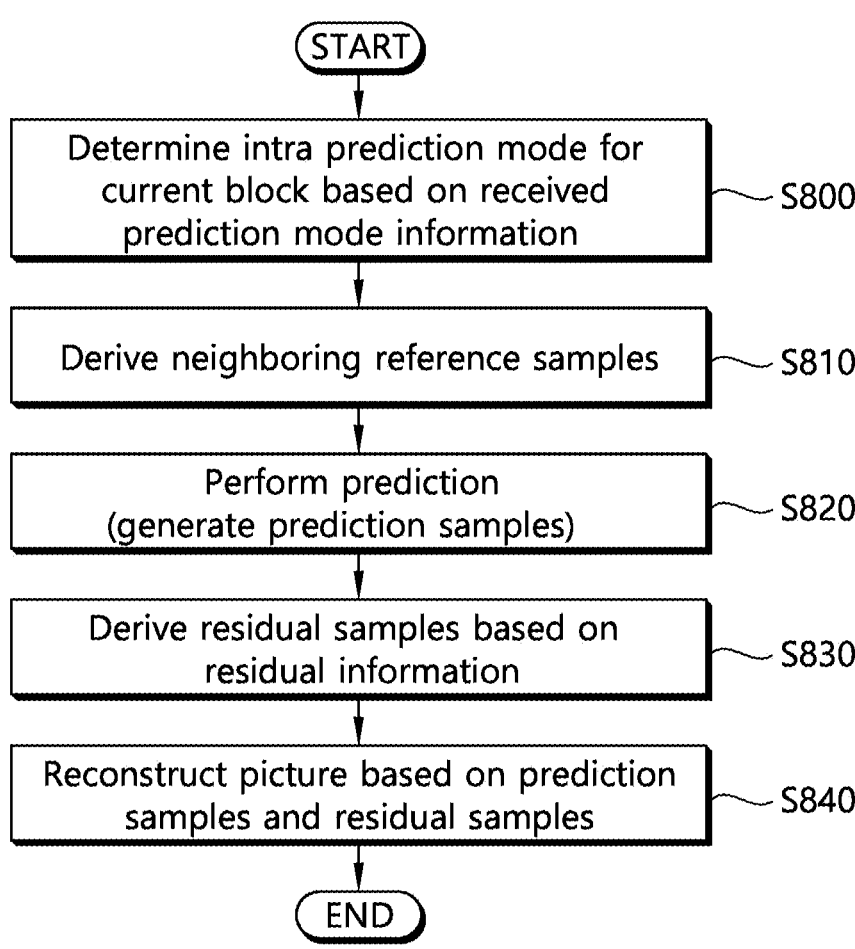
FIG. 8 illustrates an example of a video coding method based on an intra prediction, and FIG. 9 schematically illustrates an intra predictor within the decoding apparatus.
Figure 9:
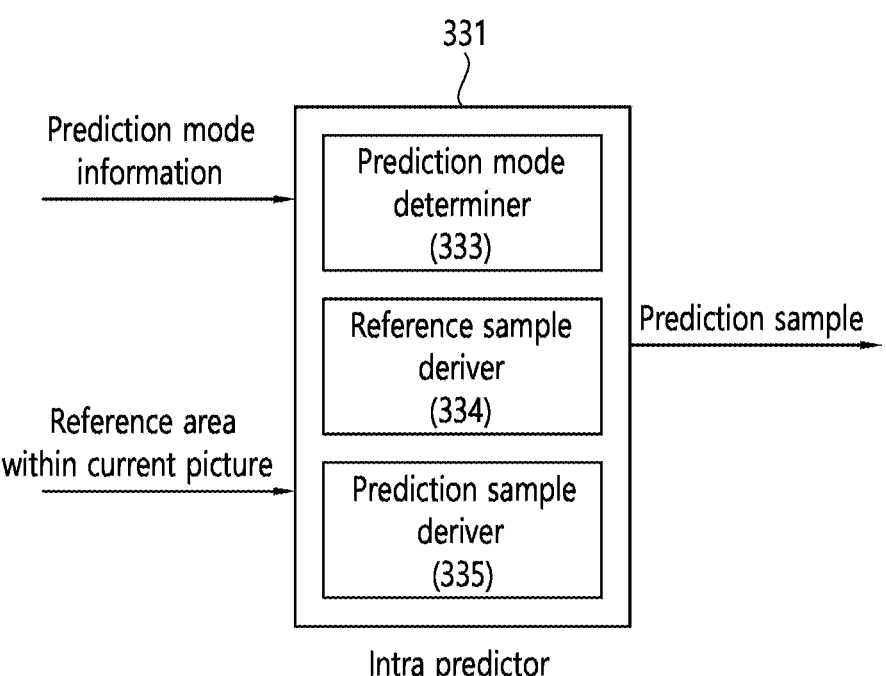

FIG. 8 illustrates an example of a video coding method based on an intra prediction, and FIG. 9 schematically illustrates an intra predictor within the decoding apparatus. An intra predictor within the decoding apparatus in FIG. 9 may be applied to the intra predictor (331) of the decoding apparatus (300) in FIG. 3 identically or in a corresponding way.

Referring to FIGS. 8 and 9, the decoding apparatus may perform operations corresponding to the operations performed in the encoding apparatus. The decoding apparatus may perform a prediction on a current block and derive prediction samples based on received prediction information.

Steps S800 to S820 may be performed by the intra predictor (331) of the decoding apparatus. In step S830, residual information may be obtained from a bitstream by the entropy decoder (310) of the decoding apparatus. The residual processor (320) of the decoding apparatus may derive residual samples for a current block based on the residual information. Specifically, the dequantizer (321) of the residual processor may derive transform coefficients by performing inverse quantization based on quantized transform coefficients derived based on residual information. The inverse transformer (322) of the residual processor (320) may derive residual samples for the current block by performing an inverse transform for the transform coefficients. Step S840 may be performed by the adder (340) or reconstructor of the decoding apparatus.

The decoding apparatus may derive an intra prediction mode for a current block based on received prediction mode information (S800). The decoding apparatus may derive neighboring reference samples of the current block (S810). The decoding apparatus may generate prediction samples within a current block based on the intra prediction mode and the neighboring reference samples (S820). In this case, the decoding apparatus may perform a prediction sample filtering procedure. The prediction sample filtering may be called post filtering. Some or all of the prediction samples may be filtered by the prediction sample filtering procedure. The prediction sample filtering procedure may be omitted according to circumstances.

The decoding apparatus may generate residual samples for the current block based on the received residual information (S830). The decoding apparatus may generate reconstructed samples for the current block based on (filtered) prediction samples and the residual samples, and may generate a reconstructed picture based on the reconstructed samples (S840).

In one embodiment, the intra predictor (331) of the decoding apparatus may include a prediction mode determiner (333), a reference sample deriver (334), and a prediction sample deriver (335). The prediction mode determiner (333) may determine an intra prediction mode for a current block based on prediction mode information received from the prediction mode determiner (223) of the encoding apparatus. The reference sample deriver (334) may derive neighboring reference samples of the current block. The prediction sample deriver (335) may derive prediction samples of the current block. Meanwhile, although not illustrated, if the prediction sample filtering procedure is performed, the intra predictor (331) may further include a prediction sample filter unit (not illustrated).

Meanwhile, in performing an intra prediction, prediction mode information may be determined depending on whether a most probable mode (MPM) is applied to a current block. For example, the prediction mode information may include flag information (e.g., prev_intra_luma_pred_flag) indicating whether a most probable mode (MPM) is applied or a remaining mode is applied to a current block. If the MPM is applied to the current block, the prediction mode information may further include index information (e.g., mpm_idx) indicative of one of intra prediction mode candidates (MPM candidates). In this case, the intra prediction mode candidates (MPM candidates) may be configured as an MPM candidate list or an MPM list. Furthermore, if the MPM is not applied to the current block, the prediction mode information may further include remaining mode information (e.g., rem_inra_luma_pred_mode) indicative of one of the remaining intra prediction modes except intra prediction mode candidates (MPM candidates). The decoding apparatus may determine an intra prediction mode of the current block based on the prediction mode information. In this case, the prediction mode information may be encoded/decoded through a coding method to be described later. For example, the prediction mode information may be encoded/decoded through entropy coding (e.g., CABAC, CAVLC) based on a truncated (rice) binary code.

Furthermore, if an intra prediction is applied, in determining prediction mode information, an intra prediction mode applied to a current block may be determined using an intra prediction mode of a neighboring block. For example, the decoding apparatus may derive most probable mode (MPM) candidates based on an intra prediction mode of a left block and intra prediction mode of a top block of a current block, and may select one of the MPM candidates based on an MPM index (e.g., mpm_idx). Alternatively, the decoding apparatus may select one of the remaining intra prediction modes, not included in the MPM candidates, based on remaining intra prediction mode information (e.g., rem_inra_luma_pred_mode). The MPM index may be signaled in the form of an mpm_idx syntax element. The remaining intra prediction mode information may be signaled in the form of a rem_intra_luma_pred_mode syntax element. For example, the remaining intra prediction mode information may indicate one of the remaining intra prediction modes which are not included in the MPM candidates among all of intra prediction modes and which are indexed in order of a prediction mode number.

An intra prediction mode may include non-directional (or non-angular) intra prediction modes and directional (or angular) intra prediction modes. For example, in the HEVC standard, intra prediction modes including 2 non-directional prediction modes and 33 directional prediction modes are used. The non-directional prediction modes may include a planar intra prediction mode, that is, No. 0, and a DC intra prediction mode, that is, No. 1. The directional prediction modes may include No. 2 to No. 34 intra prediction modes. The planar mode intra prediction mode may be called a planar mode, and the DC intra prediction mode may be called a DC mode.

Figure 10:
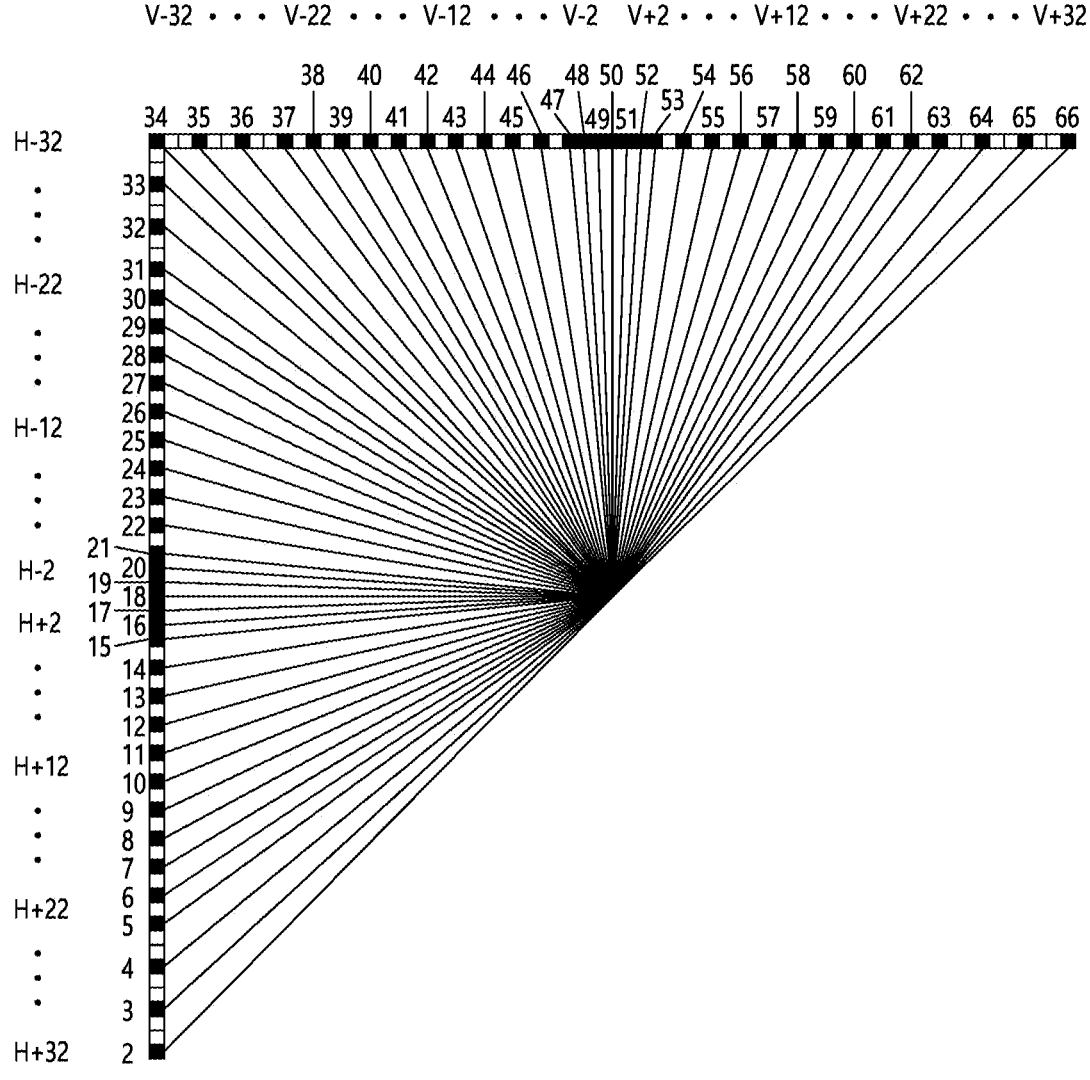
FIG. 10 illustrates 65 directional intra prediction modes.

Alternatively, in order to capture a given edge direction proposed in natural video, the directional intra prediction modes may be extended from the existing 33 modes to 65 modes as in FIG. 10. In this case, the intra prediction modes may include 2 non-directional intra prediction modes and 65 directional intra prediction modes. The non-directional intra prediction modes may include a planar intra prediction mode, that is, No. 0, and a DC intra prediction mode, that is, No. 1. The directional intra prediction modes may include Nos. 2 to 66 intra prediction modes. The extended directional intra prediction modes may be applied to blocks having all sizes, and may be applied to both a luma component and a chroma component. However, this is an example, and embodiments of this specification may be applied to a case where the number of intra prediction modes is different. A No. 67 intra prediction mode according to circumstances may be further used. The No. 67 intra prediction mode may indicate a linear model (LM) mode.

FIG. 10 illustrates 65 directional intra prediction modes.

Referring to FIG. 10, modes may be divided into intra prediction modes having horizontal directionality and intra prediction modes having vertical directionality based on a No. 34 intra prediction mode having a top left diagonal prediction direction. In FIG. 10, H and V mean horizontal directionality and vertical directionality, respectively. Each of numbers −32~32 indicate displacement of a $\frac{1}{32}$ unit on a sample grid position. The Nos. 2 to 33 intra prediction modes have horizontal directionality, and the Nos. 34 to 66 intra prediction modes have vertical directionality. The No. 18 intra prediction mode and the No. 50 intra prediction mode indicate a horizontal intra prediction mode and a vertical intra prediction mode, respectively. The No. 2 intra prediction mode may be called a bottom left diagonal intra prediction mode, the No. 34 intra prediction mode may be called a top left diagonal intra prediction mode, and the No. 66 intra prediction mode may be called a top right diagonal intra prediction mode.

As described above, in general, if block partitioning for a picture is performed, a current block and a neighboring block to be coded have similar image characteristics. Accordingly, there is a good probability that the current block and the neighboring block will have the same or similar intra prediction mode. According to such image characteristics, an intra prediction mode of a current block may be derived using an intra prediction mode of a neighboring block. This may be referred to as a most probable mode (MPM). That is, the MPM may mean a mode used to enhance coding efficiency by considering similarity between a current block and a neighboring block upon intra prediction mode coding.

For example, the encoding/decoding apparatus may configure a most probable mode (MPM) list for a current block. The MPM list may be indicated as an MPM candidate list. In this case, an MPM list including given MPM candidates may be configured by considering complexity in generating the MPM list. For example, an MPM list may include 3 MPM candidates, 5 candidates or 6 MPM candidates. In one embodiment, an MPM list may include MPM candidates derived based on an intra prediction mode of a neighboring block, a derived intra prediction mode and/or a default intra prediction mode. In this case, in deriving MPM candidates from the neighboring block, the encoding apparatus/decoding apparatus may derive an intra prediction mode of the neighboring block by searching neighboring blocks of a current block according to a specific order, and may use the intra prediction mode of the neighboring block as an MPM candidate based on the derived order. For example, the neighboring blocks may include at least one of the left neighboring block, top neighboring block, bottom left neighboring block, top right neighboring block, and top-left neighboring block of the current block. If an intra prediction mode of the current block is not included among the MPM candidates within the MPM list, a remaining mode may be used. In this case, the remaining mode is a mode using the remaining intra prediction modes except the MPM candidates, among all of intra prediction modes, and may code and signal remaining intra prediction mode information. The remaining intra prediction mode information may be information indicative of an intra prediction mode applied to a current block, among the remaining intra prediction modes except the MPM candidates. For example, if 67 intra prediction modes are used, the remaining intra prediction mode information may include a 6-bit syntax element (e.g., rem_intra_luma_pred_mode syntax element).

As described above, in the HEVC standard, 35 intra prediction modes are used upon intra prediction. In this case, an MPM list including 3 MPM candidates is configured. In this case, the 3 MPM candidates may be derived based on intra prediction modes of a neighboring block F and neighboring block G. Neighboring blocks of a current block including the neighboring block F and the neighboring block G may be the same as those described above.

Figure 11:
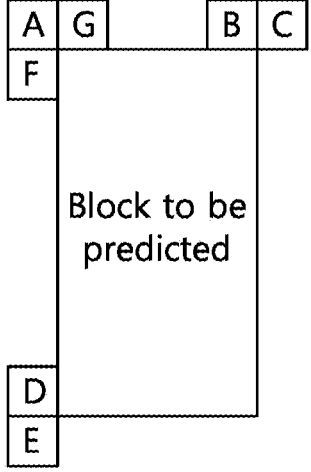
FIG. 11 illustrates neighboring blocks of a current block.

FIG. 11 illustrates neighboring blocks of a current block.

Referring to FIG. 11, neighboring blocks of a current block may include a neighboring block A, a neighboring block B, a neighboring block C, a neighboring block D, a neighboring block E, a neighboring block F and/or a neighboring block G.

In this case, the neighboring block A may indicate a neighboring block located on the top left side of a top-left sample position of a current block. The neighboring block B may indicate a neighboring block located on the upper side of a top right sample position of the current block. The neighboring block C may indicate a neighboring block located on the top right side of a top right sample position of the current block. The neighboring block D may indicate a neighboring block located on the left side of a bottom left sample position of the current block. The neighboring block E may indicate a neighboring block located on the bottom left of a bottom left sample position of the current block. The neighboring block G may indicate a neighboring block located on the upper side of a top-left sample position of the current block. The neighboring block F may indicate a neighboring block located on the left side of a top-left sample position of the current block.

For example, if the size of a current block is W×H and the x component and y component of the top-left sample position of the current block are 0, the neighboring block A may be a block including a sample at (−1, −1) coordinates, the neighboring block B may be a block including a sample at (W−1, −1) coordinates, the neighboring block C may be a block including a sample at (W, −1) coordinates, the neighboring block D may be a block including a sample at (−1, H−1) coordinates, the neighboring block E may be a block including a sample at (−1, H) coordinates, the neighboring block F may be a block including a sample at (−1, 0) coordinates, and the neighboring block G may be a block including a sample at (0, −1) coordinates.

According to the HEVC standard, 3 MPM candidates may be derived based on an intra prediction mode of the neighboring block F and an intra prediction mode of the neighboring block G. For example, the intra prediction mode of the neighboring block F and the intra prediction mode of the neighboring block G may be derived. Meanwhile, in the following case, an intra prediction mode of the neighboring block F or an intra prediction mode of the neighboring block G may be derived as a DC intra prediction mode.

1) If the neighboring block F or the neighboring block G is not available

2) If the neighboring block F or the neighboring block G is not coded as an intra prediction mode (i.e., if the neighboring block F or the neighboring block G is not an intra coded block)

3) If the neighboring block F or the neighboring block G is out of a current coding tree unit (CTU)

If an intra prediction mode of the neighboring block F or an intra prediction mode of the neighboring block G is determined as described above, 3 MPM candidates may be derived like Table 1.

TABLE 1

```
if (intra mode of F and G are equal)
{
    if (intra mode of F < intra mode 2)
    { MPM list1 }
    else
    { MPM list2 }
}
else
{
    if (Neither intra mode of F nor G are intra mode Planar)
    { MPM list3 }
    else if (intra mode of (F+G) <intra mode 2)
    { MPM list4 }
    else
    { MPM list5 }
}
```

Table 1 illustrates a schematic algorithm (i.e., pseudo code) for configuring an MPM list. Referring to Table 1, whether the intra prediction mode of the neighboring block F and the intra prediction mode of the neighboring block G are equal may be determined.

If an intra prediction mode of the neighboring block F and an intra prediction mode of the neighboring block G are equal and the mode number of an intra prediction mode of the neighboring block F is smaller than 2, the MPM list of the current block may be derived as an MPM list 1 (MPM list1). That is, if an intra prediction mode of the neighboring block F and an intra prediction mode of the neighboring block G are equal and the intra prediction mode of the neighboring block F is the intra prediction mode of the mode number 0 or the intra prediction mode of the mode number 1, the MPM list of the current block may be derived as the MPM list 1. In this case, the MPM list 1 may indicate an MPM list configured with MPM candidates {F, F−1, F+1}. F may indicate the intra prediction mode of the neighboring block F. F−1 may indicate an intra prediction mode in which a value obtained by subtracting 1 from the mode number of an intra prediction mode of the neighboring block F is a mode number. F+1 may indicate an intra prediction mode in which a value obtained by adding 1 to the mode number of an intra prediction mode of the neighboring block F is a mode number. For example, if the intra prediction mode of the neighboring block F is the intra prediction mode of the mode number N, the MPM list 1 may be configured with an MPM list, including the intra prediction mode of the mode number N, the intra prediction mode of the mode number N−1, and the intra prediction mode of the mode number N+1 as MPM candidates.

Furthermore, if an intra prediction mode of the neighboring block F and an intra prediction mode of the neighboring block G are equal and the mode number of an intra prediction mode of the neighboring block F is not smaller than 2, the MPM list of the current block may be derived as an MPM list 2 (MPM list2).

Furthermore, if an intra prediction mode of the neighboring block F and an intra prediction mode of the neighboring block G are not equal and the intra prediction mode of the neighboring block F and the intra prediction mode of the neighboring block G are not planar mode intra prediction modes, the MPM list of the current block may be derived as an MPM list 3 (MPM list3).

Furthermore, if an intra prediction mode of the neighboring block F and an intra prediction mode of the neighboring block G are not equal and the sum of the mode number of an intra prediction mode of the neighboring block F and the mode number of an intra prediction mode of the neighboring block G is smaller than 2, the MPM list of the current block may be derived as an MPM list 4 (MPM list4).

Furthermore, if an intra prediction mode of the neighboring block F and an intra prediction mode of the neighboring block G are not equal and at least one of the intra prediction mode of the neighboring block F and the intra prediction mode of the neighboring block G is a planar mode intra prediction mode and the sum of the mode number of an intra prediction mode of the neighboring block F and the mode number of an intra prediction mode of the neighboring block G is not smaller than 2, the MPM list of the current block may be derived as an MPM list 5 (MPM list5).

Meanwhile, as the number of intra prediction modes increases, the number of MPM candidates needs to be increased. Accordingly, the number of MPM candidates may be different depending on the number of intra prediction modes. In general, when the number of intra prediction modes increases, the number of MPM candidates may increase. However, the number of MPM candidates does not always increase when the number of intra prediction modes increases. For example, if 35 intra prediction modes are present or if 67 intra prediction modes are present, various numbers of MPM candidates, such as 3, 4, 5, and 6, may be present depending on the design.

For example, a 6-MPM list configuration may be performed. That is, an MPM list including 6 MPM candidates may be configured. For example, in the 6-MPM list configuration, a process of searching for the locations of various neighboring blocks and a consistent pruning check process for excluding the same intra prediction mode may be performed. For example, the order in which 6 MPM candidates are configured may be as follows:

The neighboring block D, the neighboring block B, the planar mode intra prediction mode, the DC intra prediction mode, the neighboring block E, the neighboring block C, and the neighboring block A.

That is, neighboring blocks may be derived as MPM candidate in order of an intra prediction mode of the neighboring block D, an intra prediction mode of the neighboring block B, the planar mode intra prediction mode, the DC intra prediction mode, an intra prediction mode of the neighboring block E, an intra prediction mode of the neighboring block C, and an intra prediction mode of the neighboring block A. If a prediction mode is the same as an already derived intra prediction mode, it may not be derived as an MPM candidate.

Furthermore, if an MPM list does not include an MPM candidate having a maximum number of candidates, that is, when the number of derived MPM candidates is smaller than a maximum number of candidates, a directional intra prediction mode neighboring a derived MPM candidate and a pre-defined default intra prediction mode may be considered as MPM candidates, and a pruning check process may be performed. In this case, the directional intra prediction mode neighboring the MPM candidate may indicate an intra prediction mode having a mode number neighboring that of the MPM candidate. The neighboring block search and the consistent pruning check have an advantage in the reduction of a bit transfer rate, but may increase the number of hardware operation cycles for the MPM list configuration of each block. The worst scenario is that a 3840×2160 4K image may be partitioned into 4×4 size blocks for an intra prediction. In this case, an increased hardware operation cycle for each of the 4×4 size blocks may be importantly considered in throughput. Meanwhile, if a neighboring block coded through an inter prediction is aware of an intra prediction mode of the neighboring block, the intra prediction mode of the neighboring block may be used for an MPM list configuration.

As described above, in configuring an MPM list, the encoding apparatus may determine the best intra prediction mode by optimizing the bit rate and distortion at the same time, and may code the determined best intra prediction mode as a bitstream. The decoding apparatus may parse (decode) the intra prediction mode included in the bitstream, and may perform an intra prediction based on the parsed intra prediction mode. However, in order to minimize signaling overhead as the number of intra prediction modes increases, efficient intra mode coding is necessary. Both the encoding apparatus and the decoding apparatus configure MPM lists using neighboring intra prediction modes of coded blocks. In this case, when the best intra prediction mode is one of candidates within the MPM list, overhead can be minimized by signaling an MPM index. The length of the MPM list and the method of configuring the MPM list may be different depending on an algorithm.

In this case, if the 67 intra prediction modes are used for an intra prediction, the MPM list including the existing 3 MPM candidates may not be sufficient to show the diversity of multiple intra prediction modes. Furthermore, a 6-MPM list configuration scheme including neighboring block search and a pruning check process may affect throughput because it is too complicated. Accordingly, embodiments of this specification propose efficient the MPM list configuration method having a proper balance between complexity and coding efficiency.

Figure 12:
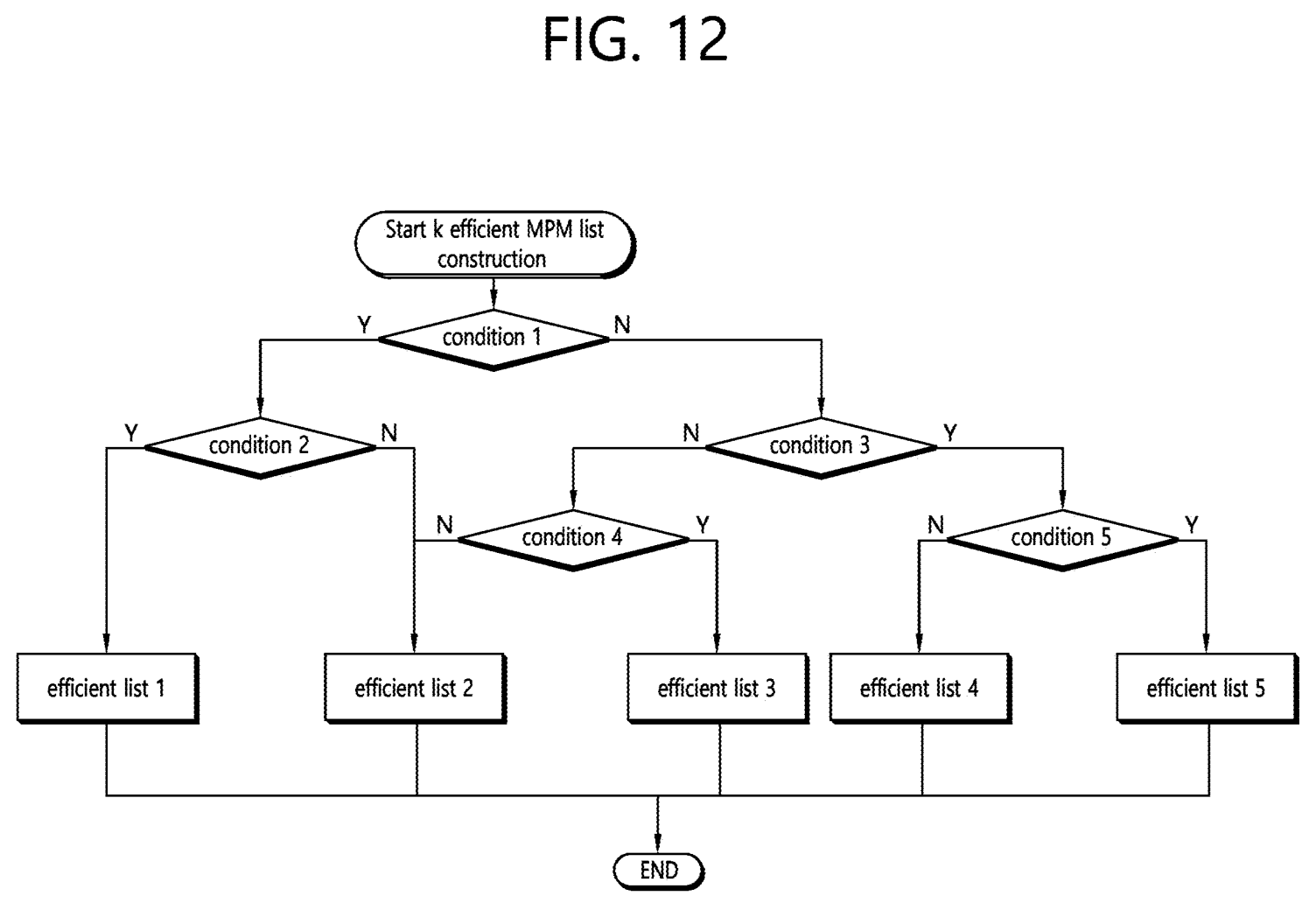
Figure 13:
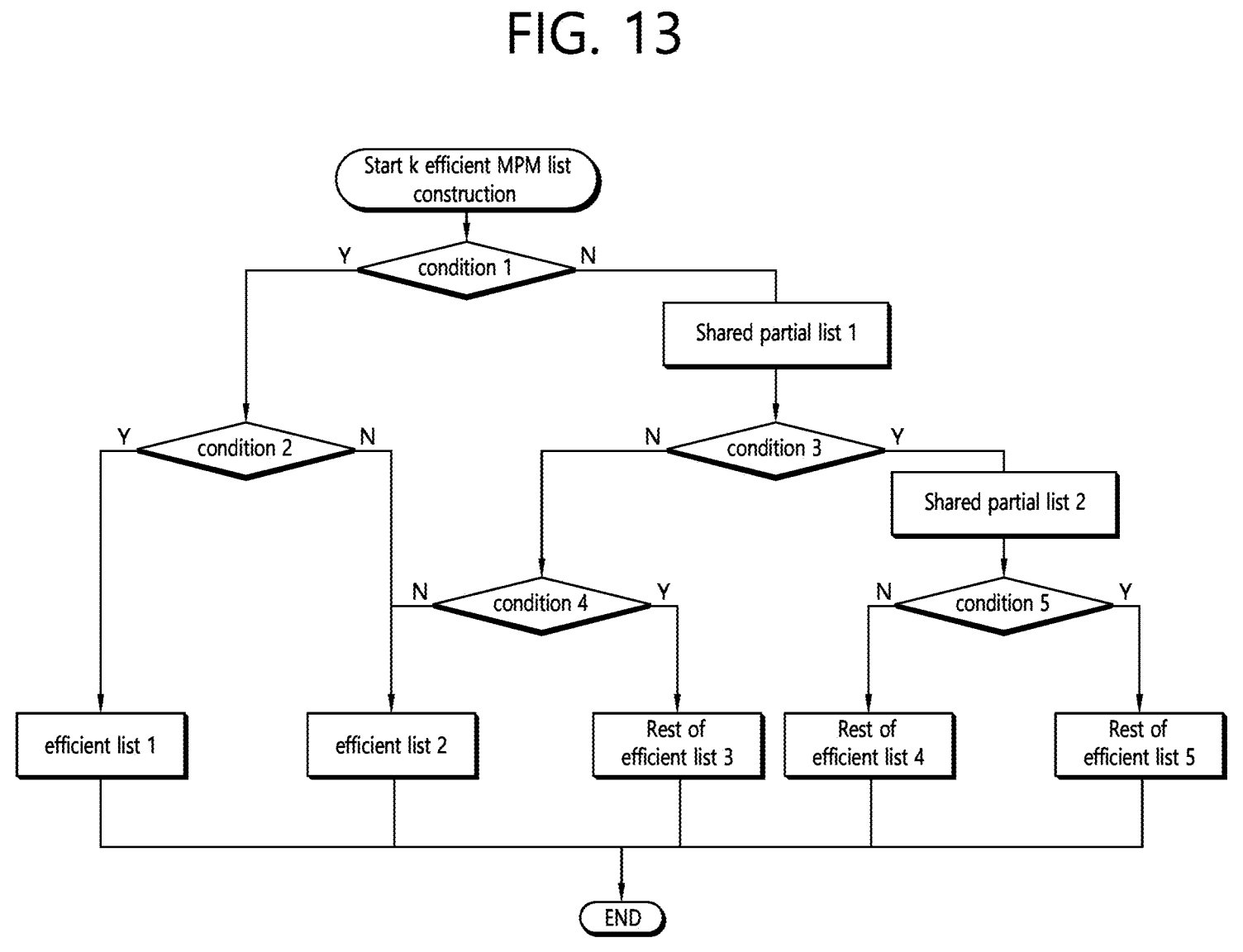

FIGS. 12 and 13 are flowcharts schematically illustrating a method of configuring an MPM list for a current block.

Referring to FIGS. 12 and 13, an MPM list for a current block including k MPM candidates may be configured. In this case, k may indicate the length of the MPM list, that is, the number of MPM candidates included in the MPM list. According to the embodiments disclosed in FIGS. 12 and 13, 5 efficient MPM lists (MPM list 1~MPM list 5) may be configured based on five conditions. That is, one of the 5 MPM lists may be derived as an MPM list for the current block based on the five conditions. The MPM lists may be independent lists as illustrated in FIG. 12, and may be lists having partially shared portions as illustrated in FIG. 13. If a partial list shared as in FIG. 13 is used, a duplication process can be avoided. The conditions 5 may be modeled so that the sum of the probabilities of all the conditions become 1.

Figure 14:
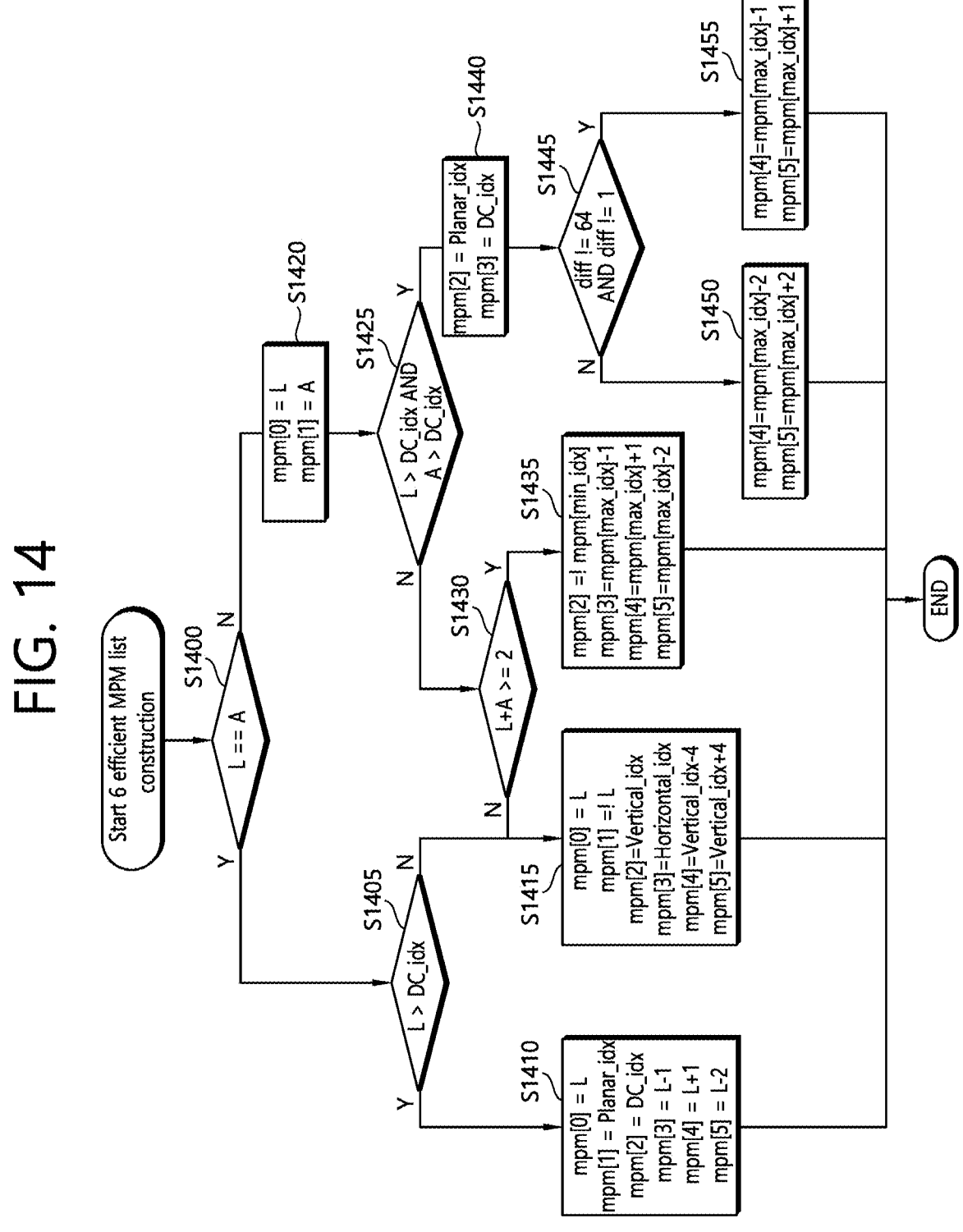
FIG. 14 is a flowchart illustrating an embodiment of a method of configuring an MPM list for a current block.

FIG. 14 is a flowchart illustrating an embodiment of a method of configuring an MPM list for a current block.

FIG. 14 illustrates a method of efficiently configuring an MPM list for a current block including k MPM candidates based on a neighboring block located adjacent to the current block. For example, k may be 6, and five conditions may be used in order to configure an MPM list for the current block among 5 efficient lists. In FIG. 14, L may indicate an intra prediction mode of the neighboring block B illustrated in FIG. 11, and A may indicate an intra prediction mode of the neighboring block D illustrated in FIG. 11. Alternatively, in contrast, L may indicate an intra prediction mode of the neighboring block D illustrated in FIG. 11, and A may indicate an intra prediction mode of the neighboring block B illustrated in FIG. 11. In FIG. 14, a symbol "!" is a negative logic operator, and may refer to an operator "not" that converts a value that is not true into a true value, and the vice versa. For example, !7 may indicate a value 0, and !0 may indicate a value 1.

Referring to FIG. 14, the encoding/decoding apparatus may check a condition 1 for determining whether L and A are equal (S1400). That is, the encoding/decoding apparatus may determine whether L and A are the same intra prediction mode. The condition 1 may be a condition for determining whether "L==A".

If L and A are the same intra prediction mode (i.e., when the condition 1 is satisfied), the encoding/decoding apparatus may check a condition 2 for determining whether L (or A) is a directional intra prediction mode (S1405). That is, the encoding/decoding apparatus may determine whether L and A are equal and the mode number of L (or A) is greater than the mode number of a DC mode. The condition 2 may be a condition for determining whether "L>DC_idx".

When the condition 2 is satisfied, the encoding/decoding apparatus may derive an MPM list 1 as an MPM list for the current block (S1410). When the condition 2 is not satisfied, the encoding/decoding apparatus may derive an MPM list 2 as an MPM list for the current block (S1415).

In this case, the MPM list 1 may be configured like Table 2, and the MPM list 2 may be configured like Table 3.

TABLE 2

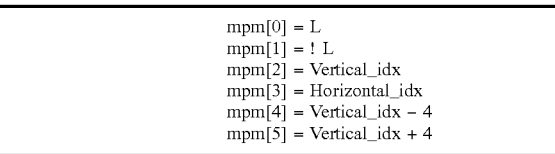

| mpm[0] = L |
| mpm[2] = Planar_idx |
| mpm[3] = DC_idx |
| mpm[3] = L − 1 |
| mpm[4] = L + 1 |
| mpm[5] = L − 2 |

TABLE 3

| mpm[0] = L |
| mpm[1] = ! L |
| mpm[2] = Vertical_idx |
| mpm[3] = Horizontal_idx |
| mpm[4] = Vertical_idx − 4 |
| mpm[5] = Vertical_idx + 4 |

Referring to Table 2 and Table 3, the MPM list 1 may include a first MPM candidate (mpm[0]) to a sixth MPM candidate (mpm[5]) as in Table 2, The MPM list 2 may include a first MPM candidate (mpm[0]) to a sixth MPM candidate (mpm[5]) as in Table 3. In this case, the first to sixth MPM candidates may indicate intra prediction modes (i.e., mode numbers) indicated by respective MPM index values 0 to 5. For example, the first MPM candidate indicates an intra prediction mode assigned to mpm[0], and may be indicated the value 0 of an MPM index.

If L and A are not the same intra prediction mode (i.e., when the condition 1 is not satisfied), the encoding/decoding apparatus may derive a partially shared MPM list 1 (S1420).

In this case, the partially shared MPM list 1 may be configured like Table 4.

TABLE 4 mpm[0] = L
mpm[1] = A
If L > A, max_idx is 0 and min_idx is 1.
Otherwise, max_idx is 1 and min_idx is 0.

Referring to Table 4, the partially shared MPM list 1 may include a first MPM candidate (mpm[0]) indicative of L and a second MPM candidate (mpm[1]) indicative of A. That is, if L and A are not equal, the encoding/decoding apparatus may first add L and A to the MPM list. Accordingly, MPM lists 3, 4, and 5 to be described later may be configured to partially include the first MPM candidate (mpm[0]) and the second MPM candidate (mpm[1]) as in Table 4. In this case, in deriving the first MPM candidate (mpm[0]) and the second MPM candidate (mpm[1]), an MPM index order may be determined by comparing the sizes of the mode numbers of L and A. For example, referring to Table 4, when L has a greater mode number than A, a max_idx value indicative of L may be set to 0, and a min_idx value indicative of A may be set to 1. When L has a smaller mode number than A, max_idx and min_idx values may be inversely set.

Next, the encoding/decoding apparatus may check a condition 3 for determining whether both L and A are directional intra prediction modes (S1425). That is, the encoding/decoding apparatus may determine whether L and A are not equal and the mode number of each of L and A is greater than a DC mode number. The condition 3 may be a condition for determining whether "L>DC_idx AND A>DC_idx".

If each of L and A has a greater mode number than the DC mode (i.e., when the condition 3 is satisfied), the encoding/decoding apparatus may derive a partially shared MPM list 2 (S1440).

In this case, the partially shared MPM list 2 may be configured like Table 5.

TABLE 5 mpm[2] = Planar_idx
mpm[3] = DC_idx
diff = mpm[max_idx] − mpm[min_idx]

Referring to Table 5, the partially shared MPM list 2 may include a third MPM candidate (mpm[2]) indicative of a planar mode and a fourth MPM candidate (mpm[3]) indicative of a DC mode. That is, if the condition 3 is satisfied, this means that both L and A are directional intra prediction modes. Accordingly, the encoding/decoding apparatus may add the planar mode and the DC mode, that is, not directional intra prediction modes, to the MPM list as the third MPM candidate (mpm[2]) and the fourth MPM candidate (mpm[3]) after the first MPM candidate (mpm[0]=L) and the second MPM candidate (mpm[1]=A) included in the partially shared MPM list 1 described in Table 4. Accordingly, MPM lists 4 and 5 to be described later may be configured to partially include the third MPM candidate (mpm[2]) and the fourth MPM candidate (mpm[3]) in Table 5 along with the first MPM candidate (mpm[0]) and the second MPM candidate (mpm[1]) in Table 4.

Next, the encoding/decoding apparatus may check a condition 4 for determining whether a difference between the mode number of L and the mode number of A is not 64 and not 1 (S1445). The condition 4 may be a condition for determining whether "diff !=64 AND diff !=1".

For example, the difference (diff) between the mode number of L and the mode number of A may be calculated like an equation illustrated in Table 5. In this case, diff may be a result obtained by subtracting a smaller value from a greater value in the mode number of L and the mode number of A.

In this case, when the condition 4 is satisfied, the encoding/decoding apparatus may derive an MPM list 5 as an MPM list for the current block (S1455). When the condition 4 is not satisfied, the encoding/decoding apparatus may derive an MPM list 4 as an MPM list for the current block (S1450).

In this case, the MPM list 4 may be configured like Table 6, and the MPM list 5 may be configured like Table 7.

TABLE 6 mpm[4] = mpm[max_idx] − 2
mpm[5] = mpm[max_idx] + 2

TABLE 7 mpm[4] = mpm[max_idx] − 1
mpm[5] = mpm[max_idx] + 1

Each of the MPM list 4 of Table 6 and the MPM list 5 of Table 7 may be configured to include a fifth MPM candidate (mpm[4]) and a sixth MPM candidate (mpm[5]) along with the first to fourth MPM candidates (mpm[0]~mpm[3]) described in Table 4 and Table 5.

Meanwhile, if at least one of L and A is a non-directional intra prediction mode at step S1425 (i.e., when the condition 3 is not satisfied), the encoding/decoding apparatus may check a condition 5 for determining whether only any one of L and A is a non-directional intra prediction mode (S1430). That is, the encoding/decoding apparatus may determine whether at least one of L and A is a DC mode number or less and the sum of the mode number of L and the mode number of A is 2 or more. The condition 5 may be a condition for determining whether "L+A>=2".

When the sum of the mode number of L and the mode number of A is 2 or more (i.e., when the condition 5 is satisfied), the encoding/decoding apparatus may derive an MPM list 3 as an MPM list for the current block (S1435).

In this case, the MPM list 3 may be configured like Table 8.

TABLE 8 mpm[2] = ! mpm[min_idx]
mpm[3] = mpm[max_idx] − 1
mpm[4] = mpm[max_idx] + 1
mpm[5] = mpm[max_idx] − 2

Referring to Table 8, the MPM list 3 may be configured to include third to sixth MPM candidates (mpm[2]~mpm[5]) along with the first MPM candidate (mpm[0]) and the second MPM candidate (mpm[1]) described in Table 4. In this case, to satisfy the condition 5 may mean that any one of L and A is a directional prediction mode and the other is a non-directional prediction mode. Accordingly, the MPM list 3 may include a non-directional prediction mode as the third MPM candidate (mpm[2]) after the first and second MPM candidates. For example, if one having a non-directional mode, among L and A, is a planar mode, the third MPM candidate (mpm[2]) may be derived as a DC mode. Alternatively, if one having a non-directional mode, among L and A, is a DC mode, the third MPM candidate (mpm[2]) may be derived as a planar mode.

When the sum of the mode number of L and the mode number of A is not 2 or more (i.e., when the condition 5 is not satisfied), the encoding/decoding apparatus may derive an MPM list 2 as an MPM list for the current block (S1415). In this case, both L and A may be non-directional prediction modes.

In this case, the MPM list 2 may be the same as Table 3. Referring to Table 3, since both L and A are non-directional prediction modes, in the MPM list 2, a planar mode and a DC mode may be derived as the first MPM candidate (mpm[0]) and the second MPM candidate (mpm[1]), respectively. The remaining third to sixth MPM candidates (mpm [2]~mpm[5]) may be derived as illustrated in Table 3.

In Table 2 to Table 8, in (directional intra prediction mode+1), (directional intra prediction mode−1), (directional intra prediction mode+2), (directional intra prediction mode−2), and so on, a value may be mathematically added or subtracted. However, in some cases, mathematical calculation may not be simply performed. For example, in a non-directional intra prediction mode, the consistency of a neighboring intra prediction mode may not be maintained by subtracting or adding a directional intra prediction mode or a maximum available intra prediction mode index may be exceeded. For example, a value obtained by subtracting 1 from a directional intra prediction mode may be derived as an intra mode 1 indicative of a DC index (DC mode). 7 is obtained by adding 1 to the No. 66 directional intra prediction mode, and thus it exceeds the index 66 of a maximum available intra mode. Accordingly, an operation of adding or subtracting a mode may be limited as follows using a modular arithmetic (indicated by %). That is, a value indicative of a non-directional intra prediction mode that does not consistency or a value that exceeds a maximum available intra mode index can be prevented from being derived. For example, the adding or subtracting of a mode using the modular arithmetic may be derived like Table 9.

TABLE 9

Intra mode − 1: (Intra mode + 62)%65 + 2
Intra mode + 1: (Intra mode − 1)%65 + 2
Intra mode − 2: (Intra mode + 61)%65 + 2

The method of configuring an MPM list in the aforementioned embodiments may be performed in the encoding/decoding apparatus. In this case, in configuring the MPM list, the encoding apparatus may derive the best intra prediction mode to be applied to a current block, and may determine whether the derived best intra prediction mode belongs to an MPM list including MPM candidates configured using a method, such as those of the aforementioned embodiments. If an intra prediction mode of a current block belongs to an MPM list including MPM candidates, the encoding apparatus may encode an MPM flag and an MPM index. In this case, the MPM flag may indicate whether the intra prediction mode of the current block belongs to the MPM list (i.e., MPM candidates). The MPM index may indicate whether which MPM mode is applied as the intra prediction mode of the current block, among the MPM candidates included in the MPM list. In contrast, if the intra prediction mode of the current block does not belong to the MPM list including the MPM candidates, the encoding apparatus may encode the intra prediction mode of the current block.

The decoding apparatus may configure an MPM list by applying the same method as that of the aforementioned embodiments identically with the encoding apparatus. Furthermore, the decoding apparatus may receive an MPM flag from the encoding apparatus, and may identify whether an intra prediction mode applied to a current block is included in an MPM list (i.e., MPM candidates) using the MPM flag. If the intra prediction mode applied to the current block is included within the MPM list (i.e., MPM candidates), the decoding apparatus may derive an intra prediction mode applied to the current block using an MPM index received from the encoding apparatus. In contrast, if the intra prediction mode applied to the current block is not included in the MPM list (i.e., MPM candidates), the decoding apparatus may derive an intra prediction mode applied to the current block using a prediction mode index (or, remaining prediction mode index; remaining mode information) indicative of a specific prediction mode, among remaining prediction modes except the MPM candidates.

Hereinafter, there is proposed a method of configuring an extended MPM list having similar complexity by comparing the extended MPM list with an MPM list including 3 MPM candidates. The extended MPM list refers to a MPM list including three or more MPM candidates, and may include 3, 4, 5 or 6 MPM candidates, for example. In a proposed method to be described later, an embodiment in which an MPM list including 6 MPM candidates is generated using two neighboring intra prediction modes (left neighboring intra prediction mode and above neighboring intra prediction mode). In this case, the left neighboring intra prediction mode (LEFT) may indicate an intra prediction mode of the neighboring block D in FIG. 11, and the above neighboring intra prediction mode (ABOVE) may indicate an intra prediction mode of the neighboring block B in FIG. 11.

In configuring the extended MPM list, the reason for the 3 MPM candidates are used is that there are advantages in simplicity and throughput. However, complexity may be increased because the existing method using 6 MPM candidates includes a process of searching for the locations of various neighboring blocks, a continuous pruning process, steps for generating the MPM list, line buffer requirements and parsing dependency. Accordingly, as in the method using 3 MPM candidates, there is proposed a method capable of obtaining advantages in complexity and throughput even in using 6 MPM candidates.

In one embodiment, an MPM list may be configured based on an algorithm (i.e., pseudo code), such as Table 10.

TABLE 10

Determine LEFT and ABOVE intra modes
Set MPM as MPM_ordering_0
If (LEFT==ABOVE)
    If (LEFT>=DC_idx), then set MPM as MPM_ordering_1
    Else if (LEFT>DC_idx and ABOVE>DC_idx), then set MPM as
MPM_ordering_2
    Else if (LEFT+ABOVE> DC_idx), then set MPM as
    MPM_ordering_3

Referring to Table 10, the MPM list of a current block may be generated based on LEFT and ABOVE, that is, neighboring intra prediction modes. In this case, LEFT may indicate an intra prediction mode of the neighboring block D in FIG. 11, and ABOVE may indicate an intra prediction mode of the neighboring block B in FIG. 11. Furthermore, the neighboring block D may indicate a left neighboring block located on the downmost side, among left neighboring blocks neighboring the left of the current block. The neighboring block B may indicate a top neighboring block located on the far right (or rightmost) side, among neighboring blocks neighboring the top of the current block.

Specifically, intra prediction modes of LEFT and ABOVE may be derived. Furthermore, the MPM list (i.e., MPM candidates) of a current block may be set as MPM_ordering_0 based on the intra prediction modes of LEFT and ABOVE. In this case, if LEFT and ABOVE are equal and the mode number of LEFT is greater than or equal to a DC mode, the MPM list (i.e., MPM candidates) of the current block may be set as MPM_ordering_1. Alternatively, if LEFT and ABOVE are not equal and the mode number of LEFT is greater than that of a DC mode and the mode number of ABOVE is greater than that of a DC mode, the MPM list (i.e., MPM candidates) of the current block may be set as MPM_ordering_2. Alternatively, if LEFT and ABOVE are not equal, at least one of the mode number of LEFT and the mode number of ABOVE is not greater than that of a DC mode, and the sum of the mode number of LEFT and the mode number of ABOVE is greater than the mode number of a DC mode, the MPM list (i.e., MPM candidates) of the current block may be set as MPM_ordering_3.

In this case, MPM_ordering_0, MPM_ordering_1, MPM_ordering_2, or MPM_ordering_3 may have been configured to include MPM candidates according to a predetermined order as described in FIGS. 12 to 14

Furthermore, if one of the remaining intra prediction modes except derived MPM candidates is an intra prediction mode applied to a current block as described above, the MPM coding of the current block may be performed based on remaining mode information. Such remaining mode information may be encoded/decoded by applying truncated binary (TB) coding.

In another embodiment, an MPM list may be configured based on an algorithm (i.e., spec), such as Table 11.

TABLE 11

| Derivation process for luma intra prediction mode |
| --- |
| Input to this process are:<br>- a luma location ( xCb , yCb ) specifying the top-left sample of the current luma coding block relative to the<br>  top-left luma sample of the current picture,<br>- a variable cbWidth specifying the width of the current coding block in luma samples,<br>- a variable cbHeight specifying the height of the current coding block in luma samples.<br>In this process, the luma intra prediction mode IntraPredModeY⌈ xCb ⌉⌈ yCb ⌉ is derived.<br>Table 2.3-1 specifies the value for the intra prediction mode IntraPredModeY⌈ xCb ⌉⌈ yCb ⌉ and the associated<br>names. |

| Table 2.3-2 - Specification of intra prediction mode and associated names | |
| --- | --- |
| Intra prediction mode | Associated name |
| 0 | INTRA_PLANAR |
| 1 | INTRA_DC |
| 2..66 | INTRA_ANGULAR2..INTRA_ANGULAR66 |
| 77 | INTRA_CCLM |

NOTE - : The intra prediction mode INTRA_CCLM is only applicable to chroma components.
IntraPredModeY[ xCb ][ yCb ] is derived by the following ordered steps:

1.        The neighbouring locations ( xNbA, yNbA ) and ( xNbB, yNbB ) are set equal to ( xCb − 1, yCb+ cbHeight − 1 ) and ( xCb+ cbWidth − 1, yCb − 1), respectively.

2.        For X being replaced by either A or B, the variables candIntraPredModeX are derived as follows:
          -    The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.
          -    The candidate intra prediction mode candIntraPredModeX is derived as follows:
              -If one or more of the following conditions are true, candIntraPredModeX is set equal to INTRA_PLANAR.
                 -      The variable availableX is equal to FALSE.
                 -      CuPredMode[ xNbX ][ yNbX ] is not equal to MODE_INTRA.
                 -      X is equal to B and yCb − 1 is less than ( ( yCb >> CtbLog2SizeY ) << CtbLog2SizeY ).
              -Otherwise, candIntraPredModeX is set equal to IntraPredModeY[ xNbX ][ yNbX ].

3.        The candModeList[ x ] with x = 0..5 is derived as follows:

-    candModeList[ 0 ] = candIntraPredModeA          (8-1)
              candModeList[ 1 ] = ! candIntraPredModeA          (8-2)
              candModeList[ 2 ] = INTRA_ANGULAR50          (8-3)
              candModeList[ 3 ] = INTRA_ANGULAR18          (8-4)
              candModeList[ 4 ] = INTRA_ANGULAR46          (8-5)
              candModeList[ 5 ] = INTRA_ANGULAR54          (8-6)
          -    If candIntraPredModeB is equal to candIntraPredModeA, the following applies:
              -If candIntraPredModeA is larger than 1, candModeList[ x ] with x = 0..5 is derived as follows:
                   candModeList[ 0 ] = candIntraPredModeA        (8-7)
                     candModeList[ 1 ] = INTRA_PLANAR         (8-8)
                     candModeList[ 2 ] = INTRA_DC          (8-9)
                     candModeList[ 3 ] = 2 + ( ( candIntraPredModeA + 62 ) % 65 )  (8-10)
                   candModeList[ 4 ] = 2 + ( ( candIntraPredModeA − 1 ) % 65 )  (8-11)
                   candModeList[ 5 ] = 2 + ( ( candIntraPredModeA + 61 ) % 65 )  (8-12)

TABLE 11-continued

- Otherwise (candIntraPredModeB is not equal to candIntraPredModeA), the following applies:

-candModeList[ 0 ] and candModeList[ 1 ] are derived as follows:

$$candModeList[ 0 ] = candIntraPredModeA \qquad (8\text{-}13)$$
$$candModeList[ 1 ] = candIntraPredModeB \qquad (8\text{-}14)$$

-Set the variable biggerIdx is as follows $$biggerIdx = candModeList[ 0 ] > candModeList[ 1 ] ? 0 : 1 \qquad (8\text{-}15)$$

-If both of candIntraPredModeA and candIntraPredModeB are larger than 1, candModeList[ x ] with x = 2..5 is derived as follows:

$$candModeList[ 2 ] = INTRA\_PLANAR \qquad (8\text{-}16)$$
$$candModeList[ 3 ] = INTRA\_DC \qquad (8\text{-}17)$$

- If candModeList[biggerIdx] - candModeList[ !biggerIdx] is equal to neither 64 nor 1, the following applies:

$$candModeList[ 4 ] = 2 + ( ( candModeList[biggerIdx] + 62 ) \% \quad (8\text{-}18)$$
$$65 )$$
$$candModeList[ 5 ] = 2 + ( ( candModeList[biggerIdx] - 1 ) \% \quad (8\text{-}19)$$
$$65 )$$

- Otherwise, the following applies:

$$candModeList[ 4 ] = 2 + ( ( candModeList[biggerIdx] + 61 ) \% \quad (8\text{-}20)$$
$$65 )$$
$$candModeList[ 5 ] = 2 + ( candModeList[biggerIdx] \% 65 ) \qquad (8\text{-}21)$$

-Otherwise, if sum of candIntraPredModeA and candIntraPredModeB is larger or equal to 2, the following applies:

$$candModeList[ 2 ] = ! candModeList[ ! biggerIdx] \qquad (8\text{-}22)$$
$$candModeList[ 3 ] = 2 + ( ( candModeList[biggerIdx] + 62 ) \% 65 ) \qquad (8\text{-}23)$$
$$candModeList[ 4 ] = 2 + ( ( candModeList[biggerIdx] - 1 ) \% 65 ) \qquad (8\text{-}24)$$
$$candModeList[ 5 ] = 2 + ( ( candModeList[biggerIdx] + 61 ) \% 65 ) \qquad (8\text{-}25)$$

4. IntraPredModeY[ xCb ][ yCb ] is derived by applying the following procedure:

- If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].

- Otherwise, IntraPredModeY[ xCb ][ yCb ] is derived by applying the following ordered steps:

1. The array candModeList[ x ], x = 0..5 is modified by the following ordered steps:

i. For i sequentially equals to 0 to 4, inclusive, apply:

ii. For j sequentially equals to i + 1 to 5, inclusive, compare candModeList[ i ] to candModeList[ j ], When candModeList[ i ] is greater than candModeList[ j ], both values are swapped as follows:
( candModeList[ i ], candModeList[ j ] ) = Swap( candModeList[ i ], candModeList[ j ] ) (8-26)

2. IntraPredModeY[ xCb ][ yCb ] is derived by the following ordered steps:

i. IntraPredModeY[ xCb ][ yCb ] is set equal to intra_luma_mpm_remainder[ xCb ][ yCb ].

ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

The variable IntraPredMode Y[ x ][ y ] with x = xCb..xCb + cbWidth − 1 and y = yCb..yCb + cbHeight − 1 is set to be equal to IntraPredModeY[ xCb ][ yCb ].

Referring to Table 11, candidate intra prediction modes may be derived based on a neighboring block of a current block. An MPM list for the current block may be configured based on the candidate intra prediction modes. The candidate intra prediction modes may include a candidate intra prediction mode A and a candidate intra prediction mode B.

For example, when at least one of conditions to be described later is true (i.e., when at least one of conditions to be described later is satisfied), the candidate intra prediction mode A may be set as a planar mode intra prediction mode.

A neighboring block A is not available

An intra prediction is not applied to the neighboring block A

In this case, the neighboring block A may be a left neighboring block of a current block. The left neighboring block may be a left neighboring block located on the downmost side, among left neighboring blocks neighboring the current block. For example, if the size of a current block is cbWidth×cbHeight and an x component and y component at the top-left sample position of the current block are xCb and yCb, the neighboring block A may be a block including a sample at (xCb−1, yCb+cbHeight−1) coordinates. Meanwhile, the neighboring block A may indicate the neighboring block D of FIG. 11.

When all the conditions are not true (i.e., when all the conditions are not satisfied), the candidate intra prediction mode A may be set as an intra prediction mode of the neighboring block A.

Furthermore, for example, when at least one of conditions to be described later is true (i.e., when at least one of the conditions to be described later is satisfied), the candidate intra prediction mode B may be set as a planar mode intra prediction mode.

A neighboring block B is not available

An intra prediction is not applied to the neighboring block B yCb−1 is smaller than ((yCb>>CtbLog2SizeY)<< CtbLog2SizeY)

In this case, the neighboring block B may be a top neighboring block of the current block. The top neighboring block may be a top neighboring block located on the far right (or rightmost) side among top neighboring blocks neighboring the current block. For example, if the size of a current block is cbWidth×cbHeight and an x component and y component at the top-left sample position of the current block are xCb and yCb, the neighboring block B may be a block including a sample at (xCb+cbWidth−1, yCb−1) coordinates. Meanwhile, CtbLog2SizeY may indicate the size of a current CTU, and ((yCb>>CtbLog2SizeY)

<<CtbLog2SizeY) may indicate coordinates at the top boundary of the current CTU. That is, a case where yCb−1 is smaller than ((yCb>>CtbLog2SizeY)<<CtbLog2SizeY) may indicate a case where the neighboring block B is out of the range of the current CTU. That is, the aforementioned condition may indicate a case where the neighboring block B is out of the range of the current CTU.

When all the conditions are not true (i.e., when all the conditions are not satisfied), the candidate intra prediction mode B may be set as an intra prediction mode of the neighboring block B.

If candidate intra prediction modes have been derived, the MPM list of the current block may be configured like a first MPM list. The first MPM list may be configured with a first MPM candidate indicative of a candidate intra prediction mode A, a second MPM candidate indicative of the intra prediction mode of a value obtained by performing an operation on the candidate intra prediction mode A using a negative logic operator, a third MPM candidate indicative of the No. 50 intra prediction mode, a fourth MPM candidate indicative of the No. 18 intra prediction mode, a fifth MPM candidate indicative of the No. 46 intra prediction mode, and a sixth MPM candidate indicative of the No. 54 intra prediction mode.

Thereafter, whether the candidate intra prediction mode B and the candidate intra prediction mode A are equal may be determined.

In this case, if the candidate intra prediction mode B and the candidate intra prediction mode A are equal, whether the candidate intra prediction mode A is larger than 1 may be determined. When the candidate intra prediction mode A is larger than 1, the MPM list of the current block may be configured like a second MPM list. The second MPM list may be configured with a first MPM candidate indicative of the candidate intra prediction mode A, a second MPM candidate indicative of a planar mode intra prediction mode, a third MPM candidate indicative of a DC intra prediction mode, a fourth MPM candidate indicative of an intra prediction mode derived as $2+((candIntraPredModeA+62) \% 65)$, a fifth MPM candidate indicative of an intra prediction mode derived as $2+((candIntraPredModeA−1) \% 65)$, and a sixth MPM candidate indicative of an intra prediction mode derived as $2+((candIntraPredModeA+61) \% 65)$.

Otherwise, if the candidate intra prediction mode B and the candidate intra prediction mode A are not equal, first, the first MPM candidate and second MPM candidate of the current block may be derived. The first MPM candidate may be derived as the candidate intra prediction mode A, and the second MPM candidate may be derived as the candidate intra prediction mode B. Furthermore, biggerIdx may be set. When the first MPM candidate is greater than the second MPM candidate, biggerIdx may be derived as 0. When the first MPM candidate is not greater than the second MPM candidate, biggerIdx may be derived as 1.

Next, whether the candidate intra prediction mode A and the candidate intra prediction mode B are larger than 1 may be determined (i.e., whether the mode number of the candidate intra prediction mode A and the mode number of the candidate intra prediction mode B are larger than 1 may be determined). In this case, when the candidate intra prediction mode A and the candidate intra prediction mode B are larger than 1, the third MPM candidate and fourth MPM candidate of the current block may be derived. The third MPM candidate may be derived as a planar mode intra prediction mode, and the fourth MPM candidate may be derived as a DC intra prediction mode.

Next, whether a difference (diff) between an MPM candidate indicated by an MPM index having a value of biggerIdx and an MPM candidate indicated by an MPM index having a value (i.e., !biggerIdx) obtained by performing an operation on biggerIdx using a negative logic operator is not 64 and also not 1 may be determined.

When the difference is not 64 and also not 1, the fifth MPM candidate and sixth MPM candidate of the current block may be derived. The fifth MPM candidate may be derived as an intra prediction mode derived as $2+((candModeList[biggerIdx]+62) \% 65)$. The sixth MPM candidate may be derived as an intra prediction mode derived as $2+((candModeList[biggerIdx]−1) \% 65)$.

Otherwise, if the difference is 64 or 1, the fifth MPM candidate and sixth MPM candidate of the current block may be derived. The fifth MPM candidate may be derived as an intra prediction mode derived as $2+((candModeList[biggerIdx]+61) \% 65)$. The sixth MPM candidate may be derived as an intra prediction mode derived as $2+(candModeList[biggerIdx] \% 65)$.

Meanwhile, when the sum of the candidate intra prediction mode A and the candidate intra prediction mode B is greater than or equal to 2, the third MPM candidate, fourth MPM candidate, fifth MPM candidate and sixth MPM candidate of the current block may be derived. The third MPM candidate may be derived as an intra prediction mode derived as a value obtained by performing an operation on an MPM candidate, indicated by an MPM index having a value (i.e., !biggerIdx) by performing an operation on biggerIdx using a negative logic operator, using a negative logic operator. The fourth MPM candidate may be derived as an intra prediction mode derived as $2+((candModeList[biggerIdx]+62) \% 65)$. The fifth MPM candidate may be derived as an intra prediction mode derived as $2+((candModeList[biggerIdx]−1) \% 65)$. The sixth MPM candidate may be derived as an intra prediction mode derived as $2+((candModeList[biggerIdx]+61) \% 65)$.

An intra prediction mode for the current block may be derived based on an MPM list including MPM candidates, which are derived as described above. And, based on the derived intra prediction mode, prediction of the current block may be performed so as to generate predicted samples.

At this point, when deriving intra prediction modes for the current block, in case an MPM flag (e.g., intra_luma_mpm_flag of Table 11) is equal to 1, among the MPM candidates that are derived as described above, an MPM candidate being indicated by an MPM index (e.g., intra_luma_mpm_idx of Table 11) may be derived as the intra prediction mode of the current block. Alternatively, in case an MPM flag (e.g., intra_luma_mpm_flag of Table 11) is equal to 0, based on a remaining mode (e.g., intra_luma_mpm_remainder of Table 11) indicating one intra prediction mode among the remainder intra prediction modes excluding the MPM candidates that are derived as described above, the one intra prediction mode may be derived as the intra prediction mode of the current block.

As described above, intra prediction mode information for the current block may be coded to a syntax element value and may then be signaled. Herein, intra prediction mode information refers to information that is needed for the intra prediction of the current block, wherein the information may include the above-described MPM flag, MPM index, remaining mode, and so on. When coding the intra prediction mode information, various binarization processes may be applied in accordance with each syntax element.

Herein, binarization may mean a set of bin strings for all feasible values of a syntax element. Additionally, a binarization process may mean a procedure for uniquely mapping all feasible values of a syntax element to a set of bin strings. A bin may denote a binary value of one digit. For example, "0" and "1" may each be referred to as a bin. A bin string may denote a binary sequence being configured of bins. Herein, for example, a bin string may be a sequence of consecutive binary values, such as "01".

According to an embodiment, syntax elements of the intra prediction mode information and the corresponding binarization may be as shown below in Table 12.

ing mode may be encoded/decoded by having a truncated binary (TB) binarization process applied thereto.

According to the embodiment of this specification, as described above, by extending the existing 35 intra prediction modes, 67 intra prediction modes may be used. In this case, when coding the intra prediction mode information, 6 bits may be needed for a syntax element indicating the remaining mode. However, depending upon the coding method (i.e., binarization method), the number of bits of a syntax element indicating the remaining mode may be

TABLE 12

| Syntax structure | Syntax element | Binarization | |
|---|---|---|---|
| | | Process | Input parameters |
| coding_quadtree( ) | qt_split_cu_flag[ ][ ] | FL | cMax = 1 |
| multi_type_tree( ) | mtt_split_cu_flag | FL | cMax = 1 |
| | mtt split cu vertical flag | FL | cMax = 1 |
| | mtt_split_cu_binary_flag | FL | cMax = 1 |
| coding_tree_unit( ) | alf_ctb_flag[ ][ ][ ] | FL | cMax = 1 |
| coding_unit( ) | cu_skip_flag[ ][ ] | FL | cMax = 1 |
| | pred mode flag | FL | cMax = 1 |
| | intra_luma_mpm_flag[ ][ ] | FL | cMax = 1 |
| | intra_luma_mpm_idx[ ][ ] | TR | cMax = 5, cRiceParam = 0 |
| | intra_luma_mpm_remainder[ ][ ] | TB | cMax= 60 |
| | intra_chroma_pred_mode[ ][ ] | 9.5.3.6 | — |
| | merge_affine_flag[ ][ ] | FL | cMax = 1 |
| | merge_flag[ ][ ] | FL | cMax = 1 |
| | morge_idx[ ][ ] | TR | cMax = MaxNumMergcCand − 1, cRiccParam = 0 |
| | inter_pred_idc[ x0 ][ y0 ] | 9.5.3.7 | — |
| | inter_affine_flag[ ][ ] | FL | cMax = 1 |
| | cu_affine_type_flag[ ][ ] | FL | cMax = 1 |
| | ref_idx_l0[ ][ ] | TR | cMax = num_ref_idx_l0_active_minus1, cRiceParam = 0 |
| | mvp_l0_flag[ ][ ] | FL | cMax = 1 |
| | ref idx l1[ ][ ] | TR | cMax = num_ref_idx_l1_active_minus1, cRiceParam = 0 |
| | mvp_l1_flag[ ][ ] | FL | cMax = 1 |
| | amvr_mode[ ][ ] | TR | cMax = 2, cRiceParam = 0 |
| | cu cbf | FL | cMax = 1 |
| mvd_coding( ) | abs_mvd_greater0_flag[ ] | FL | cMax = 1 |
| | abs_mvd_greater1_flag[ ] | FL | cMax = 1 |
| | abs_mvd_minus2[ ] | EG1 | — |
| | mvd_sign_flag[ ] | FL | cMax = 1 |
| transform_unit( ) | tu_cbf_luma[ ][ ][ ] | FL | cMax = 1 |
| | tu_cbf_cb[ ][ ][ ] | FL | cMax = 1 |
| | tu_cbf_cr[ ][ ][ ] | FL | cMax = 1 |
| | cu_mts_flag[ ][ ] | FL | cMax = 1 |
| residual coding( ) | transform skip flag[ ][ ][ ] | FL | cMax = 1 |
| | last_sig_coeff_x_prefix | TR | cMax = ( log2TrafoSize << 1 ) − 1, cRiceParam = 0 |
| | last_sig_coeff_y_prefix | TR | cMax = ( log2TrafoSize << 1 ) − 1, cRiceParam = 0 |
| | last_sig_coeff_x_suffix | FL | cMax = ( 1 << ( ( last_sig_coeff_x_prefix >> 1 ) − 1 ) − 1 ) |
| | last_sig_coeff_y_suffix | FL | cMax = ( 1 << ( ( last_sig_coeff_y_prefix >> 1 ) − 1 ) − 1 ) |
| | coded_sub_block_flag[ ][ ] | FL | cMax = 1 |
| | sig_coeff_flag[ ][ ] | FL | cMax = 1 |
| | par_level_flag[ ] | FL | cMax = 1 |
| | rem_abs_gt1_flag[ ] | FL | cMax = 1 |
| | rem_abs_gt2_flag[ ] | FL | cMax = 1 |
| | abs_remainder[ ] | 9.5.3.8 | cIdx, x0, y0, xC, yC, log2TbWidth, log2TbHeight |
| | coeff sign flag[ ] | FL | cMax = 1 |
| | mts idx[ ][ ] | FL | cMax = 3 |

Referring to Table 12, which is presented above, an "intra_luma_mpm_flag" syntax element indicating an MPM flag may be encoded/decoded by having a fixed-length (FL) binarization process applied thereto. An "intra_luma_mpm_idx" syntax element indicating an MPM index may be encoded/decoded by having a truncated rice (TR) binarization process applied thereto. And, an "intra_luma_mpm_remainder" syntax element indicating a remain-saved. That is, as shown in Table 12, by performing truncated binary (TB) binarization processing when coding a syntax element indicating the remaining mode, the number of bits may be saved, and the coding efficiency may be enhanced.

According to an embodiment, a truncated binary (TB) binarization process may be performed on the syntax element indicating the remaining mode, as shown below in Table 13.

TABLE 13

| 9.5.3.6 Truncated binary binarization process |
|---|

Inputs to to this process are a request for a truncated binary (TB) binarization and cMax.
Outputs of this process is the TB binarization associating each value symbolVal with a corresponding bin string.
Syntax elements coded as tb(v) are truncated binary coded. The range of possible values for the syntax element is determined first. The range of this syntax element may be between 0 and cMax, with cMax being greater than or equal to 1. symbolVal which is equal to the value of the syntax element is given by a process specified as follows:

```
    n = cMax + 1
    if ( n > 256 ) {
        thVal = 1 << 8
        th = 8
        while( thVal <= n ) {
        th++
        thVal <<= 1
        }
      th− −
    }
    else {
        th = Floor ( Log2( n ) ) so that 2^k <= n < 2^{k+1}
    }
    val = 1 << th                                                    (9-9)
    b = n − val
    symbolVal = read_bits( th )
    if( symbolVal >= val − b ) {
      symbolVal <<= 1
      symbolVal += read_bits( 1 )
      symbolVal −= val − b
    }
```

Referring to Table 13, in case a syntax element indicating the remaining mode (intra_luma_mpm_remainder) is inputted, a TB binarized value of the syntax element (intra_luma_mpm_remainder) may be outputted based on truncated binary (TB) coding. Firstly, a range of feasible values of the syntax element (intra_luma_mpm_remainder) may be determined, and the range of this syntax element (intra_luma_mpm_remainder) may be between 0~cMax. Herein, cMax may indicate a maximum value (or highest value) that may be assigned to the syntax element (intra_luma_mpm_remainder), and the maximum value may be greater than or equal to 1. A TB binarized value (TB bin string) for the syntax element (intra_luma_mpm_remainder) value may be derived based on an algorithm shown in Table 13. For example, as shown in Table 12, in case of a syntax element indicating the remaining mode (intra_luma_mpm_remainder), since cMax is equal to 60, this syntax element (intra_luma_mpm_remainder) may be expressed by using 6 bits. However, in case of performing binarization coding on the value of the syntax element indicating the remaining mode (intra_luma_mpm_remainder) based on TB coding, which is an algorithm shown in Table 13, the binarization coding may be performed by using a number of bits less than 6 bits in accordance with the syntax element (intra_luma_mpm_remainder) value. For example, the syntax element indicating the remaining mode (intra_luma_mpm_remainder) may be coded by TB coding by variably generating bits from 1 bit to 5 bits in accordance with the value of the corresponding syntax element.

Figure 15:
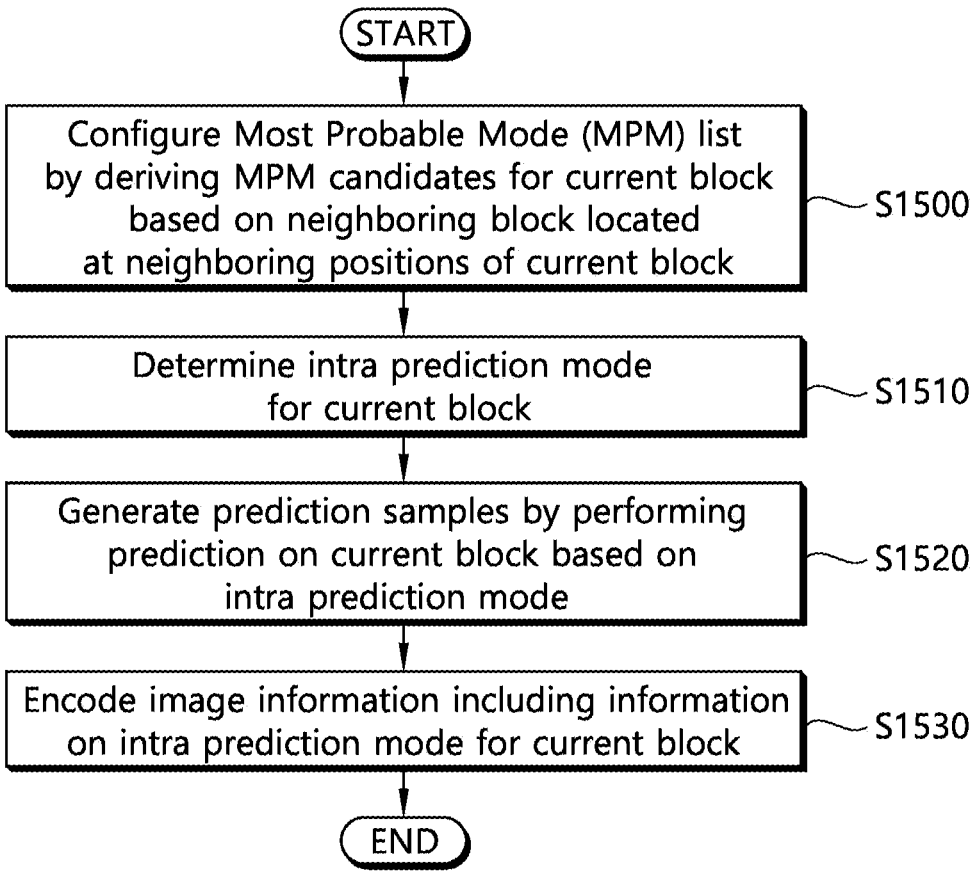
FIG. 15 is a flowchart broadly illustrating an encoding method that may be performed by an encoding apparatus according to an embodiment of this specification.

FIG. 15 is a flowchart broadly illustrating an encoding method that may be performed by an encoding apparatus according to an embodiment of this specification.

The method disclosed in FIG. 15 may be performed by the encoding apparatus (200), which is disclosed in FIG. 2. More specifically, steps S1500 to S1520 of FIG. 15 may be performed by the predictor (220) and the intra predictor (222) shown in FIG. 2, and step S1530 of FIG. 15 may be performed by the entropy encoder (240) shown in FIG. 2.

Additionally, the method disclosed in FIG. 15 may include the embodiments, which are described above in this specification. Therefore, detailed description on the content of this specification that overlap with the above-described embodiments shall be omitted or simplified.

Referring to FIG. 15, the encoding apparatus may configure a Most Probable Mode (MPM) list by deriving MPM candidates for the current block based on neighboring blocks located in neighboring (or surrounding) areas of the current block (S1500).

Herein, the neighboring blocks may include neighboring block A, neighboring block B, neighboring block C, neighboring block D, neighboring block E, neighboring block F, and/or neighboring block G, which are described above in FIG. 11.

According to an embodiment, 2 neighboring blocks may be used when configuring the MPM list. Herein, for example, neighboring block D and neighboring block B may be used. Neighboring block D may represent a left-side neighboring block located at a lowermost position among the left-side neighboring block being adjacent to the left side of the current block, and neighboring block B may represent an upper-side neighboring block located at a rightmost (or far right) position among the neighboring blocks being adjacent to the upper side of the current block.

The encoding apparatus may derive a first MPM candidate based on a first neighboring block (neighboring block D), and the encoding apparatus may derive a second MPM candidate based on a second neighboring block (neighboring block B).

For example, when the first neighboring block is available and intra prediction is applied to the first neighboring block, a first MPM candidate may be derived as an intra prediction mode of the first neighboring block. When the first neighboring block is unavailable (or not available) or intra prediction is not applied to the first neighboring block, a first MPM candidate may be derived as a planar intra prediction mode.

Additionally, for example, when the second neighboring block is available and intra prediction is applied to the second neighboring block and the second neighboring block is included in a current CTU, a second MPM candidate may be derived as an intra prediction mode of the second neighboring block. When the second neighboring block is unavailable (or not available) or intra prediction is not applied to the second neighboring block or the second neighboring block is not included in the current CTU, a second MPM candidate may be derived as a planar intra prediction mode.

The encoding apparatus may configure an MPM list based on the first MPM candidate and the second MPM candidate, which are derived as described above. At this point, in accordance with the number of candidates in the MPM list, the first MPM candidate and the second MPM candidate and remaining (or remainder) MPM candidates may be derived. As described above, the number of candidates included in the MPM list may vary in accordance with the algorithm. Herein, for example, the number of candidates may be equal to 3 candidates, 4 candidates, 5 candidates, 6 candidates, and so on. Additionally, as described above, additional MPM candidates may be derived based on conditions that are determined based on the first MPM candidate derived from the first neighboring block and the second MPM candidate derived from the second neighboring block.

For example, the encoding apparatus may determine whether or not the first MPM candidate and the second MPM candidate are identical, and the encoding apparatus may determine whether a mode number of the first MPM candidate or the second MPM candidate is greater than a mode number of a DC mode. At this point, when the first MPM candidate and the second MPM candidate are not identical, the encoding apparatus may determine whether the mode numbers of both the first MPM candidate and the second MPM candidate are greater than the DC mode or whether the mode number of any one of the two MPM candidates is greater than the DC mode. Additionally, when the mode numbers of both the first MPM candidate and the second MPM candidate are greater than the DC mode, the encoding apparatus may determine based on a difference between the mode numbers of the first MPM candidate and the second MPM candidate (e.g., whether the difference between the mode numbers of the two candidates is equal to 1, whether the difference between the mode numbers of the two candidates is equal to or greater than 2 or 62, and so on). As described above, the encoding apparatus may differently configure the MPM list in accordance with whether or not the above-described conditions are satisfied based on the first MPM candidate and the second MPM candidate. For example, an MPM list may include 6 MPM candidates, and 6 MPM candidates including the first MPM candidate and the second MPM candidate may be derived based on whether or not the above-described conditions are satisfied. At this point, the 6 MPM candidates may be mapped corresponding to index values of 0 to 5, and the 6 MPM candidates may be indicated within the MPM list based on the index values. Therefore, by signaling the index information, the encoding apparatus may indicate any one of the MPM candidates within the MPM list.

The above-described process of generating an MPM list by deriving MPM candidates based on the neighboring blocks of the current block is merely an example. And, therefore, the MPM list may be configured by using other various methods while considering coding efficiency. Additionally, various embodiments of configuring the MPM list, which are described in this specification, may be applied to the process of generating an MPM list. Since detailed description of the same has already been made with reference to FIG. 12 to FIG. 14 and Table 1 to Table 13, in the present embodiment, the same description will be omitted.

The encoding apparatus may determine an intra prediction mode for the current block (S1510).

According to an embodiment, the encoding apparatus may perform various intra prediction modes for the current block so as to derive an intra prediction mode having an optimal rate-distortion (RD) cost. And, the derived intra prediction mode may be determined as the intra prediction mode of the current block. At this point, the encoding apparatus may derive an optimal intra prediction mode for the current block based on intra prediction modes including 2 non-directional intra prediction modes and 65 directional intra prediction modes. The 67 intra prediction modes have already been described above in detail with reference to FIG. 10.

Moreover, the encoding apparatus may generate information on the intra prediction mode of the current block. As information for indicating an intra prediction mode of the current block, the information on the intra prediction mode may include MPM flag information, MPM index information, remaining mode information, and so on.

According to an embodiment, the encoding apparatus may determine whether or not the determined intra prediction mode of the current block is included in the MPM candidates within the MPM list. And, then, the encoding apparatus may generate MPM flag information based on the determined result. For example, in case the intra prediction mode for the current block is included among the MPM candidates within the MPM list, the encoding apparatus may set the MPM flag information to 1. Alternatively, in case the intra prediction mode for the current block is not included among the MPM candidates within the MPM list, the encoding apparatus may set the MPM flag information to 0.

Additionally, in case the intra prediction mode for the current block is included among the MPM candidates within the MPM list, the encoding apparatus may generate MPM index information indicating the intra prediction mode for the current block among the MPM candidates. For example, in case the MPM list is configured by including 6 MPM candidates, the MPM index information may be index values within the range of 0~5.

In case the intra prediction mode for the current block is not included among the MPM candidates within the MPM list, the encoding apparatus may generate remaining mode information indicating the intra prediction mode for the current block among the remaining (or remainder) intra prediction modes excluding the MPM candidates. For example, as described above, in case 67 intra prediction modes are used and an MPM list is configured by including 6 MPM candidates, the remaining intra prediction modes may include 61 modes, which is the number of modes obtained by subtracting the number of MPM candidates from the total number of intra prediction modes. Therefore, the remaining mode information may be indicated as index values within a range of 0~60.

The encoding apparatus may generate prediction samples for the current block by performing intra prediction based on the determined intra prediction mode for the current block (S1520).

According to an embodiment, the encoding apparatus may derive at least one neighboring sample among neighboring samples of the current block based on the intra prediction mode, and, then, the encoding apparatus may generate prediction samples based on the at least one neighboring sample. Herein, the neighboring samples may include top-left corner neighboring samples, top side neighboring samples, and left side neighboring samples of the current block. For example, when the size of the current block is W×H and an x component of a top-left sample position of the current block is xN and a y component of the top-left sample position of the current block is yN, left side neighboring samples may be p[xN−1][yN] to p[xN-1][2H+yN−1], top-left corner neighboring samples may be p[xN−1]I[yN−1], and top side neighboring samples may be p[xN][yN−1] to p[2 W+xN-1][yN−1].

The encoding apparatus may encode image information including information on an intra prediction mode of the current block (S1530).

That is, the encoding apparatus may generate and encode information on an intra prediction mode including at least one of the above-described MPM flag information, MPM index information, and remaining mode information.

As described above, with the extension of the intra prediction mode to 67 modes, a larger number of bits are needed to indicate the remaining mode information. Accordingly, in order to enhance coding efficiency, when encoding the remaining mode information, a Truncated Binary (TB) binarization method may be used.

According to an embodiment, the encoding apparatus may encode the above-described MPM flag information, MPM index information, and remaining mode information based on a binarization process. At this point, the binarization process may be performed based on binarization type information, which is predetermined for MPM flag information, MPM index information, and remaining mode information, and, this is as described above in Table 12. According to Table 12, the remaining mode information is predefined as a Truncated Binary (TB) binarization type.

MPM candidates may be derived based on 67 intra prediction modes, which include 2 non-directional intra prediction modes and 65 directional intra prediction modes, as described above. Therefore, the remaining mode information may represent indication information for an intra prediction mode, which is derived based on remaining (or remainder) intra prediction modes excluding the number of MPM candidates (e.g., 6 modes) from the 67 intra prediction modes, by a value of a syntax element. For example, a value of a syntax element representing the remaining mode information may be expressed by an index value (e.g., values from 0 to 60) for indicating 61 intra prediction modes.

According to an embodiment, a value of a syntax element representing the remaining mode information may be derived by performing a Truncated Binary (TB) binarization process based on an algorithm of Table 13, which is presented above. As described above, the remaining mode information is expressed by the value of the syntax element, and, as indicated in Table 12, a maximum range (cMax) of the value of the syntax element for the remaining mode information may be equal to 60. Therefore, according to the algorithm of Table 13, in case the value of the syntax element representing the remaining mode information is smaller than a specific value that is derived based on the number of remaining intra prediction modes (i.e., cMax) excluding the number of MPM candidates, the value of the syntax element representing the remaining mode information may be equal to a value, which is derived by using a variable number of bits ranging from 1 bit to 5 bits based on the Truncated Binary (TB) binarization process. Conversely, in an opposite case, the value of the syntax element representing the remaining mode information may be derived as a value equal to a value of 6 bits based on the Truncated Binary (TB) binarization process. As shown in Table 13, by applying the Truncated Binary (TB) binarization process for the remaining mode information, the number of bits may be saved in accordance with the value of the syntax element.

Additionally, although it is not shown in the drawing, the encoding apparatus may derive residual samples for the current block based on original samples and prediction samples for the current block, and the encoding apparatus may generate information on residual for the current block based on the residual samples. Moreover, the encoding apparatus may encode image information including information on the residual and may output the encoded result in a bitstream format.

A bitstream may be transmitted to a decoding apparatus through a network or (digital) storage medium. Herein, a network may include a broadcast network and/or communication network, and so on, and a digital storage medium may include various types of storage media, such as USB, SD, CD, DVD, Blu-ray, HDD, SSD, and so on.

The above-described process of deriving a residual sample for the current block may be performed by the subtractor (231) of the encoding apparatus (200), which is disclosed in FIG. 2. The process of generating information on residual may be performed by the transformer (232) of the encoding apparatus (200), which is disclosed in FIG. 2. And, the process of encoding image information including the information on the residual may be performed by the entropy encoder (240) of the encoding apparatus (200), which is disclosed in FIG. 2.

FIG. 16 is a flowchart broadly illustrating a decoding method that may be performed by a decoding apparatus according to an embodiment of this specification.

The method disclosed in FIG. 16 may be performed by the decoding apparatus (300), which is disclosed in FIG. 3. More specifically, steps S1600 to S1620 of FIG. 16 may be performed by the predictor (330) and the intra predictor (331) shown in FIG. 3. Step S1630 of FIG. 16 may be performed by the adder (340), which is disclosed in FIG. 3. And, step S1610 of FIG. 16 may be performed by the entropy decoder (310) shown in FIG. 3. Additionally, the method disclosed in FIG. 16 may include the embodiments, which are described above in this specification. Therefore, detailed description on the content of this specification that overlap with the above-described embodiments shall be omitted or simplified.

Referring to FIG. 16, the decoding apparatus may configure a Most Probable Mode (MPM) list by deriving MPM candidates for the current block based on neighboring blocks located in neighboring (or surrounding) areas of the current block (S1600).

Herein, the neighboring blocks may include neighboring block A, neighboring block B, neighboring block C, neighboring block D, neighboring block E, neighboring block F, and/or neighboring block G, which are described above in FIG. 11.

According to an embodiment, 2 neighboring blocks may be used when configuring the MPM list. Herein, for example, neighboring block D and neighboring block B may be used. Neighboring block D may represent a left-side neighboring block located at a lowermost position among the left-side neighboring block being adjacent to the left side of the current block, and neighboring block B may represent an upper-side neighboring block located at a rightmost (or far right) position among the neighboring blocks being adjacent to the upper side of the current block.

The decoding apparatus may derive a first MPM candidate based on a first neighboring block (neighboring block D), and the decoding apparatus may derive a second MPM candidate based on a second neighboring block (neighboring block B).

For example, when the first neighboring block is available and intra prediction is applied to the first neighboring block, a first MPM candidate may be derived as an intra prediction mode of the first neighboring block. When the first neighboring block is unavailable (or not available) or intra prediction is not applied to the first neighboring block, a first MPM candidate may be derived as a planar intra prediction mode.

Additionally, for example, when the second neighboring block is available and intra prediction is applied to the second neighboring block and the second neighboring block is included in a current CTU, a second MPM candidate may be derived as an intra prediction mode of the second neighboring block. When the second neighboring block is unavailable (or not available) or intra prediction is not applied to the second neighboring block or the second neighboring block is not included in the current CTU, a second MPM candidate may be derived as a planar intra prediction mode.

The decoding apparatus may configure an MPM list based on the first MPM candidate and the second MPM candidate, which are derived as described above. At this point, in accordance with the number of candidates in the MPM list, the first MPM candidate and the second MPM candidate and remaining (or remainder) MPM candidates may be derived. As described above, the number of candidates included in the MPM list may vary in accordance with the algorithm. Herein, for example, the number of candidates may be equal to 3 candidates, 4 candidates, 5 candidates, 6 candidates, and so on. Additionally, as described above, additional MPM candidates may be derived based on conditions that are determined based on the first MPM candidate derived from the first neighboring block and the second MPM candidate derived from the second neighboring block.

For example, the decoding apparatus may determine whether or not the first MPM candidate and the second MPM candidate are identical, and the decoding apparatus may determine whether a mode number of the first MPM candidate or the second MPM candidate is greater than a mode number of a DC mode. At this point, when the first MPM candidate and the second MPM candidate are not identical, the decoding apparatus may determine whether the mode numbers of both the first MPM candidate and the second MPM candidate are greater than the DC mode or whether the mode number of any one of the two MPM candidates is greater than the DC mode. Additionally, when the mode numbers of both the first MPM candidate and the second MPM candidate are greater than the DC mode, the decoding apparatus may determine based on a difference between the mode numbers of the first MPM candidate and the second MPM candidate (e.g., whether the difference between the mode numbers of the two candidates is equal to 1, whether the difference between the mode numbers of the two candidates is equal to or greater than 2 or 62, and so on). As described above, the decoding apparatus may differently configure the MPM list in accordance with whether or not the above-described conditions are satisfied based on the first MPM candidate and the second MPM candidate. For example, an MPM list may include 6 MPM candidates, and 6 MPM candidates including the first MPM candidate and the second MPM candidate may be derived based on whether or not the above-described conditions are satisfied. At this point, the 6 MPM candidates may be mapped corresponding to index values of 0 to 5, and the 6 MPM candidates may be indicated within the MPM list based on the index values. Therefore, the decoding apparatus may determine which candidate is being indicated among the MPM candidates within the MPM list based on the index information, which is signaled by the encoding apparatus.

The above-described process of generating an MPM list by deriving MPM candidates based on the neighboring blocks of the current block is merely an example. And, therefore, the MPM list may be configured by using other various methods while considering coding efficiency. Additionally, various embodiments of configuring the MPM list, which are described in this specification, may be applied to the process of generating an MPM list. Since detailed description of the same has already been made with reference to FIG. 12 to FIG. 14 and Table 1 to Table 13, in the present embodiment, the same description will be omitted.

The decoding apparatus may derive an intra prediction mode for the current block based on the MPM list (S1610).

According to an embodiment, the decoding apparatus may obtain information on the intra prediction mode for the current block from a bitstream. As information for indicating an intra prediction mode of the current block, the information on the intra prediction mode may include MPM flag information, MPM index information, remaining mode information, and so on.

Firstly, the decoding apparatus may obtain MPM flag information indicating whether or not an intra prediction mode for the current block is included, among the MPM candidates within the MPM list. Additionally, the decoding apparatus may obtain MPM index information or remaining mode information based on the MPM flag information.

For example, when the MPM flag information indicates 1, the decoding apparatus may determine that an intra prediction mode for the current block is included among the MPM candidates within the MPM list. And, in this case, the decoding apparatus may obtain MPM index information indicating the intra prediction mode for the current block among the MPM candidates. The decoding apparatus may derive the MPM candidate being indicated by the MPM index information within the MPM list as the intra prediction mode for the current block.

When the MPM flag information indicates 0, the decoding apparatus may determine that an intra prediction mode for the current block is not included among the MPM candidates within the MPM list. And, in this case, the decoding apparatus may obtain remaining mode information indicating the intra prediction mode for the current block among the remaining intra prediction modes excluding the MPM candidates. The decoding apparatus may derive the intra prediction mode being indicated by the remaining mode information as the intra prediction mode for the current block.

As described above, with the extension of the intra prediction mode to 67 modes, a larger number of bits are needed to indicate the remaining mode information. Accordingly, in order to enhance coding efficiency, the remaining mode information may be obtained by being decoded based on a Truncated Binary (TB) binarization method.

According to an embodiment, the decoding apparatus may decode the above-described MPM flag information, MPM index information, and remaining mode information based on a binarization process. At this point, the binarization process may be performed based on binarization type information, which is predetermined for MPM flag information, MPM index information, and remaining mode information, and, this is as described above in Table 12. According to Table 12, the remaining mode information is predefined as a Truncated Binary (TB) binarization type.

MPM candidates may be derived based on 67 intra prediction modes, which include 2 non-directional intra prediction modes and 65 directional intra prediction modes, as described above. Therefore, the remaining mode information may represent indication information for an intra prediction mode, which is derived based on remaining (or remainder) intra prediction modes excluding the number of MPM candidates (e.g., 6 modes) from the 67 intra prediction modes, by a value of a syntax element. For example, a value of a syntax element representing the remaining mode information may be expressed by an index value (e.g., values from 0 to 60) for indicating 61 intra prediction modes.

According to an embodiment, a value of a syntax element representing the remaining mode information may be derived by performing a Truncated Binary (TB) binarization process based on an algorithm of Table 13, which is presented above. As described above, the remaining mode information is expressed by the value of the syntax element, and, as indicated in Table 12, a maximum range (cMax) of the value of the syntax element for the remaining mode information may be equal to 60. Therefore, according to the algorithm of Table 13, in case the value of the syntax element representing the remaining mode information is smaller than a specific value that is derived based on the number of remaining intra prediction modes (i.e., cMax) excluding the number of MPM candidates, the value of the syntax element representing the remaining mode information may be equal to a value, which is derived by using a variable number of bits ranging from 1 bit to 5 bits based on the Truncated Binary (TB) binarization process. Conversely, in an opposite case, the value of the syntax element representing the remaining mode information may be derived as a value equal to a value of 6 bits based on the Truncated Binary (TB) binarization process. As shown in Table 13, by applying the Truncated Binary (TB) binarization process for the remaining mode information, the number of bits may be saved in accordance with the syntax element value.

The decoding apparatus may generate prediction samples for the current block by performing intra prediction based on the derived intra prediction mode for the current block (S1620).

According to an embodiment, the decoding apparatus may derive at least one neighboring sample among neighboring samples of the current block based on the intra prediction mode, and, then, the decoding apparatus may generate prediction samples based on the at least one neighboring sample. Herein, the neighboring samples may include top-left corner neighboring samples, top side neighboring samples, and left side neighboring samples of the current block. For example, when the size of the current block is W×H and, an x component of a top-left sample position of the current block is xN and a y component of the top-left sample position of the current block is yN, left side neighboring samples may be p[xN−1][yN] to p[xN−1][2H+yN−1], top-left corner neighboring samples may be p[xN−1]I[yN−1], and top side neighboring samples may be p[xN][yN−1] to p[2 W+xN−1][yN−1].

The decoding apparatus may generate a reconstructed picture for the current block based on prediction samples (S1630).

According to an embodiment, the decoding apparatus may directly use prediction samples as reconstructed samples in accordance with the prediction mode, or the decoding apparatus may generate reconstructed samples by adding residual samples to the prediction samples.

In case a residual sample for the current block exists, the decoding apparatus may receive information on residual for the current block. The information on residual may include transform coefficients of the residual samples. The decoding apparatus may derive residual samples (or a residual sample array) for the current block based on the residual information. The decoding apparatus may generate reconstructed samples based on the prediction samples and the residual samples, and the decoding apparatus may derive a reconstructed block or reconstructed picture based on the reconstructed samples. Thereafter, as described above, the decoding apparatus may apply an in-loop filtering procedure, such as a deblocking filtering and/or SAO procedure, to the reconstructed picture in order to enhance subjective/objective image quality, as needed.

In the aforementioned embodiments, although the methods have been described based on the flowcharts in the form of a series of steps or units, the embodiments of this specification are not limited to the order of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of rights of this specification.

The aforementioned method according to this specification may be implemented in a software form, and the encoding apparatus and/or the decoding apparatus according to this specification may be included in an apparatus for performing image processing, for example, TV, a computer, a smartphone, a set-top box or a display device.

In this specification, when embodiments are implemented in a software form, the aforementioned method be implemented as a module (process, function, and so on) for performing the aforementioned function. The module may be stored in the memory and executed by the processor. The memory may be placed inside or outside the processor and connected to the processor by various well-known means. The processor may include application-specific integrated circuits (ASICs), other chipsets, logic circuits and/or data processing devices. The memory may include read-only memory (ROM), random access memory (RAM), flash memory, memory cards, storage media and/or other storage devices. That is, the embodiments described in this specification may be implemented and performed on a processor, a micro-processor, a controller or a chip. For example, the function units illustrated in the drawings may be implemented and performed on a computer, a processor, a micro-processor, a controller or a chip. In this case, information (e.g., information on instructions) or an algorithm for such implementation may be stored in a digital storage medium.

Furthermore, the decoding apparatus and the encoding apparatus to which this specification is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT)

video device may include a game console, a Blu-ray player, Internet access TV, a home theater system, a smartphone, a tablet PC, and a digital video recorder (DVR).

Furthermore, the processing method to which this specification is applied may be produced in the form of a program executed by a computer, and may be stored in a computer-readable recording medium. Multimedia data having a data structure according to this specification may also be stored in a computer-readable recording medium. The computer-readable recording medium includes all types of storage devices in which computer-readable data is stored. The computer-readable recording medium may include Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this specification may be implemented as a computer program product using program code. The program code may be performed by a computer according to an embodiment of this specification. The program code may be stored on a carrier readable by a computer.

Figure 17:
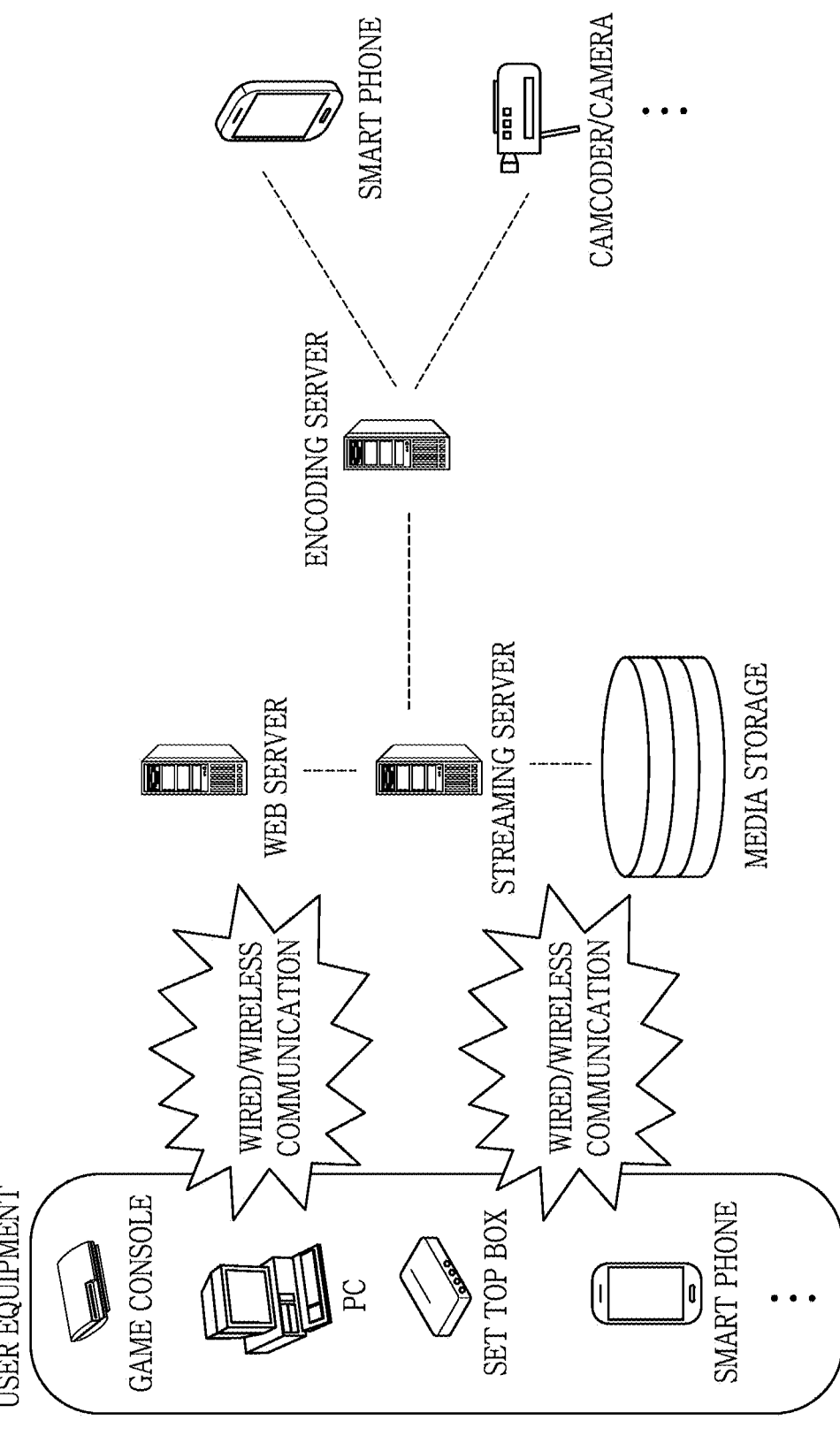
FIG. 17 illustrates an example of a content streaming system to which embodiments disclosed in this specification may be applied.

FIG. 17 illustrates an example of a content streaming system to which embodiments disclosed in this specification may be applied.

Referring to FIG. 17, the content streaming system to which the embodiment(s) of the present specification is applied may largely include an encoding server, a streaming server, a web server, a media storage, a user device, and a multimedia input device.

The encoding server compresses content input from multimedia input devices such as a smartphone, a camera, a camcorder, and so on, into digital data to generate a bitstream and transmit the bitstream to the streaming server. As another example, when the multimedia input devices such as smartphones, cameras, camcorders, and so on, directly generate a bitstream, the encoding server may be omitted.

The bitstream may be generated by an encoding method or a bitstream generating method to which the embodiment(s) of the present specification is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

Meanwhile, the decoding apparatus and the encoding apparatus to which the embodiment of the present disclosure is applied may be included in the digital device. The "digital device" includes, for example, all digital devices capable of performing at least one of transmitting, receiving, processing, and outputting data, contents, services, and the like. Here, processing the data, the contents, the service, and the like, by the digital device includes an operation of encoding and/or decoding the data, the contents, the service, and the like. The digital device transmits/receives data by paring or connecting (hereinafter, referred to as 'paring') to another digital device, an external server, and so on, through a wired/wireless network and converts the data as necessary.

Digital devices may, for example, include both standing devices, such as network TV, Hybrid Broadcast Broadband TV (HBBTV), Smart TV, internet protocol television (IPTV), personal computer (PC), and so on, and mobile devices or handheld devices, such as Personal Digital Assistant (PDA), Smart Phone, Tablet PC, laptop computer, and so on. In this specification, for simplicity and convenience, in FIG. 21, which will hereinafter be described in detail, a digital TV will be illustrated and described as an embodiment of the digital device, and, in FIG. 20, a mobile (or handheld) device will be illustrated and described in detail as an embodiment of the digital device.

The "wired/wireless network" described in the present disclosure is collectively referred to as a communication network that supports various communication standards or protocols for interconnection or/and data transmission/reception between the digital devices or between the digital device and the external server. The wired/wireless networks may include both communication networks currently supported or to be supported in the future by the standard and communication protocols therefor and may be formed by communication standards or protocols for wired communication, such as Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet Access (HSDPA), Long Term Evolution (LTE), or Wi-Fi Direct, for example.

Hereinafter, in the present disclosure, when being just referred to as the digital device, the digital device may mean the standing device or the mobile device or mean both the standing device and the mobile device.

Further, the digital device as an intelligent device that supports a broadcast receiving function, a computer function or support, and at least one external input, for example, may support e-mail, web browsing, banking, a game, an application, and so on. Moreover, the digital device may include an interface for supporting at least one input or control means (hereinafter, referred to as input means) such as a manual input device, a touch screen, a space remote controller, and so on. The digital device may use a standardized universal operating system (OS). For example, the digital device may add, delete, amend, update, and so on, various applications on a universal OS kernel and configure, and configure and provide a more user-friendly environment through the addition, deletion, and amendment of various applications.

The external input described in the present disclosure includes all input means or digital devices which are connected to an external input device, i.e., the digital device wiredly/wirelessly to transmit/receive related data through the wired/wireless connection and process the transmitted/received data. Here, the external input includes all digital devices such as a High Definition Multimedia Interface (HDMI), a game device such as a play station or an X-box, a smartphone, a tablet PC, a printer device, and a smart TV, for example.

Further, the "server" described in the present disclosure as a meaning including all digital devices or systems supplying data to a client [0034], i.e., the digital device is also referred to as a processor. The server may include a portal server providing a webpage or a web content, an advertising server providing advertising data, a content server providing a content, an SNS server providing a social network service (SNS), a service server or manufacturing server provided by a manufacturer, and the like, for example.

Besides, the "channel" described in the present disclosure which means a path, a means, and the like for transmitting/receiving data and a broadcasting channel may be taken as an example of the "channel". Here, the broadcasting channel is expressed as a term such as a physical channel, a virtual channel, a logical channel, and so on, according to activation of digital broadcasting. The broadcasting channel may be referred to as a broadcasting network. As such, the broadcasting channel refers to a channel for providing a broadcasting content provided by a broadcasting station or accessing the broadcasting content by a receiver and since the broadcasting content which is primarily based on real-time broadcasting, the broadcasting channel is also referred to as a live channel. However, in recent years, a medium for broadcasting is further diversified and non-real time broadcasting is also activated in addition to the real-time broadcasting, and as a result, the live channel may be just appreciated as a term meaning the entirety of the broadcasting channel including the non-real time broadcasting in some cases in addition to the real-time broadcasting.

In the present disclosure, in addition to the broadcasting channel, an "arbitrary channel" is further defined in association with the channel. The arbitrary channel may be provided together with a service guide such as an Electronic Program Guide (EPG) together with the broadcasting channel and the service guide, a Graphic User Interface (GUI), or an On-Screen Display OSD) screen may be configured/provided only with the arbitrary channel.

Unlike a broadcasting channel having a channel number pre-promised between a transmitter and a receiver, the arbitrary channel is a channel arbitrarily allocated by the receiver and a channel number which is not basically duplicated with a channel number for expressing the broadcasting channel is allocated to the arbitrary channel. For example, when a specific broadcasting channel is tuned, the receiver receives the broadcasting content and a broadcasting signal for transmitting signaling information for the broadcasting content through the tuned channel. Here, the receiver parses channel information from the signaling information, and configures a channel browser, EPG, and so on, based on the parsed channel information and provides the configured channel browser, EPG, and so on, to a user. When the user makes a channel switch request through an input means, the receiver is a scheme to respond to the channel switch request.

As such, since the broadcasting channel is contents pre-promised between the transmitter and the receiver, when the arbitrary channel is allocated duplicatively with the broadcasting channel, a confusion of the user is caused or there is a confusion possibility, and as a result, it is preferable not to duplicatively allocate the channel as described above. Meanwhile, since there is still a possibility of the confusion in a channel surfing process of the user even though the arbitrary channel number is not duplicatively allocated with the broadcasting channel as described above, allocating the arbitrary channel number by considering the confusion possibility is required. The reason is that the arbitrary channel according to the embodiment of the present disclosure may also be implemented to be accessed like the broadcasting channel similarly in response to the channel switch request of the user through the input means similarly to the conventional broadcasting channel. Accordingly, the arbitrary channel number may be defined and represented as a form with characters such as arbitrary channel-1, arbitrary channel-2, and so on, rather than a number form like the broadcasting channel for convenience of an access to the arbitrary channel and convenience of distinguishment or identification from the broadcasting channel number. Meanwhile, in this case, even though the representation of the arbitrary channel number may be the form with the characters such as arbitrary channel-1, the arbitrary channel number may be recognized and implemented as the number form such as the number of the broadcasting channel internally in the receiver. Besides, the arbitrary channel number may be provided as the number form like the broadcasting channel and the channel number may be defined and represented by various schemes which may be distinguished from the broadcasting channel, such as video content channel-1, title-1, video-1, and so on.

The digital device executes a web browser for a web service to provide various forms of web pages to the user. Here, the web page also includes a web page including a video content and in the embodiment of the present disclosure, the video content is separated and processed separately or independently from the web page. In addition, the arbitrary channel number may be allocated to the separated video content and the separated video content may be provided through the service guide and the user may implement the separated video content to be output according to the channel switch request in the service guide or a broadcasting channel viewing process. Besides, even for the service such as the broadcasting content, the game, the application, and so on, in addition to the web service, a predetermined content, an image, an audio, an item, and so on, may be separated and processed independently from the broadcasting content, the game, or the application itself and the arbitrary channel number may be allocated for reproduction, processing, and so on, and implemented as described above.

Figure 18:
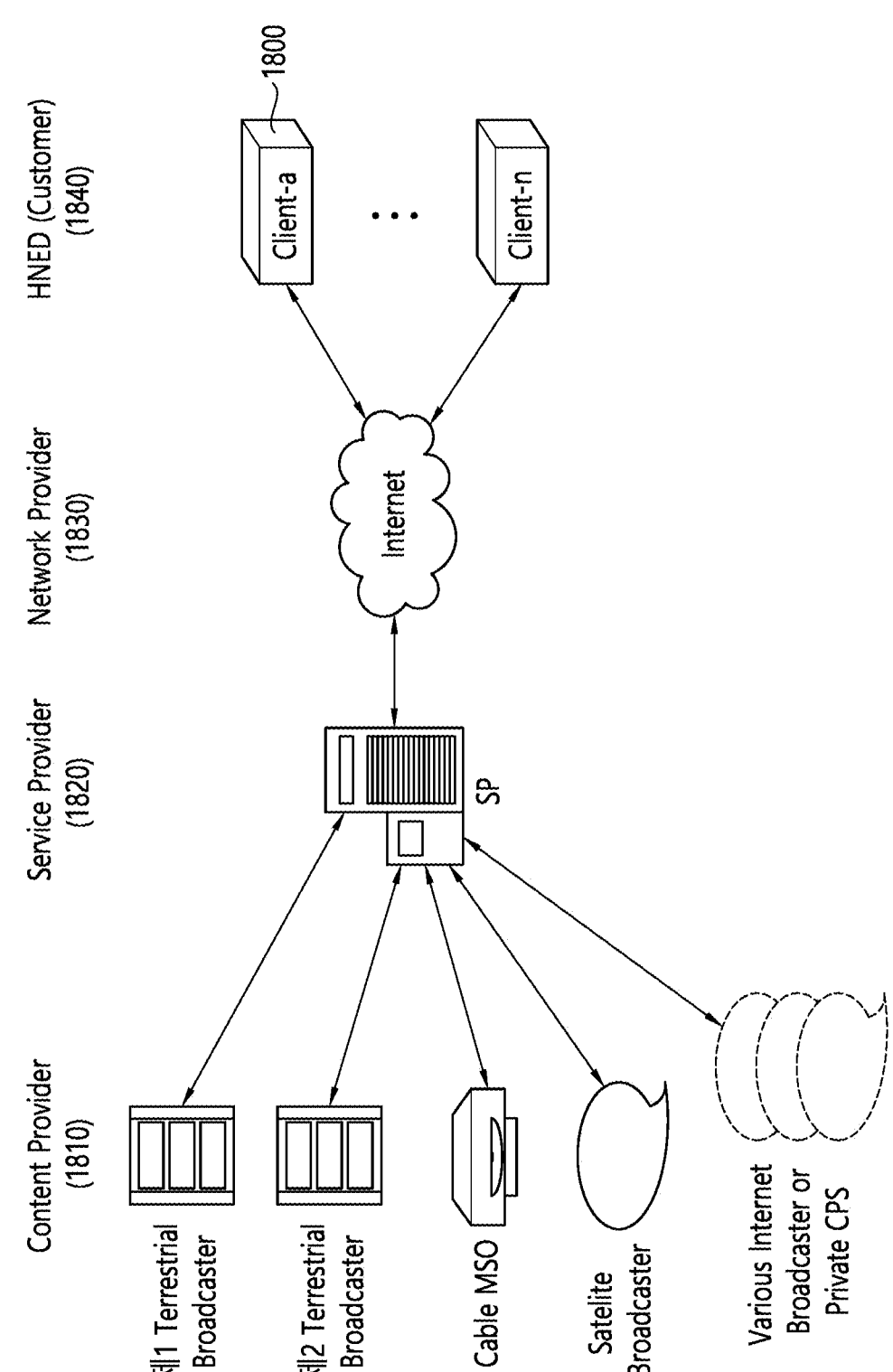
FIG. 18 is a diagram schematically illustrating one example of a service system including a digital device.

FIG. 18 is a diagram schematically illustrating one example of a service system including a digital device.

The service system including the digital device includes a content provider (CP) (1810), a service provider (SP) (1820), a network provider (NP) (1830), and a home network end user (HNED) (customer) (1840). Here, the HNED (1840) is, for example, a client (1800), i.e., the digital device. The content provider (1810) produces and provides various contents. As illustrated in FIG. 18, as the content provider (1810), a terrestrial broadcaster, a cable system operator (SO) or multiple system operators (SO), a satellite broadcaster, various Internet broadcasters, private content providers (CPs), and so on, may be exemplified. Meanwhile, the content provider (1810) provides various applications, and so on, in addition to the broadcasting content.

The service provider (1820) service-packages the content provided by the content provider (1810) and provides the content to the HNED (1840). For example, the service provider (1820) of FIG. 18 packages and provides a first terrestrial broadcast, a second terrestrial broadcast, the cable MSO, a satellite broadcast, various Internet broadcasts, applications, and so on, to the HNED (1840).

The service provider (1820) provides the service to the client (1800) by a uni-cast or multi-cast scheme. Meanwhile, the service provider (1820) may transmit data to multiple pre-registered clients (1800) at once and to this end, the service provider (1820) may use an Internet Group Management Protocol (IGMP), and so on.

The content provider (1810) and the service provider (1820) may be the same or single entity. For example, the content provided by the content provider (1810) is service-packaged and provided to the HNED (1840) and a function of the service provider (1820) may be also performed together, or vice versa.

The network provider (1830) provides a network for data exchange between the content provider (1810) or/and the service provider (1820) and the client (1800).

The client (1800) may transmit/receive data by constructing a home network.

Meanwhile, the content provider (1810) or/and the service provider (1820) in the service system may use a conditional access or content protection means for protection of the transmitted content. In this case, the client (1800) may use a processing means such as a cable card (point of deployment (POD)), downloadable CAS (DCAS), and so on, in response to the conditional access or content protection.

Besides, the client (1800) may use an interactive service through the network (or communication network). In this case, the client (1800) may still perform the function of the content provider and the conventional service provider (1820) may receive the function and transmit the received function to the client again.

Figure 19:
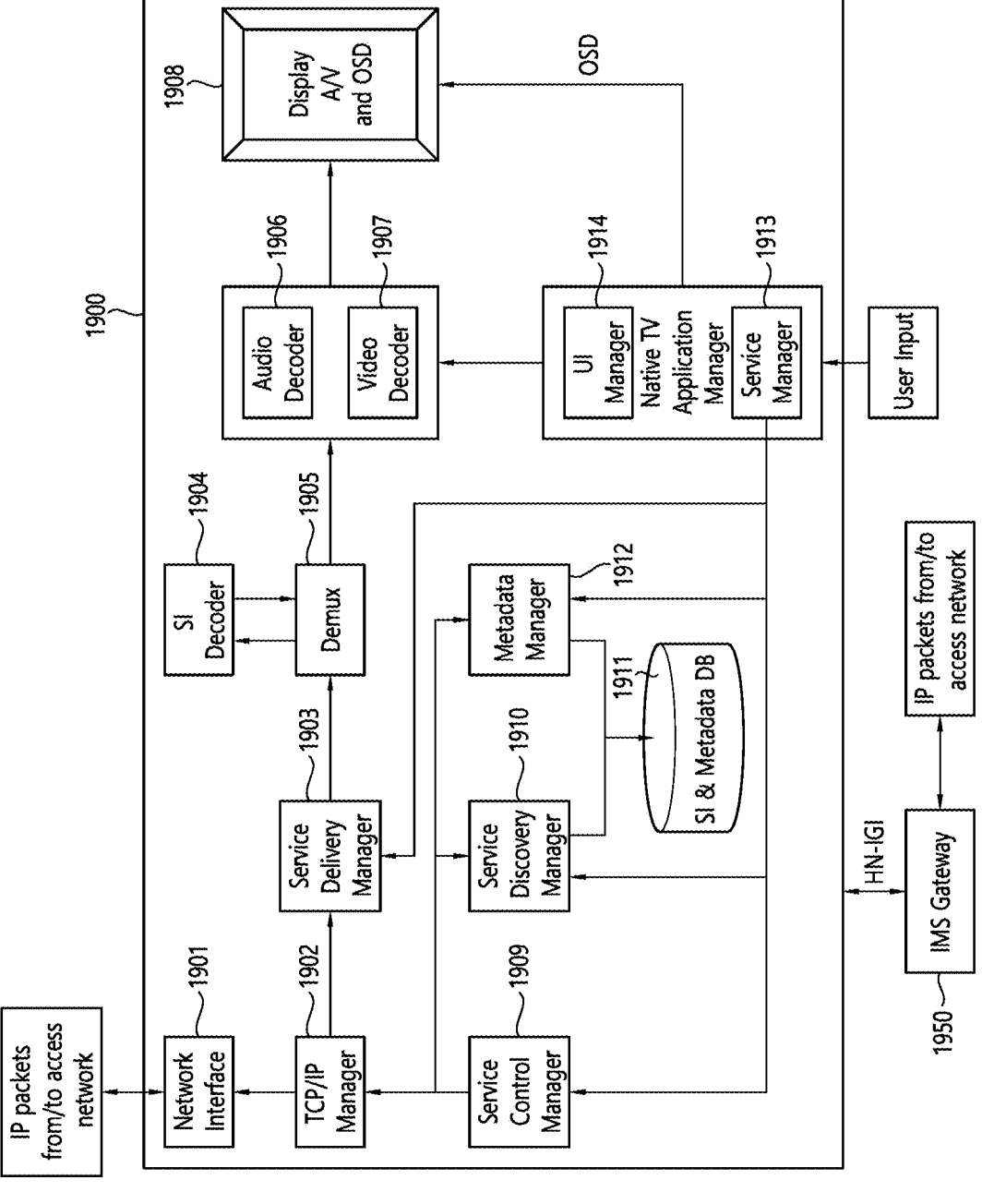
FIG. 19 is a block diagram illustrated for describing one embodiment of a digital device.

FIG. 19 is a block diagram illustrated for describing one embodiment of a digital device. Here, FIG. 19 may correspond to the client (1800) of FIG. 18 and means the digital device.

The digital device (1900) is configured to include a Network Interface (1901), a TCP/IP Manager (1902), a Service Delivery Manager (1903), an SI decoder (1904), a Demux (1905), an Audio Decoder (1906), a Video Decoder (1907), a Display A/V and OSD Module (1908), a Service Control Manager (1909), a Service Discovery Manager (1910), an SI & Metadata DB (1911), a Metadata Manager (1912), a service manager (1913), a UI manager (1914), and the like.

The network interface (1901) receives or transmits Internet protocol (IP) packets through the network. In other words, the network interface (1901) receives the service, the content, and so on, from the service provider (1820) through the network.

The TCP/IP manager (1902) takes part in delivering IP packets received by the digital device (1900) and IP packets transmitted by the digital device (1900), i.e., packets between a source and a destination. In addition, the TCP/IP manager (1902) classifies the received packet(s) to correspond to an appropriate protocol and outputs the classified packet(s) to the service delivery manager (1905), the service discovery manager (1910), the service control manager (1909), the metadata manager (1912), and so on. The service delivery manager (1903) is responsible for the control of the received service data. For example, the service delivery manager (1903) may use an RTP/RTCP when controlling real-time streaming data. When transmitting the real-time streaming data by using the RTP, the service delivery manager (1903) parses the received data packet according to the RTP and transmits the parsed data packet to the DEMUX (1905) or store the transmitted data packet in the SI & metadata database (1911) according to the control of the service manager (1913). In addition, the service delivery manager (1903) feeds back the network reception information to a server providing the service by using the RTCP. The DEMUX (1905) demultiplexes the received packet to audio, video, system information (SI) data, and so on, and transmits the audio, video, system information (SI) data, and so on, to the audio/video decoder (1906/1907) and the SI decoder (1904), respectively.

The SI decoder (1904) decodes service information such as Program Specific Information (PSI), Program and System Information Protocol (PSIP), Digital Video Broadcasting-Service Information (DVB-SI), and so on, for example.

Further, the SI decoder (1904) stores the decoded service information, for example, in the SI & metadata database (1911). The stored service information may be read and used by the corresponding configuration by a request of the user, and so on, for example.

The audio/video decoder (1906/1907) decodes each audio data and video data demultiplexed by the DEMUX (1905). The decoded audio data and video data are provided to the user through the display (1908).

The application manager may be configured to include the UI manager (1914) and the service manager (1913), for example. The application manager may manage an overall state of the digital device (1900) and provide a user interface, and manage another manager.

The UI manager (1914) provides the Graphic User Interface (GUI) for the user by using the On Screen Display (OSD) and receives a key input from the user and performs a device operation depending on the input. For example, when the UI manager (1914) receives the key input for channel selection from the user, the UI manager (1914) transmits the key input signal to the service manager (1913).

The service manager (1913) controls a manager associated with the service, such as the service delivery manager (1903), the service discovery manager (1910), the service control manager (1909), the metadata manager (1912), and so on.

Further, the service manager (1913) creates a channel map and selects the channel by using the channel map according to the key input received from the user interface manager (1914). In addition, the service manager (1913) receives the service information of the channel from the SI decoder (1904) and sets an audio/video packet identifier (PID) of the selected channel to the DEMUX (1905). The set PID is used for the demultiplexing process. Accordingly, the DEMUX (1905) filters audio data, video data, and SI data by using the PID.

The service discovery manager (1910) provides information required for selecting a service provider providing the service. When receiving a signal for the channel selection from the service manager (1913), the service discovery manager (1910) finds the service by using the information.

The service control manager (1909) is responsible for selecting and controlling the service. For example, when the user selects a live broadcasting service such as the conventional broadcasting scheme, the service control manager (1909) uses the IGMP or RTSP and when the user selects a service such as Video on Demand (VOD), the service control manager (1909) performs the selection and the control of the service by using the RTSP. The RTSP may provide a trick mode for real-time streaming. Further, the service control manager (1909) may initialize and manage a session through an IMS gateway (1950) by using an IP Multimedia Subsystem (IMS) and a Session Initiation Protocol (SIP). The protocols may be an embodiment and another protocol may be used according to an implementation example.

The metadata manager (1912) manages metadata associated with the service and stores the metadata in the SI & metadata database (1911).

The SI & metadata database (1911) stores the service information decoded by the SI decoder (1904), metadata managed by the metadata manager (1912), and information required for selecting the service provider provided by the service discovery manager (1910). Further, the SI & metadata database (1911) may store set-up data for the system, and so on.

The SI & metadata database (1911) may be implemented by using a non-volatile RAM (NVRAM) or a flash memory.

Meanwhile, the IMS gateway (1950) is a gateway that collects functions required for accessing an IMS based IPTV service.

Figure 20:
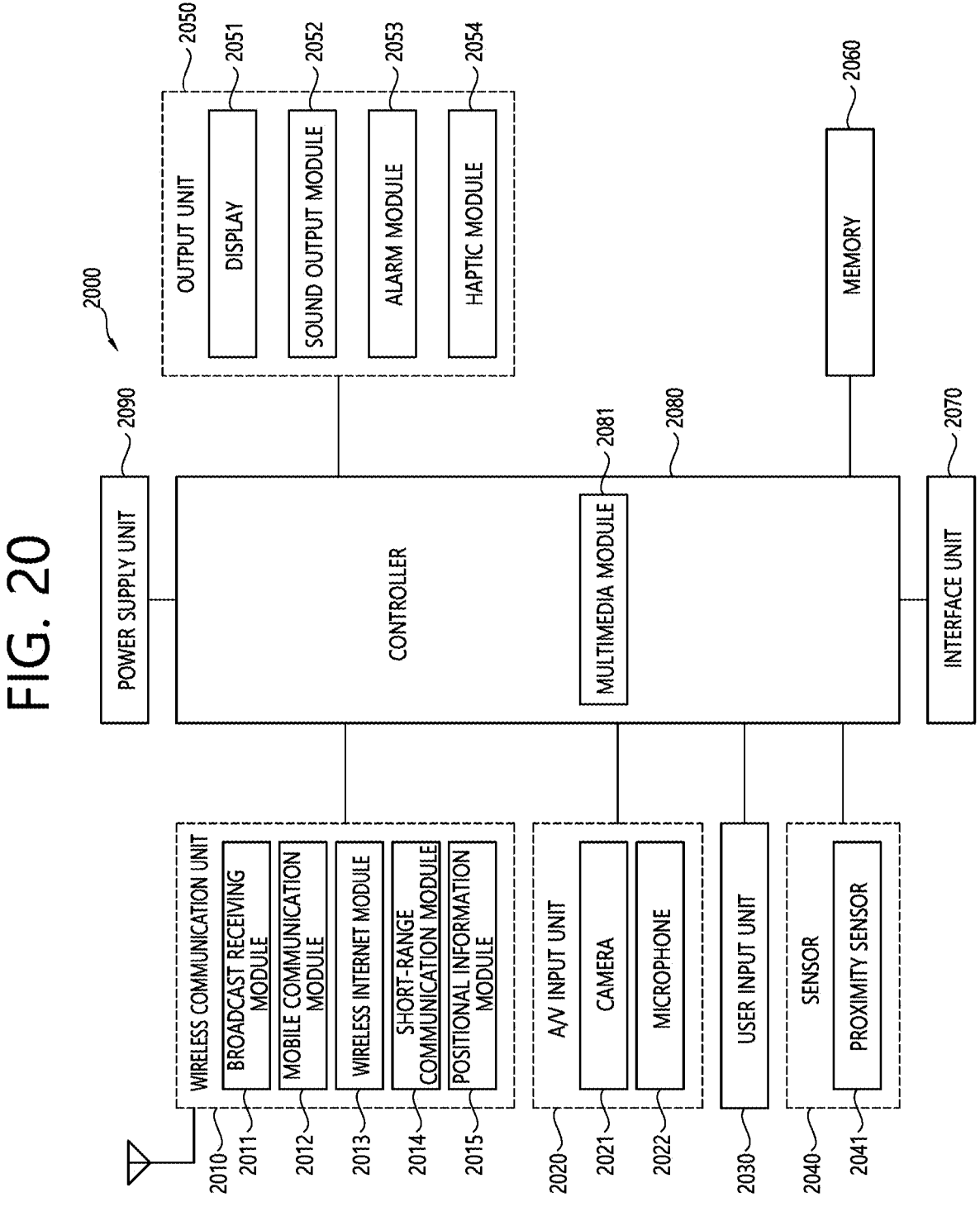
FIG. 20 is a block diagram illustrated for describing another embodiment of a digital device.

FIG. 20 is a block diagram illustrated for describing another embodiment of a digital device. In particular, FIG. 20 is a block diagram of a mobile device as another embodiment of the digital device.

Referring to FIG. 20, the mobile device (2000) may include a wireless communication unit (2010), an audio/video (A/V) input unit (2020), a user input unit (2030), a sensing unit (2040), an output unit (2050), a memory (2060), an interface unit (2070), a control unit (2080), and a power supply unit (2090). The components illustrated in FIG. 20 are not required. Therefore, a mobile device having more components there than or less components there than may be implemented.

The wireless communication unit (2010) may include one or more modules which enable wireless communication between the mobile device (2000) and the wireless communication system or between the mobile device and the network at which the mobile device is positioned. For example, the wireless communication unit (2010) may include a broadcast receiving module (2011), a mobile communication module (2012), a wireless Internet module (2013), a short-range communication module (2014), and a positional information module (2015).

The broadcast receiving module (2011) receives broadcast signals and/or broadcast related information from an external broadcast management server through the broadcasting channel. Here, the broadcasting channel may include a satellite channel and a terrestrial channel. The broadcast management server may be a server for generating and transmitting the broadcast signals and/or broadcast related information or a server for receiving previously generated broadcast signals and/or broadcast related information and transmitting the received broadcast signals and/or broadcast related information to the terminal. The broadcast signals may include a TV broadcast signal, a radio broadcast signal, and a data broadcast signal and include even a broadcast signal of a type in which the data broadcast signal is combined with the TV broadcast signal or the radio broadcast signal.

The broadcast related information may mean information related to the broadcast channel, a broadcast program, or a broadcast service provider. The broadcast related information may be provided even through a mobile communication network. In this case, the broadcast related information may be received by the mobile communication module (2012).

The broadcast related information may exist as various forms, e.g., a form such as Electronic Program Guide (EPG) or Electronic Service Guide (ESG).

For example, the broadcast receiving module (2011) may receive a digital broadcast signal by using a digital broadcasting system such as ATSC, Digital Video Broadcasting-Terrestrial (DVB-T), DVB-S (satellite), Media Forward Link Only (MediaFLO), DVB-H (handheld), Integrated Services Digital Broadcast-Terrestrial (ISDB-T), and so on. Of course, the broadcast receiving module (2011) may be configured to be suitable for other broadcast systems as well as the digital broadcasting system.

The broadcast signal and/or broadcast related information received through the broadcast receiving module (2011) may be stored in the memory (2060).

The mobile communication module (2012) transmits/receives at least one radio signal to at least one of a base station, an external terminal, and a server on a mobile communication network. The radio signal may include various types of data depending on transmitting/receiving a voice signal, a video communication signal, or a text/multimedia message.

The wireless Internet module (2013) may include a module for wireless Internet access and may be internally or externally built in the mobile device (2000). As the wireless Internet technology, wireless LAN (WLAN) (Wi-Fi), wireless broadband (Wibro), world interoperability for microwave access (Wimax), high speed downlink packet access (HSDPA), or the like, may be used.

The short-range communication module (2014) represents a module for short-range communication. As short-range communication technology, Bluetooth, radio frequency identification (RFID), infrared data association (IrDA), ultra wideband (UWB), ZigBee, RS-232, RS-485, or the like may be used.

The positional information module (2015) as a module for obtaining positional information of the mobile device (2000) may include a Global Position System (GPS) module as an example.

The A/V input unit (2020) which is used for inputting an audio signal or a video signal may include a camera (2021) and a microphone (2022). The camera (2021) processes an image frame such as a still image or a moving picture obtained by an image sensor in a video call mode or a photographing mode. The processed image frame may be displayed on the display unit (2051).

The images frame processed by the camera (2021) may be stored in the memory (2060) or transmitted to the outside through the wireless connection unit (2010). Two or more cameras (2021) may be provided according to a use environment.

The microphone (2022) receives an external sound signal by a microphone in a call mode or a recording mode, a voice recognition mode, or the like, and processes the received external sound signal as electrical voice data. The processed voice data may be converted into a transmittable form and transmitted to a mobile communication base station through the mobile communication module (2012) in the case of the call mode. Various noise removal algorithms may be implemented in the microphone (2022) to remove noise generated in receiving the external sound signal.

The user input unit (2030) generates input data for the user to control the operation of the terminal. The user input unit (2030) may include a keypad, a dome switch, a touch pad (resistive/capacitive), a jog wheel, a jog switch, and the like.

The sensing unit (2040) generates a sensing signal for an operation control of the mobile device (2000) by sensing a current state of the mobile device (2000), such as an opening/closing state of the mobile device (2000), a position of the mobile device (2000), presence of a user contact, an orientation of the mobile device, acceleration/deceleration of the mobile device, and so on. For example, when the mobile device (2000) is moved or inclined, the position or a tilt of the mobile device may be sensed. Further, whether the power supply unit (2090) supplies power, whether the interface unit (2070) is combined with the external device, and the like may also be sensed. Meanwhile, the sensing unit (2040) may include a proximity sensor (2041) including near field communication (NFC).

The output unit (2050) which is used for generating an output related to sight, hearing, or touch may include a display (2051), a sound output module (2052), an alarm unit (2053), and a haptic module (2054).

The display (2051) displays (outputs) information processed by the mobile device (2000). For example, when the mobile device is in the call mode, the display (2051) displays a user interface (UI) or graphic user interface (GUI) associated with the call. When the mobile device (2000) is in the video call mode or the photographing mode, the display (2051) displays a photographed or/and received image or UI and GUI.

The display (2051) may include at least one of a liquid crystal display (LCD), a thin film transistor-liquid crystal display (TFT LCD), an organic light-emitting diode (OLED), a flexible display, and a 3D display.

Some displays among them may be configured as a transparent or light transmissive type to view the outside through the displays. This may be called a transparent display and a representative example of the transparent display includes a transparent OLED (TOLED), and the like. A rear structure of the display unit (2051) may also be configured as a light transmission structure. By such a structure, the user may see an object positioned behind a terminal body through a region occupied by the display unit (2051) of the terminal body.

According to an implementation form of the mobile device (2000), two or more displays (2051) may exist. For example, in the mobile device (2000), the plurality of displays may be separated from each other or integrally disposed on one surface, and further, disposed on different surfaces, respectively.

When the display (2051) and a sensor (hereinafter, referred to as 'touch sensor') form a mutual layer structure (hereinafter, referred to as 'touch screen'), the display (2051) may be used as an input apparatus as well as the output apparatus. The touch sensor may take the form of, for example, a touch film, a touch sheet, a touch pad, or the like.

The touch sensor may be configured to convert a change in pressure applied to a specific portion of the display unit (2051) or capacitance generated at the specific portion of the display unit (2051) into an electrical input signal. The touch sensor may be configured to detect touch pressure as well as a touched position and area.

When there is a touch input for the touch sensor, a signal(s) corresponding to the touch input is/are sent to a touch controller. The touch controller processes the signal(s) and thereafter, transmits data corresponding thereto to the controller (2080). As a result, the controller (2080) may know which region of the display (2051) is touched.

The proximity sensor (2041) may be disposed in an internal area of the mobile device covered by the touch screen or near the touch screen. The proximity sensor refers to a sensor that detects the presence or absence of an object approaching a predetermined detection surface or an object which exists nearby without mechanical contact using electromagnetic field force or infrared rays. The proximity sensor has a longer lifetime and higher utilization than the touch sensor.

Examples of the proximity sensor include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, and the like. When the touch screen is a capacitive sensor, the touch screen is configured to detect the proximity of the pointer by a change of an electric field depending on the proximity of the pointer. In this case, the touch screen (touch sensor) may be classified as the proximity sensor.

Hereinafter, for easy description, the act of recognizing that the pointer is positioned on the touch screen while the pointer is not in contact with the touch screen is referred to as "proximity touch" and the act of actually touching the pointer on the screen is referred to as "contact touch". The position where the pointer is proximately touched on the touch screen means a position where the pointer is vertically corresponding to the touch screen when the pointer is touched.

The proximity sensor detects the proximity touch and a proximity touch pattern (e.g., a proximity touch distance, a proximity touch direction, a proximity touch speed, a proximity touch time, a proximity touch position, a proximity touch movement state, and the like). Information corresponding to the sensed proximity touch operation and the proximity touch pattern may be output on the touch screen.

The sound output module (2052) may output audio data received from the wireless communication unit (2010) or stored in the memory (2060) in call signal receiving, the call mode or a recording mode, a voice recognition mode, a broadcast receiving mode, and the like. The sound output module (2052) may also output a sound signal related to a function (e.g., a call signal receiving sound, a message receiving sound, or the like) performed by the mobile device (2000). The sound output module (2052) may include a receiver, a speaker, a buzzer, and the like.

The alarm unit (2053) outputs a signal for notifying occurrence of an event of the mobile device (2000). Examples of the event which occurs in the mobile device include call signal reception, message reception, key signal input, touch input, and the like. The alarm unit (2053) may also output another form other than a video signal or an audio signal, for example, a signal for notifying the occurrence of the event by vibration.

The video signal or the audio signal may be output through the display unit (2051) or the sound output module (2052) so that the display (2051) and the display (2051) and the sound output module (2052) may be classified as a part of the alarm unit (2053).

The haptic module (2054) generates various tactile effects that the user may feel. A typical example of the tactile effect generated by the haptic module (2054) is vibration. The intensity and pattern of the vibration generated by the tactile module (2054) is controllable. For example, different vibrations may be combined and output or sequentially output.

In addition to the vibration, the haptic module (2054) may various tactile effects including effects by stimulus including pin arrangement vertically moving with respect to a contact skin surface, spraying force or suction force of the air through an injection port or a suction port, a touch on the skin surface, contact with an electrode, electrostatic force, and the like and an effect of reproducing a cold sensation using a heat absorbing or heatable element.

The haptic module (2054) may be implemented not only to transmit the tactile effect through direct contact but also to allow the user to feel the tactile effect through the muscles of the finger or arm. At least two haptic modules (2054) may be provided according to a configuration aspect of the mobile device (2000).

The memory (2060) may store a program for a motion of the controller (2080) therein and temporarily store input/output data (e.g., a phone book, a message, a still image, a moving picture, or the like) therein. The memory (2060) may store data regarding various patterns of vibrations and sounds output in the touch input on the touch screen.

The memory (2060) may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile device (2000) may operate in connection with a web storage performing a storing function of the memory (2060) on the Internet.

The interface unit (2070) serves as a passage with all external devices connected to the mobile device (2000). The interface unit (2070) transmits data from the external device or receives power to deliver power to each component in the mobile device (2000) or transmits data in the mobile device (2000) to the external device. For example, a wireless/wired headset port, an external charger port, a wired/wireless data port, a memory card port, a port connecting a device with an identification module, an audio input/output (I/O) port, a video I/O port, an earphone port, and the like may be included in the interface unit (2070).

The identification module as a chip for storing various information for authenticating use rights of the external device (2000) may include a user identification module (UIM), a subscriber identity module (SIM), a universal subscriber identity module (USIM), and the like. Apparatuses (hereinafter referred to as "identification apparatus") with the identification module may be manufactured in a smart card format. Therefore, the identification apparatus may be connected with the terminal (2000) via the port.

The interface unit (2070) may become a passage through which the power from a cradle is supplied to the mobile terminal (2000) when the mobile terminal (2000) is connected to an external cradle or may be a passage through which various command signals input from the cradle by the user are delivered to the mobile terminal. The various command signals or the power input from the cradle may serve as a signal for recognizing that the mobile terminal is correctly mounted on the cradle.

The controller (2080) generally controls all operations of the mobile device. For example, the controller (2080) performs related control and processing for voice call, data communication, video call, and so on. The controller (2080) may include a multimedia module (2081) for reproducing multimedia. The multimedia module (2081) may be implemented in the controller (2080) or implemented apart from the controller (2080). The controller (2080), in particular, the multimedia module (2081) may include the encoding apparatus and/or the decoding apparatus.

The controller (2080) may perform pattern recognition processing to recognize a write input or a drawing input performed on the touch screen as a text or an image.

The power supply unit (2090) receives external power and internal power by a control of the controller (2080) to supply power required for operations of respective components.

Various embodiments described herein may be implemented in a computer-readable recording medium or a recording medium readable by a device similar to the computer by using, for example, software, hardware, or a combination thereof.

According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the controller (2080) itself.

According to software implementation, embodiments such as a procedure and a function described in the specification may be implemented by separate software modules. Each of the software modules may perform one or more functions and operations described in the specification. A software code may be implemented by a software application written by an appropriate program language. Here, the software code may be stored in the memory (2060) and executed by the controller (2080).

Figure 21:
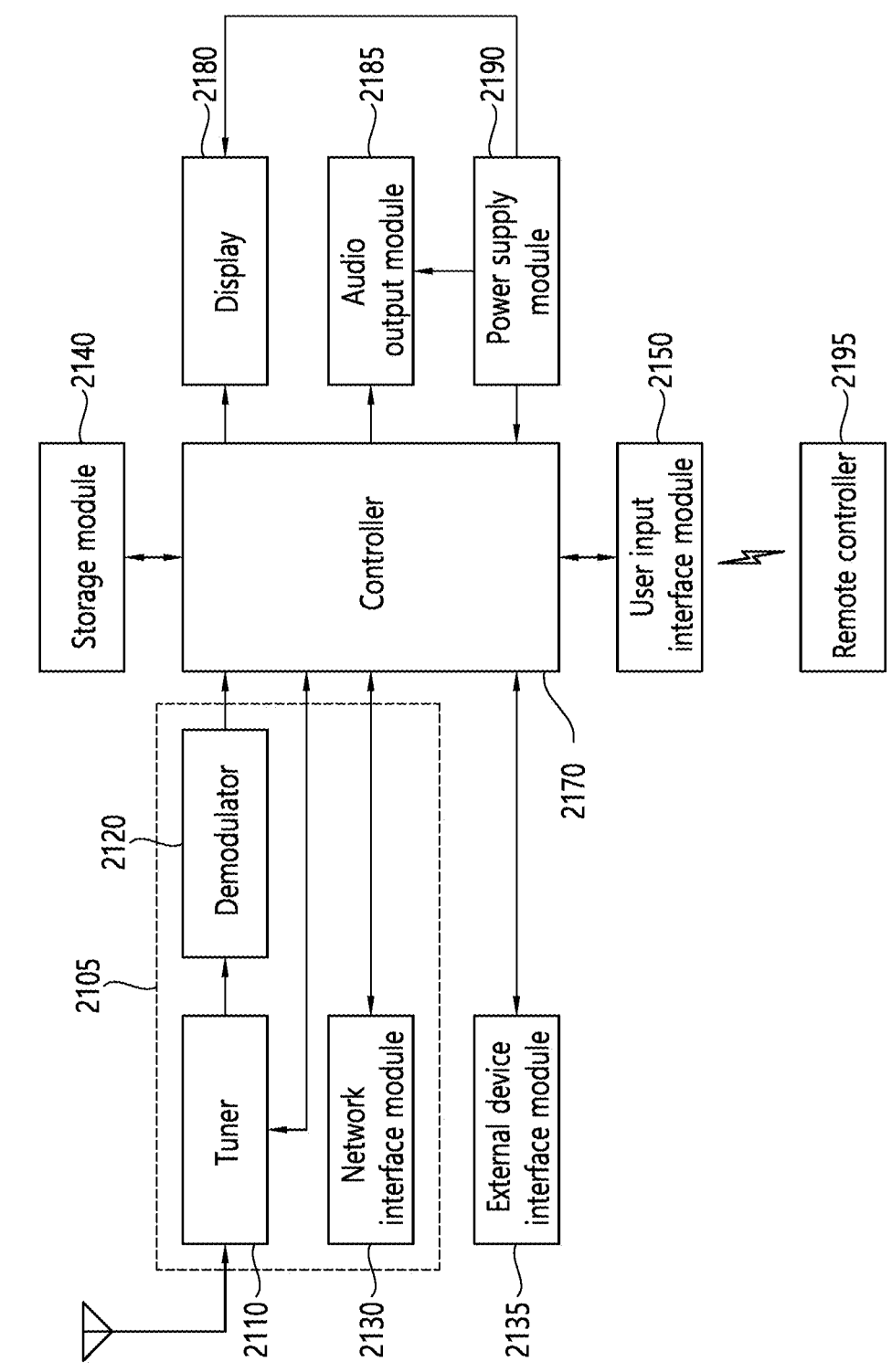
FIG. 21 is a block diagram illustrating another embodiment of a digital device.

FIG. 21 is a block diagram illustrating another embodiment of a digital device.

Other examples of the digital device (2100) include a broadcast receiving module (2105), an external device interface module (2135), a storage module (2140), a user input interface module (2150), a controller (2170), a display (2180), an audio output module (2185), a power supply module (2190) and an image capture module (not shown). Here, the broadcast receiving module (2105) may include at least one tuner (2110), a demodulator (2120), and a network interface module (2130). However, in some cases, the broadcast receiving module (2105) may include the tuner (2110) and the demodulator (2120) but may not include the network interface module (2130), or vice versa. In addition, although not shown, the broadcast receiving module (2105) may include a multiplexer to multiplex a signal demodulated by the demodulator (2120) via the tuner (2110) and a signal received through the network interface (2130). In addition, although not shown, the broadcast receiving module (2125) may include a demultiplexer to demultiplex the multiplexed signal or to demultiplex the demodulated signal or a signal passing through the network interface module (2130).

The tuner (2110) receives an RF broadcast signal by tuning a channel selected by a user or all previously stored channels among radio frequency (RF) broadcast signals received through an antenna. In addition, the tuner (2110) converts the received RF broadcast signal into an intermediate frequency (IF) signal or a baseband signal.

For example, if the received RF broadcast signal is a digital broadcast signal, the tuner (2110) converts the signal into a digital IF signal (DIF), and if the received RF broadcast signal is an analog broadcast signal, the tuner (2110) converts the signal into an analog baseband video or audio signal (CVBS/SIF). That is, the tuner (2110) may process both a digital broadcast signal or an analog broadcast signal. The analog baseband video or audio signal CVBS/SIF output from the tuner (2110) may be directly input to the controller (2170).

In addition, the tuner (2110) may receive an RF broadcast signal of a single carrier according to an advanced television system committee (ATSC) scheme or an RF broadcast signal of multiple carriers according to a digital video broadcasting (DVB) scheme.

Meanwhile, the tuner (2110) may sequentially tune and receive the RF broadcast signals of all the stored broadcast channels through a channel memory function among the RF broadcast signals received through the antenna and convert them into intermediate frequency signals or baseband signals.

The demodulator (2120) receives and demodulates a digital IF signal DIF converted by the tuner (2110). For example, when the digital IF signal output from the tuner (2110) is an ATSC type, the demodulator (2120) performs 8-Vestigal Side Band (8-VSB) demodulation, for example. In addition, the demodulator (2120) may perform channel decoding. To this end, the demodulator (2120) may include a trellis decoder, a de-interleaver, a Reed-Solomon decoder, and the like to perform trellis decoding, deinterleaving, and Reed-Solomon decoding.

For example, when the digital IF signal output from the tuner (2110) is a DVB type, the demodulator (2120) performs coded orthogonal frequency division modulation (COFDMA) demodulation, for example. In addition, the demodulator (2120) may perform channel decoding. To this end, the demodulator (2120) may include a convolution decoder, a deinterleaver, a Reed-Solomon decoder, and the like to perform convolutional decoding, deinterleaving, and Reed-Solomon decoding.

The demodulator (2120) may output a stream signal TS after performing demodulation and channel decoding. In this case, the stream signal may be a signal multiplexed with an image signal, an audio signal, or a data signal. For example, the stream signal may be an MPEG-2 transport stream (TS) multiplexed with an MPEG-2 standard image signal, a Dolby AC-3 standard audio signal, and the like. Specifically, the MPEG-2 TS may include a header of 4 bytes and a payload of 184 bytes.

Meanwhile, the demodulator (2120) described above may be provided separately according to the ATSC system and the DVB system. That is, the digital device may include an ATSC demodulator and a DVB demodulator separately.

The stream signal output from the demodulator (2120) may be input to the controller (2170). The controller (2170) may control demultiplexing, image/audio signal processing, and the like, and control output of audio through the display (2180) and the audio output module (2185).

The external device interface module (2135) provides an environment in which various external devices are interfaced to the digital device (2100). To this end, the external device interface module (2135) may include an A/V input/output module (not shown) or a wireless communication module (not shown).

The external device interface module (2135) may be wiredly/wirelessly connected to an external device such as a digital versatile disk (DVD), a Blu-ray, a game device, a camera, a camcorder, a computer (laptop, tablet), a smartphone, a Bluetooth device, and a cloud. The external device interface module (2135) transmits an image, audio, or data (including image) signal input from the outside to the controller (2170) of the digital device through the connected external device. The controller (2170) may control the processed video, audio or data signal to be output to the connected external device. To this end, the external device interface module (2135) may further include an A/V input/output module (not shown) or a wireless communication module (not shown).

The A/V input/output module may use a USB terminal, a CVBS (composite video banking sync) terminal, a component terminal, an S-video terminal (analog), a DVI digital visual interface (HDMI) terminal, a high definition multimedia interface (HDMI) terminal, an RGB terminal, a D-SUB terminal and the like.

The wireless communication module may perform near field communication with another electronic device. The digital device (2100) may be connected to another electronic device via a network according to a communication protocol such as Bluetooth, radio frequency identification (RFID), infrared data association (IrDA), ultra wideband (UWB), ZigBee, and digital living network alliance (DLNA). It may be networked with other electronic devices according to a communication protocol.

In addition, the external device interface module (2135) may be connected to various set top boxes through at least one of the various terminals described above to perform input/output operations with the set top box.

Meanwhile, the external device interface module (2135) may receive an application or a list of applications in a neighboring external device and transmit the received application or application list to the controller (2170) or the storage (2140).

The network interface module (2130) provides an interface for connecting the digital device (2100) with a wired/wireless network including the internet. The network interface module (2130) may include, for example, an Ethernet terminal for connection with a wired network, and may use, for example a wireless local area network (WLAN) (Wi-Fi), Wibro (wireless broadband), Wimax (world interoperability for microwave access), and high speed downlink packet access (HSDPA) communication standard for connection with a wireless network.

The network interface module (2130) may transmit or receive data with another user or another digital device through the connected network or another network linked to the connected network. In particular, the network interface module (2130) may transmit some content data stored in the digital device (2100) to another user who is registered in advance in the digital device (2100) or a selected user or a selected digital device among other digital devices.

Meanwhile, the network interface module (2130) may access a predetermined web page through a connected network or another network linked to the connected network. That is, by accessing the predetermined web page through the network, the network interface module (2130) may send or receive data with the server. In addition, the network interface module (2130) may receive content or data provided by a content provider or a network operator. That is, the network interface module (2130) may receive content such as a movie, an advertisement, a game, a VOD, a broadcast signal, and related information provided from a content provider or a network provider through a network. In addition, the network interface module (2130) may receive the update information and the update file of firmware provided by the network operator. In addition, the network interface module (2130) may transmit data to the Internet or content provider or network operator.

In addition, the network interface module (2130) may selectively receive a desired application from among applications that are open to the public through the network.

The storage module (2140) may store a program for processing and controlling each signal in the controller (2170), and may store a signal-processed video, audio, or data signal.

In addition, the storage module (2140) may perform a function for temporarily storing an image, audio, or data signal input from the external device interface module (2135) or the network interface module (2130). The storage module (2140) may store information on a predetermined broadcast channel through a channel memory function.

The storage module (2140) may store an application or an application list input from the external device interface module (2135) or the network interface module (2130).

In addition, the storage module (2140) may store various platforms described below.

The storage module (2140) may include at least one type storage medium among, for example, a flash memory type, a hard disk type, a multimedia card micro type, a card type memory (e.g., SD or XD memory, and so on), a RAM, or a ROM (EEPROM, and so on). The digital device (2100) may reproduce and provide a content file (video file, still image file, music file, document file, application file, and so on) stored in the storage module (2140) to the user.

FIG. 21 illustrates an embodiment in which the storage module (2140) is provided separately from the controller (2170), but the scope of the embodiments of the present disclosure is not limited thereto. That is, the storage (2140) may be included in the controller (2170).

The user input interface module (2150) transmits a signal input by the user to the controller (2170) or transmits a signal of the controller (2170) to the user.

For example, the user input interface module (2150) controls power on/off, channel selection, screen setting, and so on, by a control signal received from the remote controller (2195) according to various communication methods such as an RF communication method and an infrared (IR) communication method, or may process and transmit a control signal from the controller (2170) to the remote controller (2195).

In addition, the user input interface module (2150) may transmit a control signal input from a local key (not shown) such as a power key, a channel key, a volume key, and a set value to the controller (2170).

The user input interface module (2150) may transmit a control signal input from a sensing module (not shown) that senses a user's gesture to the controller (2170) or may transmit a signal of the controller (2170) to the sensing module (not shown). Here, the sensing module may include a touch sensor, a voice sensor, a position sensor, an operation sensor, and the like.

The controller (2170) demultiplexes a stream input through the tuner (2110), the demodulator (2120), or the external device interface (2135), or processes a demultiplexed signal to generate and output a signal for video or audio output. The controller (2170) may include the above-described encoding apparatus and/or decoding apparatus.

The image signal processed by the controller (2170) may be input to the display (2180) and displayed as an image corresponding to the image signal. In addition, the image signal processed by the controller (2170) may be input to the external output device through the external device interface (2135).

The audio signal processed by the controller (2170) may be output to the audio output module (2185). In addition, the audio signal processed by the controller (2170) may be input to the external output device through the external device interface (2135).

Although not shown in FIG. 21, the controller (2170) may include a demultiplexer, an image processor, and the like.

The controller (2170) may control overall operations of the digital device (2100). For example, the controller (2170) may control the tuner (2110) to control tuning of an RF broadcast corresponding to a channel selected by a user or a previously stored channel.

The controller (2170) may control the digital device (2100) by a user command or an internal program input through the user input interface (2150). In particular, the controller (2170) may access the network so that the user may download a desired application or application list into the digital device (2100).

For example, the controller (2170) controls the tuner (2110) to input a signal of a selected channel according to a predetermined channel selection command received through the user input interface (2150). The controller (2170) processes the video, audio or data signal of the selected channel. The controller (2170) allows the channel information selected by the user to be output through the display (2180) or the audio output module (2185) together with the processed video or audio signal.

As another example, the controller (2170) may allow an image signal or audio signal from an external device, e.g., a camera or a camcorder, input though the external device interface module (2135) to be output through the display (2180) or the audio output module (2185) according to an external device image playback command received through the user input interface (2150).

The controller (2170) may control the display (2180) to display an image. For example, the controller (2170) may control the display (2180) to display a broadcasting image input through the tuner (2110), an external input image input through the external device interface module (2135), an image input through a network interface module, or an image stored in the storage module (2140). In this case, the image displayed on the display (2180) may be a still image or video and may be a 2D image or a 3D image.

In addition, the controller (2170) may control to reproduce the content. In this case, the content may be content stored in the digital device (2100), received broadcast content, or external input content input from the outside. The content may be at least one of a broadcasting image, an external input image, an audio file, a still image, a connected web screen, and a document file.

Meanwhile, the controller (2170) may control to display an application or a list of applications that may be downloaded from the digital device (2100) or from an external network when entering the application view item.

The controller (2170) may control to install and run an application downloaded from an external network, along with various user interfaces. In addition, the controller (2170) may control an image related to an application to be executed by a user selection to be displayed on the display (2180).

Although not shown in the drawing, a channel browsing processor may be further provided to generate a thumbnail image corresponding to a channel signal or an external input signal.

The channel browsing processor may receive a stream signal TS output from the demodulator (2120) or a stream signal output from the external device interface (2135), and extract an image from the input stream signal to generate a thumbnail image.

The generated thumbnail image may be coded as it is or input to the controller (2170). In addition, the generated thumbnail image may be coded in a stream form and input to the controller (2170). The controller (2170) may display a thumbnail list including a plurality of thumbnail images on the display (2180) using the input thumbnail image. Meanwhile, the thumbnail images in the thumbnail list may be updated sequentially or simultaneously. Accordingly, the user may easily recognize the contents of the plurality of broadcast channels.

The display (2180) converts an image signal, a data signal, an OSD signal processed by the controller (2170) or an image signal, data signal, and so on, received from the external device interface module (2135) into R, G, and B signals to generate a drive signal.

The display (2180) may be a PDP, an LCD, an OLED, a flexible display, a 3D display, or the like.

The display (2180) may be configured as a touch screen and used as an input device in addition to the output device.

The audio output module (2185) receives a signal processed by the controller (2170), for example, a stereo signal, a 3.1 channel signal, or a 5.1 channel signal, and outputs an audio signal. The audio output module (2185) may be implemented as various types of speakers.

Meanwhile, in order to detect a user's gesture, as described above, a sensing module (not shown) including at least one of a touch sensor, a voice sensor, a position sensor, and a motion sensor may be further provided in the digital device (2100). A signal detected by the sensing module (not shown) may be transmitted to the controller (2170) through the user input interface module (2150).

Meanwhile, an image capture module (not shown) for capturing an image the user may be further provided. Image information captured by the image capture module (not shown) may be input to the controller (2170).

The controller (2170) may detect the user's gesture by combining the image captured by the image capture module (not shown) or the detected signal from the sensing module (not shown).

The power supply module (2190) supplies corresponding power throughout the digital device (2100).

In particular, the power supply module (2190) may supply power to the controller (2170) which may be implemented in the form of a system-on-chip (SOC), a display (2180) for displaying an image, and an audio output module (2185) for audio output.

To this end, the power supply module (2190) may include a converter (not shown) for converting AC power into DC power. Meanwhile, for example, when the display (2180) is implemented as a liquid crystal panel having a plurality of backlight lamps, an inverter (not shown) capable of performing PWM operation may be further provided for brightness varying or dimming.

The remote controller (2195) transmits a user input to the user input interface module (2150). To this end, the remote controller (2195) may use Bluetooth, Radio Frequency (RF) communication, infrared (IR) communication, Ultra Wideband (UWB), ZigBee (ZigBee) method and the like.

In addition, the remote controller (2195) may receive an image, an audio or a data signal output from the user input interface module (2150), display it on the remote controller (2195) or output a sound or vibration.

The digital device (2100) may be a digital broadcast receiver capable of processing a fixed or mobile ATSC or DVB digital broadcast signal.

In addition, the illustrated components of the digital device according to an embodiment of the present disclosure may be omitted or the digital device may further include some components which are not illustrated as necessary. Meanwhile, unlike the above, the digital device may not include the tuner and the demodulator and may receive and play content through a network interface module or an external device interface module.

Figure 22:
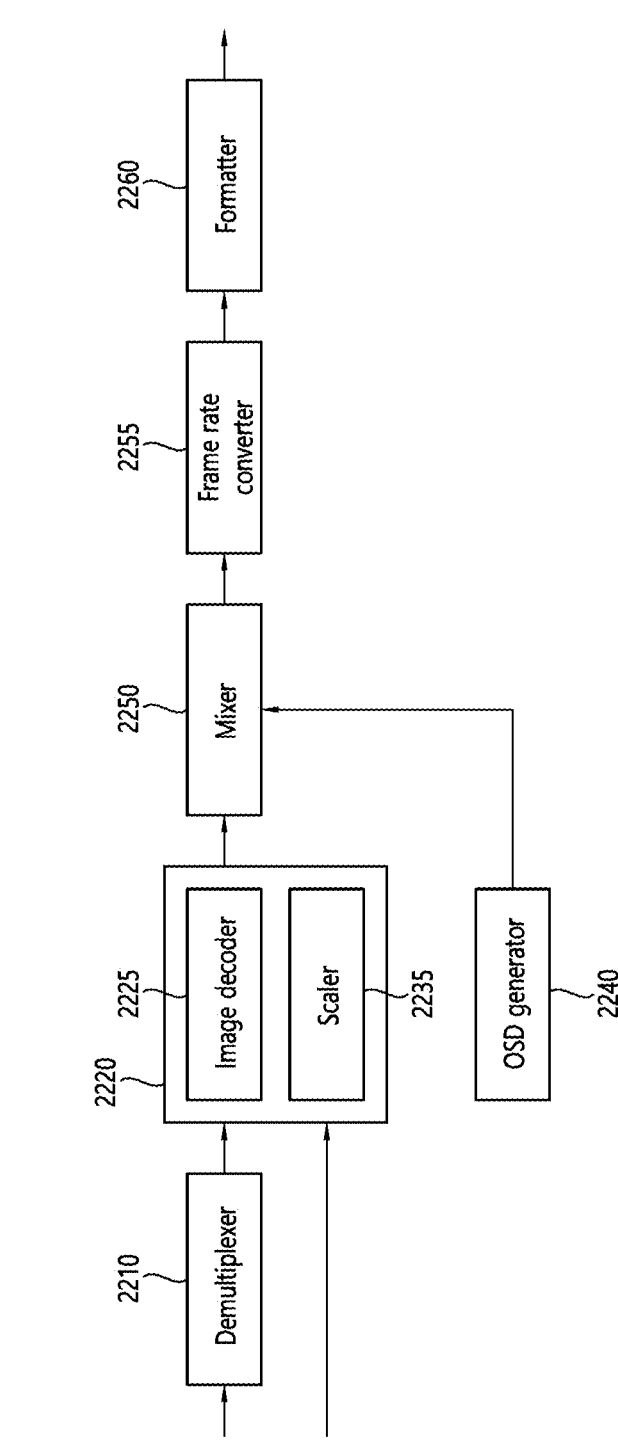
FIG. 22 is a block diagram illustrating an embodiment of a specific configuration of the controller of FIG. 19 to FIG. 21.

FIG. 22 is a block diagram illustrating an embodiment of a specific configuration of the controller of FIG. 19 to FIG. 21.

An example of the controller may include a demultiplexer (2210), an image processor (2220), an on-screen display (OSD) generator (2240), a mixer (2250), a frame rate converter (FRC) (2255), and a formatter (2260). In addition, although not shown, the controller may further include a voice processor and a data processor.

The demultiplexer (2210) demultiplexes an input stream. For example, the demultiplexer (2210) may demultiplex input MPEG-2 TS into video, audio, and data signals. Here, the stream signal input to the demultiplexer (2210) may be a stream signal output from a tuner, a demodulator, or an external device interface module.

The image processor (2220) performs image processing of the demultiplexed image signal. To this end, the image processor (2220) may include an image decoder (2225) and a scaler (2235).

The image decoder (2225) decodes the demultiplexed image signal, and the scaler (2235) scales resolution of the decoded image signal so that the display may output the same.

The image decoder (2225) may support various standards. For example, the image decoder (2225) performs the function of the MPEG-2 decoder when the image signal is coded in the MPEG-2 standard, and the image decoder (2225) performs a function of the corresponding decoder when the image signal is coded based on a digital multimedia broadcasting (DMB) scheme, H.26x (e.g., H. 265, H.266, H.267, and so on) or EVC, and so on.

Meanwhile, the image signal decoded by the video processor (2220) is input to the mixer (2250).

The OSD generator (2240) generates OSD data according to a user input or itself. For example, the OSD generator (2240) generates data for displaying various data in the form of a graphic or text on the screen of the display based on a control signal of the user input interface. The generated OSD data includes various data such as a user interface screen of a digital device, various menu screens, widgets, icons, viewing rate information, and the like.

The OSD generator (2240) may generate data for displaying broadcast information based on subtitles or EPGs of a broadcasting image.

The mixer (2250) mixes the OSD data generated by the OSD generator (2240) and the image signal processed by the image processor and provides the same to the formatter (2260). Since the decoded image signal and the OSD data are mixed, the OSD is overlaid and displayed on the broadcasting image or the external input image.

The frame rate converter (FRC) (2255) converts a frame rate of an input image. For example, the frame rate converter (2255) may convert a frame rate of an input 60 Hz image into a frame rate of, for example, 120 Hz or 240 Hz according to an output frequency of the display. As described above, there may be various methods of converting the frame rate. For example, when converting the frame rate from 60 Hz to 120 Hz, the frame rate converter (2255) may insert the same first frame between the first frame and a second frame or insert a third frame predicted from the first frame and the second frame. As another example, when converting the frame rate from 60 Hz to 240 Hz, the frame rate converter (2255) may insert three more identical or predicted frames between existing frames. Meanwhile, when no separate frame conversion is performed, the frame rate converter (2255) may be bypassed.

The formatter (2260) changes the output of the input frame rate converter (2255) to match an output format of the display. For example, the formatter (2260) may output R, G, B data signals, and the R, G, B data signals may be output as low voltage differential signaling (LVDS) or mini-LVDS. In addition, when the output of the input frame rate converter (2255) is a 3D image signal, the formatter (2260) may support a 3D service through the display by configuring and outputting the 3D form according to the output format of the display.

The voice processor (not shown) in the controller may perform voice processing of a demultiplexed audio signal. The voice processor (not shown) may support processing of various audio formats. For example, even when an audio signal is encoded in a format such as MPEG-2, MPEG-4, AAC, HE-AAC, AC-3, BSAC, EVS, and so on, the voice processor may include a decoder corresponding thereto to process the same.

Also, the voice processor (not shown) in the controller may process base, treble, volume control, and the like.

The data processor (not shown) in the controller may perform data processing of the demultiplexed data signal. For example, even when the demultiplexed data signal is coded, the data processor may decode the demultiplexed data signal. Here, the coded data signal may be EPG information including broadcast information such as a start time and an end time of a broadcast program broadcast in each channel.

Meanwhile, the above-described digital device is an example according to an embodiment of the present specification, each component may be integrated, added, or omitted depending on the specifications of the digital device that is actually implemented. That is, as needed, two or more components may be combined into one component or one component may be subpartitioned into two or more components. In addition, the function performed in each block is for explaining an embodiment of the present specification, the specific operation or device does not limit the scope of the embodiment of the present specification.

Meanwhile, the digital device may be an image signal processing device that performs signal processing of an image stored in the device or an input image. As another example of the image signal processing device, a set-top box (STB) excluding the display 680 and the audio output module 685 shown in FIGS. 2.3-4, the above-described DVD player, a Blu-ray player, a game machine, a computer, and the like may be further exemplified.

Figure 23:
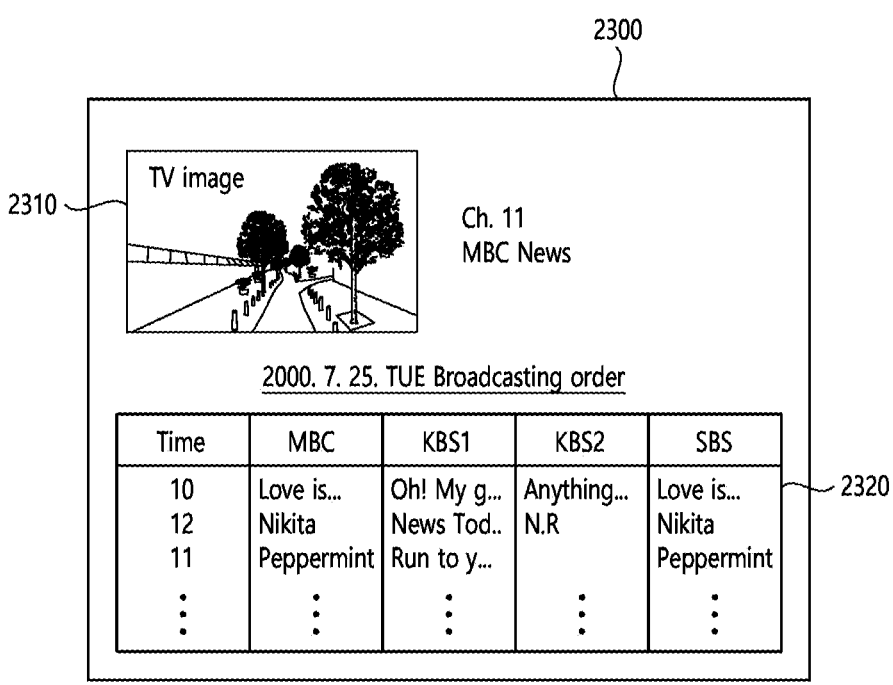
FIG. 23 illustrates an example in which a screen of a digital device simultaneously displays a main image and a sub-image according to an embodiment.

FIG. 23 illustrates an example in which a screen of a digital device simultaneously displays a main image and a sub-image according to an embodiment.

According to an embodiment, the digital device may simultaneously display a main image (2310) and a sub-image (2320) on the screen (2300). The main image (2310) may be called a first image, and the sub-image (2320) may be called a second image. The main image (2310) and the sub-image (2320) may include a video, a still image, an electronic program guide (EPG), a graphical user interface (GUI), an on-screen display (OSD), and the like, but are not limited thereto. The main image (2310) may refer to an image which is displayed simultaneously with the sub-image (2320) on the screen (2300) of the electronic device and which is relatively smaller in size than the screen (2300) of the electronic device. In FIG. 2.3-6, the main image (2310) is displayed on the top left of the screen (2300) of the digital device. However, the position where the main image (2310) is displayed is not limited thereto and it may be displayed at any location within the screen (2300) of the digital device.

The main image (2310) and the sub-image (2320) may be directly or indirectly related to each other. For example, the main image (2310) may be a streaming video, and the sub-image (2320) may be a GUI that sequentially displays thumbnails of videos including information similar to the streaming video. As another example, the main image (2310) may be a broadcasting image and the sub-image (2320) may be an EPG. As another example, the main image (2310) may be a broadcasting image, and the sub-image (2320) may be a GUI. Examples of the main image (2310) and the sub-image (2320) are not limited thereto.

In an embodiment, the main image (2310) may be a broadcasting image received through a broadcasting channel and the sub-image (2320) may be information related to a broadcasting image received through a broadcasting channel. The information related to the broadcasting image received through the broadcast channel may include, for example, EPG information including a comprehensive channel schedule, detailed information of a broadcast program, information on a broadcast program review, and the like, but is not limited thereto.

In another embodiment, the main image (2310) may be a broadcasting image received through a broadcast channel and the sub-image (2320) may be an image generated based on information previously stored in a digital device. An image generated based on information previously stored in a digital device may include, for example, a basic UI (user interface), basic channel information, an image resolution manipulation UI, a sleep reservation UI, and the like of the EPG but is not limited thereto.

In another embodiment, the main image (2310) may be a broadcasting image received through the broadcast channel and the sub-image (2320) may be information related to a broadcasting image received through a network. The information related to the broadcasting image received through the network may be, for example, information obtained through a search engine based on the network. More specifically, for example, information related to a character currently being displayed on the main image (2310) may be obtained through a search engine based on a network.

However, the example is not limited thereto, and the information related to the broadcasting image, which is received through the network, may be obtained by using, for example, an artificial intelligence (AI) system. More specifically, for example, an estimated-location in a map of a place currently being displayed on the main image (2310) may be obtained using deep-learning based on a network and the digital device may receive information on the estimated location in the map of the place currently displayed on the main image (2310) through a network.

The digital device according to an embodiment may receive at least one of image information of the main image (2310) and image information of the sub-image (2320) from the outside. The image information of the main image (2310) may include, for example, a broadcasting signal received through a broadcasting channel, source code information of the main image (2310), and IP packet information of the image (2310) received through the network, but is not limited thereto. Similarly, the image information of the sub-image (2320) may include, for example, a broadcast signal received through the broadcast channel, source code information of the sub-image (2320), and IP packet information of the sub-image (2320) received through the network, but is not limited thereto. The digital device may decode the image information of the main image (2310) or the image information of the sub-image (2320) received from the outside and use the same. However, in some cases, the digital device may internally store image information of the main video (2310) or image information of the sub-image (2320).

The digital device may display the main image (2310) and the sub-image (2320) on the screen (2300) of the digital device based on the image information of the main image (2310) and the information related to the sub-image (2320).

In an example, the decoding apparatus (300) of the digital device may include a main image decoding apparatus and a sub-image decoding apparatus, and the main image decoding apparatus and the sub-image decoding apparatus each decode the image information of the main image (2310) and the image information of the sub-image (2320), respectively. The renderer may include a main image renderer (first renderer) and a sub-image renderer (second renderer), and the main image renderer may display the main image (2310) in a first region of the screen (2300) of the digital device based on the information decoded by the main image decoding apparatus and the sub-image renderer may display the sub-image (2320) in a second region of the screen (2300) of the digital device based on the information decoded by the sub-image decoding apparatus.

In another example, the decoding apparatus (300) of the digital device may decode the image information of the main image (2310) and the image information of the sub-image (2320). Based on the information decoded by the decoding apparatus (300), the renderer may process the main image (2310) and the sub-image (2320) together so that they are simultaneously displayed on the screen (2300) of the digital device.

That is, according to this specification, the digital device may provide a video service processing method. The image service processing method may include receiving image information, decoding a (main) image based on the image information, rendering or displaying the decoded image in a first region of the display, and rendering or displaying a sub-image in a second region of the display. In this case, the decoding of the first image may follow the decoding procedure of the decoding apparatus (300) according to FIG. 3. For example, as described above, the decoding of the first image may include deriving prediction samples for a current block based on inter or intra prediction, deriving residual samples for the current block based on the received residual information (optional), and generating reconstructed samples based on the prediction samples and/or the residual samples. Additionally, the decoding of the first image may include performing an in-loop filtering procedure on the reconstructed picture including the reconstructed samples.

For example, the sub-image may be an electronic program guide (EPG), an on-screen display (OSD), or a graphical user interface (GUI). For example, the image information may be received through a broadcast network, and the information on the sub-image may be received through the broadcast network. For example, the image information may be received through a communication network, and the information on the sub-image may be received through the communication network. For example, the image information may be received through a broadcasting network, and the information on the sub-image may be received through a communication network. For example, the image information may be received through a broadcasting network or a communication network, and the information on the sub-image may be stored in a storage medium in the digital device.

The image service processing method being performed by the above-described digital device according to this specification will hereinafter be described in more detail with reference to FIG. 24.

Figure 24:
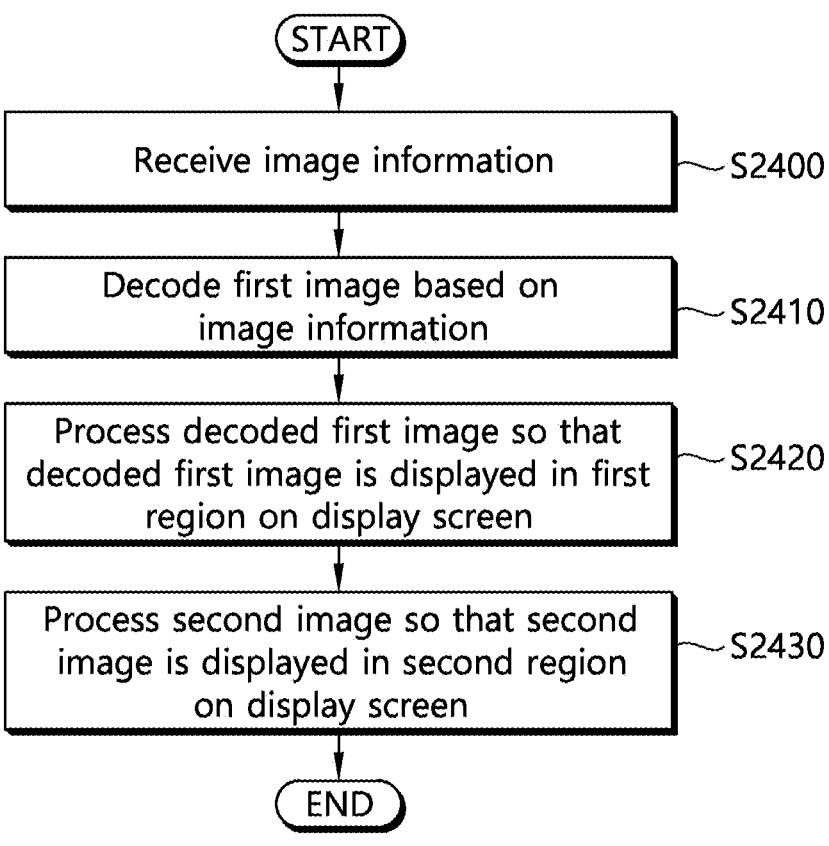
FIG. 24 is a flowchart broadly illustrating an image service processing method that may be performed by a digital device according to an embodiment of this specification.

FIG. 24 is a flowchart broadly illustrating an image service processing method that may be performed by a digital device according to an embodiment of this specification.

The method disclosed in FIG. 24 may be performed by the digital device, which is disclosed in FIG. 19 to FIG. 22. More specifically, step S2400 of FIG. 24 may be performed by a network interface unit, a wireless communication unit, a broadcast receiving unit (or module) of the digital device. Steps S2400 to S2410 of FIG. 24 may be performed by a decoding apparatus (first decoder) of the digital device. Step S2420 of FIG. 24 may be performed by a renderer (first renderer) of the digital device. And, step S2430 may be performed by a renderer (second renderer) of the digital device.

Referring to FIG. 24, the digital device may receive image information (S2400).

According to an embodiment, the digital device may receive image information through a broadcast network or a communication network. Alternatively, the digital device may also obtain image information being stored in a storage medium within the digital device.

The digital device may decode a first image based on the image information (S2410).

Herein, the first image is a main image that is displayed on a screen of the digital device, as described above. Herein, the first image may be referred to as a main image. For example, the first image may be a streaming moving picture or a broadcasting image, and so on.

Additionally, the image information may be information related to the first image (i.e., main image). For example, the image information may include broadcasting signal received through a broadcasting channel, source code information of the main image, Internet Protocol (IP) packet information of the main image being received through a network, and, so on.

When decoding the first image, the digital device may follow the image decoding method performed by the decoding apparatus, which is described above with reference to FIG. 3 to FIG. 16.

According to an embodiment, the digital device may derive prediction samples for the current block based on inter or intra prediction, derive residual samples for the current block based on received residual information (this process may be omitted), and generate reconstructed samples based on the prediction samples and/or the residual samples. Moreover, the digital device may additionally perform an in-loop filtering procedure on a reconstructed picture including reconstructed samples.

Additionally, in case of applying intra prediction for the current block, the digital device may decode the first image by applying the above-described decoding method of FIG. 16.

According to an embodiment, the digital device may obtain at least one of Most Probable Mode (MPM) flag information, MPM index information, or remaining mode information, which are included in the image information, for the current block that is currently being decoded within the first image. Additionally, the digital device may configure an MPM list by deriving MPM candidates for the current block. The digital device may derive an intra prediction mode of the current block based on at least one of the MPM flag information, MPM index information, or remaining mode information, and the MPM list. The digital device may generate prediction samples by performing prediction on the current block based on the intra prediction mode. The digital device may generate a reconstructed picture (first image) for the current block based on the prediction samples.

Herein, when deriving an intra prediction mode of the current block, in case the digital device determines that the intra prediction mode for the current block is not included among the MPM candidates within the MPM list, based on the MPM flag information, the digital device may derive an intra prediction mode of the current block based on the remaining mode information. Additionally, the digital device may obtain an intra prediction mode that is to be applied to the current block, by coding based on a Truncated Binary (TB) binarization process for the remaining mode information.

Additionally, when configuring the MPM list, the digital device may derive a first MPM candidate and a second MPM candidate based on a first neighboring block and a second neighboring block, which are located in neighboring positions of the current block. Herein, the first neighboring block may represent a left-side neighboring block located at a lowermost (or bottom) position, among the left-side neighboring blocks being adjacent to the left side of the current block. And, the second neighboring block may represent a top-side neighboring block located at a rightmost (or far right) position, among the neighboring blocks being adjacent to the top of the current block. Additionally, the digital device may determine whether the first MPM candidate and the second MPM candidate are identical, and the digital device may also determine whether the first MPM candidate or the second MPM candidate has a greater mode number than the mode number of a DC intra prediction mode. At this point, when the first MPM candidate and the second MPM candidate are not identical and both the first MPM candidate and the second MPM candidate have mode numbers that are greater than the mode number of the DC intra prediction mode, the digital device may derive k number of MPM candidates including the first MPM candidate and the second MPM candidate based on a difference between the mode numbers of the first MPM candidate and the second MPM candidate. For example, the number (i.e., k) of MPM candidates may be equal to 3, 4, 5, 6, and so on, and this number may be variably determined in accordance with the algorithm.

Herein, the k number of MPM candidates may be derived based on 67 intra prediction modes including 2 non-directional intra prediction modes and 65 directional intra prediction modes. Additionally, when the MPM flag information indicates that the intra prediction mode of the current block is not included among the MPM candidates within the MPM list, the intra prediction mode of the current block may be derived based on the remaining mode information. In this case, the remaining mode information may be derived based on remaining intra prediction modes that remain after excluding the MPM candidates (e.g., k number of candidates) from the 67 intra prediction modes. The remaining mode information may indicate a syntax element value by using indication information (e.g., index information) indicating one intra prediction mode being applied to the current block among the remaining intra prediction modes.

Herein, the syntax element value indicating the remaining mode information may be derived through a Truncated Binary (TB) binarization process based on a number of remaining intra prediction modes excluding the MPM candidates from the 67 intra prediction modes. For example, in case the MPM list includes 6 MPM candidates, the syntax element value indicating the remaining mode information may indicate the 61 remaining intra prediction modes, which remain after excluding the 6 MPM candidates from the 67 intra prediction modes, by using index values ranging from 0 to 60. In this case, the syntax element value indicating the remaining mode information may be binarized as binary values by using a variable number of bits ranging from 1 bit to 5 bits through the Truncated Binary (TB) binarization process.

The digital device may process the decoded first image so that the decoded first image can be displayed on a first region on the display screen (S2420). According to an embodiment, the digital device (more specifically a renderer) may render the decoded first image and may, then, display the first image on a specific location (first region) on the display screen.

The digital device may process a second image so that the second image can be displayed on a second region on the display screen (S2430). According to an embodiment, the digital device (more specifically a renderer) may render a second image and may, then, display the second image on a specific location (second region) on the display screen.

Herein, the second image may be an image that is different from the first image, and the first image and second image may be directly or indirectly inter-related. The first image may be referred to as a main image, and the second image may be referred to as a sub-image. For example, the second image may be an electronic program guide (EPG), an on-screen display (OSD), or a graphic user interface (GUI).

According to an embodiment, a main image may be a streaming moving picture, and a sub-image may be a GUI sequentially displaying thumbnails of moving pictures including similar information as the streaming moving picture. For example, information on the sub-image may be received through a communication network. Alternatively, information on the sub-image may be pre-stored in a storage medium within the digital device.

According to another embodiment, a main image may be a broadcasted image, and a sub-image may be an EPG related to the broadcasted image. For example, image information related to the main image and information on the sub-image may be received through a broadcast network. Alternatively, the information on the sub-image may be pre-stored in a storage medium within the digital device. Herein, the information on the sub-image may include EPG information including TV program schedule of all channels, detailed information on broadcast programs, and so on, broadcast program re-play information, and so on.

According to yet another embodiment, a main image may be a broadcasted image, and a sub-image may be a GUI. Examples of the main image and the sub-image shall not be limited only to this.

According to yet another embodiment, image information may be received through a broadcast network, information on the sub-image may be pre-stored in a storage medium within the digital device, the main image may be a broadcasted image, and the sub-image may be an image being generated based on the information on the sub-image, which is pre-stored in a storage medium within the digital device. The image that is generated based on the stored information on the sub-image may include, for example, a basic User Interface (UI) of the EPG, basic channel information, image resolution controlling UI, Sleep mode scheduling UI, and so on. And, the examples shall not be limited only to this.

According to yet another embodiment, the main image may be a broadcasted image being received through a broadcast channel, and the sub-image may be information related to a broadcasted image that is received through a network. For example, information related to a broadcasted image that is received through a network may be information that is obtained through a search engine that is based on the network. More specifically, for example, the obtained information may be character-related information being displayed on the main image through the search engine that is based on the network.

According to yet another embodiment, information related to a broadcasted image that is received through a network may be information that is obtained by using an Artificial Intelligence (AI) system. More specifically, for example, the obtained information may be an estimated-location in map of a place or venue being displayed on the main image by using network-based deep-learning. The digital device may receive information on an estimated-location in map of a place or venue being displayed on the main image through the network.

According to yet another embodiment, the information on the sub-image may include a broadcast signal that is received through a broadcast channel, source code information of the sub-image, and/or IP packet information of the sub-image that is received through the network, and so on.

The digital device may simultaneously display a main image and a sub-image on a screen of the digital device, based on image information of the main image and information on the sub-image.

What is claimed is:

1. An image decoding method performed by a decoding apparatus, the method comprising:

obtaining image information including Most Probable Mode (MPM) flag information, and residual information from a bitstream;

deriving a first intra prediction mode based on a first neighboring block which is located in a left side of a current block;

deriving a second intra prediction mode based on a second neighboring block which is located in an upper side of the current block;

configuring an MPM list for the current block based on the first intra prediction mode and the second intra prediction mode;

deriving an intra prediction mode of the current block based on the MPM flag information and the MPM list;

deriving prediction samples for the current block based on the intra prediction mode;

deriving residual samples for the current block based on the residual information; and generating a reconstructed picture for the current block based on the prediction samples and the residual samples, wherein the MPM list comprises MPM candidates derived based on whether at least one of the first intra prediction mode or the second intra prediction mode is non-directional intra prediction mode, wherein the MPM candidates which are derived based on a case that the first intra prediction mode and the second intra prediction mode are both the non-directional intra prediction mode, comprise:

a DC intra prediction mode, a vertical directional intra prediction mode, a horizontal directional intra prediction mode, an intra prediction mode of which mode number is equal to a mode number of the vertical directional intra prediction mode minus 4, and an intra prediction mode of which mode number is equal to the mode number of the vertical directional intra prediction mode plus 4, and wherein the MPM candidates which are derived based on a case that one of the first intra prediction mode and the second intra prediction mode is the non-directional intra prediction mode and the other is directional intra prediction mode, comprise:

one of the first intra prediction mode and the second intra prediction mode, an intra prediction mode of which mode number is equal to a maximum mode number of the first intra prediction mode and the second intra prediction mode minus 1, an intra prediction mode of which mode number is equal to the maximum mode number plus 1, an intra prediction mode of which mode number is equal to the maximum mode number minus 2.

2. An image encoding method performed by an encoding apparatus, the method comprising:

deriving a first intra prediction mode based on a first neighboring block which is located in a left side of a current block;

deriving a second intra prediction mode based on a second neighboring block which is located in an upper side of the current block;

configuring a Most Probable Mode (MPM) list for the current block based on the first intra prediction mode and the second intra prediction mode;

determining an intra prediction mode of the current block;

deriving prediction samples for the current block based on the intra prediction mode;

deriving residual samples for the current block based on the prediction samples;

generating MPM flag information based on the MPM list and the intra prediction mode;

generating residual information based on the residual samples; and encoding image information including the MPM flag information and the residual information, wherein the MPM list comprises MPM candidates derived based on whether at least one of the first intra prediction mode or the second intra prediction mode is non-directional intra prediction mode, wherein the MPM candidates which are derived based on a case that the first intra prediction mode and the second intra prediction mode are both the non-directional intra prediction mode, comprise:

a DC intra prediction mode, a vertical directional intra prediction mode, a horizontal directional intra prediction mode, an intra prediction mode of which mode number is equal to a mode number of the vertical directional intra prediction mode minus 4, and an intra prediction mode of which mode number is equal to the mode number of the vertical directional intra prediction mode plus 4, and wherein the MPM candidates which are derived based on a case that one of the first intra prediction mode and the second intra prediction mode is the non-directional intra prediction mode and the other is directional intra prediction mode, comprise:

one of the first intra prediction mode and the second intra prediction mode, an intra prediction mode of which mode number is equal to a maximum mode number of the first intra prediction mode and the second intra prediction mode minus 1, an intra prediction mode of which mode number is equal to the maximum mode number plus 1, an intra prediction mode of which mode number is equal to the maximum mode number minus 2.

3. A transmission method of data for image, the transmission method comprising:

obtaining a bitstream for the image, wherein the bitstream is generated based on deriving a first intra prediction mode based on a first neighboring block which is located in a left side of a current block, deriving a second intra prediction mode based on a second neighboring block which is located in an upper side of the current block, configuring a Most Probable Mode (MPM) list for the current block based on the first intra prediction mode and the second intra prediction mode, determining an intra prediction mode of the current block, deriving prediction samples for the current block based on the intra prediction mode, deriving residual samples for the current block based on the prediction samples, generating MPM flag information based on the MPM list and the intra prediction mode, generating residual information based on the residual samples, and generating the bitstream by encoding image information including the MPM flag information and the residual information; and transmitting the data comprising the bitstream, wherein the MPM list comprises MPM candidates derived based on whether at least one of the first intra prediction mode or the second intra prediction mode is non-directional intra prediction mode, wherein the MPM candidates which are derived based on a case that the first intra prediction mode and the second intra prediction mode are both the non-directional intra prediction mode, comprise:

a DC intra prediction mode, a vertical directional intra prediction mode, a horizontal directional intra prediction mode, an intra prediction mode of which mode number is equal to a mode number of the vertical directional intra prediction mode minus 4, and an intra prediction mode of which mode number is equal to the mode number of the vertical directional intra prediction mode plus 4, and wherein the MPM candidates which are derived based on a case that one of the first intra prediction mode and the second intra prediction mode is the non-directional intra prediction mode and the other is directional intra prediction mode, comprise:

one of the first intra prediction mode and the second intra prediction mode, an intra prediction mode of which mode number is equal to a maximum mode number of the first intra prediction mode and the second intra prediction mode minus 1, an intra prediction mode of which mode number is equal to the maximum mode number plus 1, an intra prediction mode of which mode number is equal to the maximum mode number minus 2.

\* \* \* \* \*